United States Patent
Schilders

(10) Patent No.: US 12,386,898 B2
(45) Date of Patent: Aug. 12, 2025

(54) SYSTEMS AND METHODS FOR SUB-GRAPH PROCESSING IN EXECUTABLE GRAPH-BASED MODELS

(71) Applicant: INFOSYS LIMITED, Bangalore (IN)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 106 days.

(21) Appl. No.: 18/125,540

(22) Filed: Mar. 23, 2023

(65) Prior Publication Data

US 2024/0256603 A1 Aug. 1, 2024

Related U.S. Application Data

(60) Provisional application No. 63/448,718, filed on Feb. 28, 2023, provisional application No. 63/442,682, filed on Feb. 1, 2023.

(51) Int. Cl.
*G06F 16/90* (2019.01)
*G06F 16/901* (2019.01)

(52) U.S. Cl.
CPC ...... *G06F 16/9024* (2019.01); *G06F 16/9027* (2019.01)

(58) Field of Classification Search
CPC ............ G06F 16/9024; G06F 16/9027
See application file for complete search history.

(56) References Cited

U.S. PATENT DOCUMENTS

| | | | |
|---|---|---|---|
| 11,815,943 B1 * | 11/2023 | Rosendahl | G06F 9/547 |
| 12,081,636 B2 * | 9/2024 | Enrici | H04L 67/60 |
| 2023/0023655 A1 | 1/2023 | Hui et al. | |

FOREIGN PATENT DOCUMENTS

WO 2018111699 A1 6/2018

OTHER PUBLICATIONS

Europe Patent Application No. 23165125.8, Extended European Search Report, dated Dec. 11, 2023.
Bulatov: "Fitting larger networks into memory"; dated Jan. 14, 2018, URL:https://medium.com/tensorflow/fittinglarger-networks-into- memory-583e3c758ff9 [retrieved on Nov. 24, 2023].

* cited by examiner

*Primary Examiner* — Kristopher Andersen
(74) *Attorney, Agent, or Firm* — Finnegan, Henderson, Farabow, Garrett & Dunner LLP

(57) ABSTRACT

A method for dynamic execution of sub-graphs within executable graph-based models is provided. Processing circuitry obtains an executable graph-based model comprising a plurality of sub-graphs and an overlay structure comprising processing logic associated with the plurality of sub-graphs. Each sub-graph defines a hierarchical structure of related nodes. The processing circuitry receives a stimulus and a context associated with the stimulus. In response to the stimulus being received and based on the context, the processing circuitry maps the stimulus to a first sub-graph of the executable graph-based model. The processing circuitry causes execution of processing logic within the overlay structure based on the mapping. The processing logic is associated with one or more nodes of the first sub-graph.

30 Claims, 34 Drawing Sheets

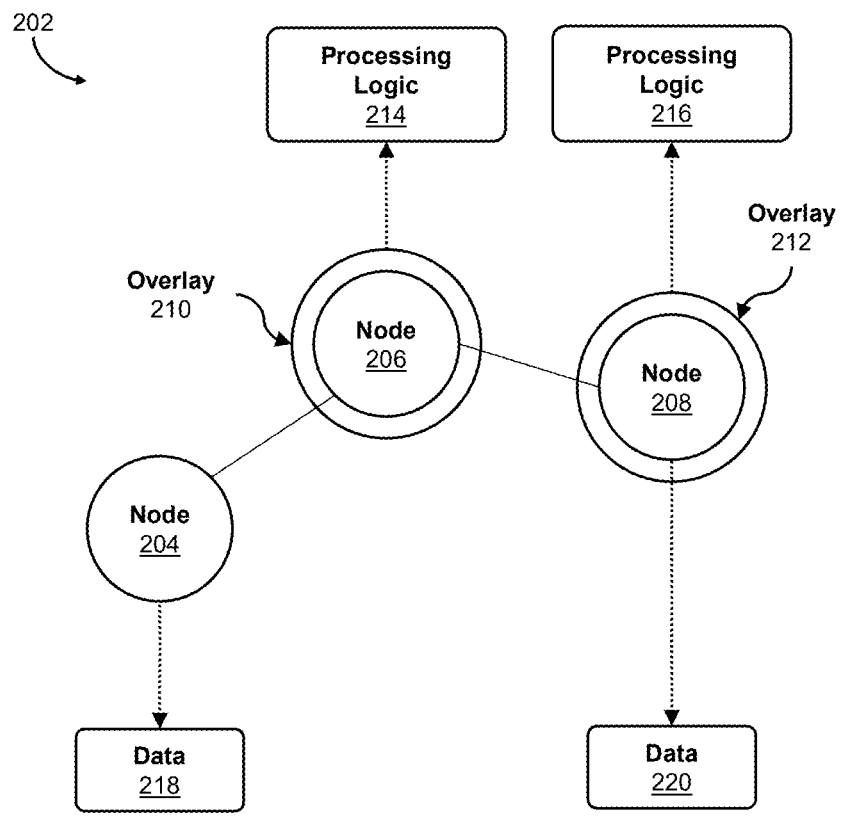
FIGURE 2 (Amended)

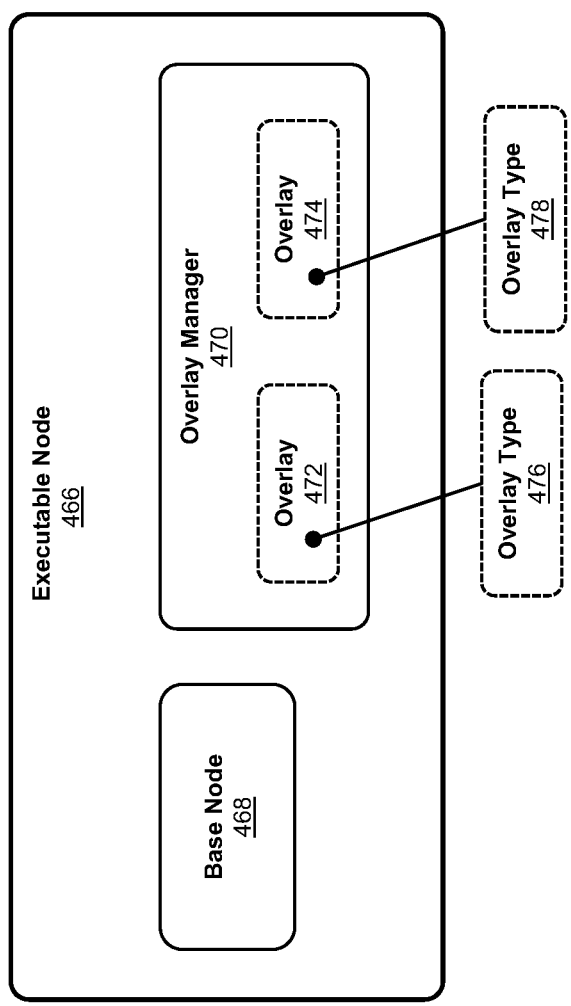

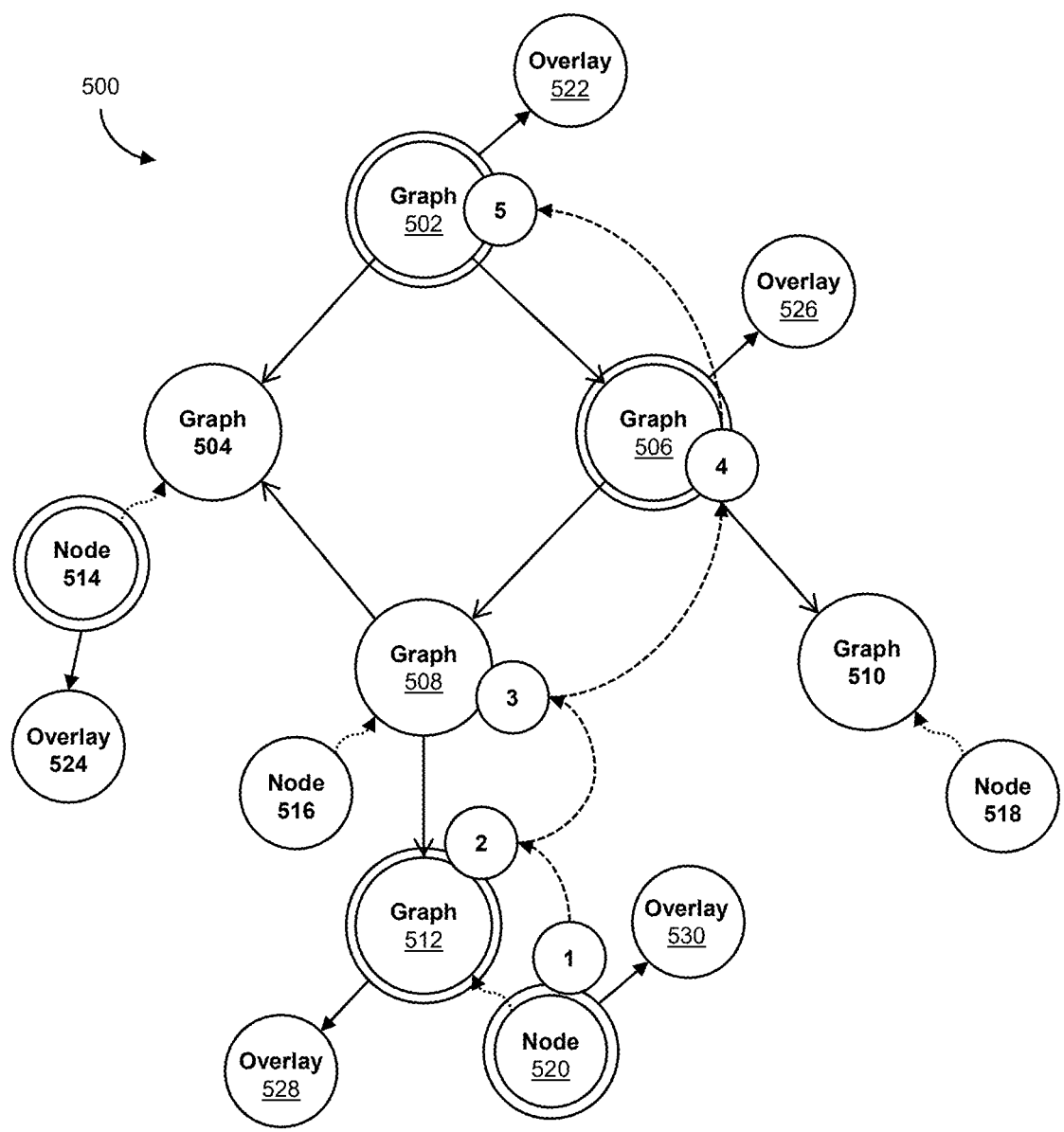
FIGURE 5B (Amended)

SYSTEMS AND METHODS FOR SUB-GRAPH PROCESSING IN EXECUTABLE GRAPH-BASED MODELS

RELATED APPLICATIONS

The present application claims priority to U.S. Patent Application Ser. No. 63/442,682, filed Feb. 1, 2023, and U.S. Patent Application Ser. No. 63/448,718, filed Feb. 28, 2023, which are incorporated herein by reference in their entirety.

TECHNICAL FIELD

The present disclosure relates to executable graph-based models. Particularly, but not exclusively, the present disclosure relates to the hierarchical decomposition of executable graph-based models into sub-graphs. Particularly, but not exclusively, the present disclosure relates to the loading, management, and execution of sub-graphs within executable graph-based models.

BACKGROUND

Modern system designs typically separate data storage from any functional data structure used from a processing logic perspective. This separation often occurs when data is "at rest" or at run-time where the processing system interacts with a copy of the relevant data in the processing space that can be of a different representation. This separation also leads to an impedance mismatch which requires some form of a data management solution to perform the necessary mappings between the two states. As a result of this separate of concerns, the processing logic is typically performed in a separate technology and physical tier (in an n-tier architecture) from the data. This is illustrated in the example n-tier architecture shown in FIG. 1.

The example n-tier architecture 100 comprises a presentation layer 102, a processing logic layer 104, a data access layer 106, and a database layer 108. The presentation layer 102 comprises applications or components which are used to display the outputs of the processing logic layer 104 to a user or users. The processing logic layer 104 comprises applications, components, or services which perform some form of processing on the data obtained from the data access layer 106. The data access layer 106 comprises the applications, components, and/or services which can access the data used by the processing logic layer 104 and stored at the database layer 108. The database layer 108 handles the persistent storage of the data used by the system (e.g., in the form of a relational database, flat file, NoSQL database, graph database, and the like).

The layers of the example n-tier architecture 100 are technically separated. Each layer may utilize a separate set of components to perform specific functionality (e.g., a database management system is used in the database layer 108 whilst an enterprise application is used in the processing logic layer 104). The layers of the n-tier architecture 100 may also be physically separated. For example, the database layer 108 may execute on a remote cloud service, the processing logic layer 104 may execute on a network within an enterprise, and the presentation layer 102 may execute on a user device within the enterprise. While some architectural designs require a clear separation of concerns between data and the use of the data, often the separation enforced by architectures such as that illustrated in FIG. 1 can severely inhibit the flexibility, extensibility, and responsiveness of any system created.

Therefore, there is a need for enhanced architectures which provide improved flexibility, extensibility, and responsiveness thereby providing more efficient data processing systems.

SUMMARY OF DISCLOSURE

According to an aspect of the present disclosure, there is provided a method for dynamic execution of sub-graphs within executable graph-based models. The method comprises obtaining an executable graph-based model comprising a plurality of sub-graphs and an overlay structure comprising processing logic associated with the plurality of sub-graphs, wherein each sub-graph defines a hierarchical structure of related nodes. The method further comprises receiving a stimulus and a context associated with the stimulus, and in response to the stimulus being received, mapping, based on the context, the stimulus to a first sub-graph of the executable graph-based model. The method further comprises causing execution of processing logic within the overlay structure based on the mapping, wherein said processing logic is associated with one or more nodes of the first sub-graph.

According to a further aspect the present disclosure, there is provided a device comprising a display, an interface unit configured to receive one or more user inputs, and processing circuitry operatively coupled to the display and the interface unit. The processing circuitry is configured to obtain an executable graph-based model comprising a first sub-graph and at least one node, wherein the first sub-graph comprises a hierarchical structure of one or more related nodes. The processing circuitry is further configured to display, on the display of the device, a graphical representation of the executable graph-based model, the graphical representation comprising a first display element associated with the first sub-graph and at least one second display element associated with the at least one node, wherein the first display element represents the first sub-graph at a first level of detail. The processing circuitry is further configured to display, on the display of the device, a first selector associated with the first display element, and receive, from the interface unit, a first user input associated with the first selector. In response to the first user input being received, the processing circuitry is configured to replace the first display element of the graphical representation of the executable graph-based model with a third display element whilst maintaining display of the at least one second display element, wherein the third display element represents the first sub-graph at a second level of detail.

According to an additional aspect of the present disclosure there is provided a method for loading of sub-graphs in executable graph-based models. The method comprises obtaining, based on a first identifier, a first manifest state, wherein the first manifest state comprises the first identifier and a second identifier, and obtaining, based on the second identifier, a second manifest state, wherein the second manifest state comprises the second identifier. The method further comprises generating a first manifest from the first manifest state, wherein the first manifest comprises a first node state storage location, the first identifier, and the second identifier. The method further comprises generating a second manifest from the second manifest state, wherein the second manifest comprises a second node state storage location and the second identifier. The method further comprises obtaining a first node state and a second node state from the first node state storage location and the second node state storage location respectively. The method further comprises generating a first node based on the first manifest and the first node state, wherein the first node comprises the first identifier and the second identifier, generating a first graph node based on the second manifest and the second node state, wherein the first graph node comprises the second identifier, and generating a first sub-graph of an executable graph-based model by associating the first node with the first graph node.

BRIEF DESCRIPTION OF FIGURES

Embodiments of the present disclosure will now be described, by way of example only, and with reference to the accompanying drawings, in which:

FIG. 2 shows an executable graph-based model according to an aspect of the present disclosure;

FIG. 4C shows an executable node according to an aspect of the present disclosure;

FIG. 5B illustrates a traversal path for identifying a sub-graph according to embodiments of the present disclosure;

DETAILED DESCRIPTION

Figure 1:
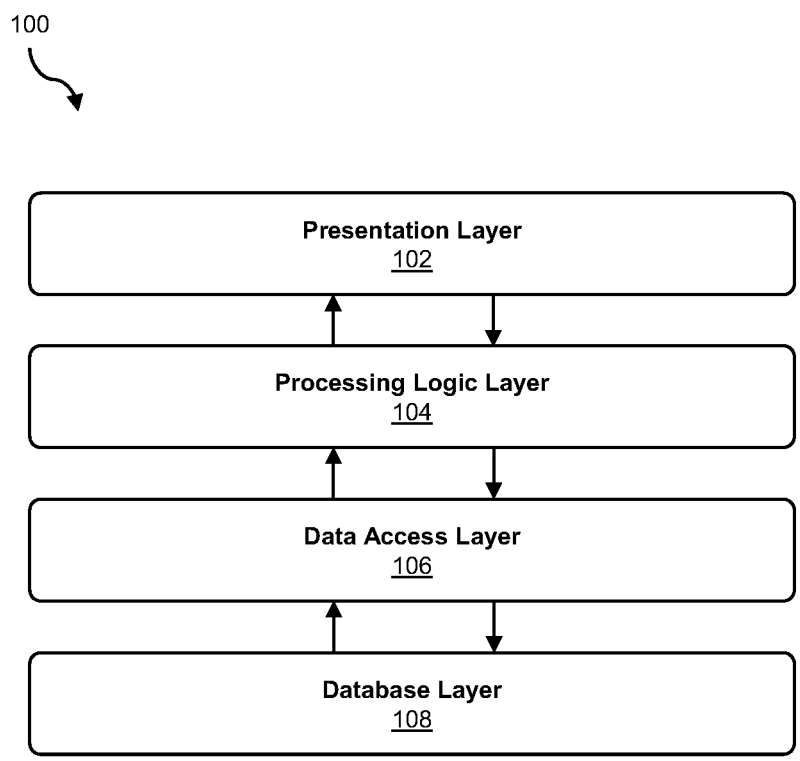
FIG. 1 shows a prior-art n-tier architecture.

Existing architectures, such as that described in relation to FIG. 1 above, maintain a forced technical, and sometimes physical, separation between the processing logic and the data. As previously stated, the technical and physical separation of data and processing logic can be inhibitive to the types of architectural systems that can be created. Furthermore, the complexity of n-tier architectures, and their strict separation of functionality (layers), can severely impact system real-time processing performance. This, in turn, leads to processing delays or latency which reduces the applicability of such architectures being used in time-critical application settings such as medical devices, autonomous vehicles, and real-time control systems. In addition, the central storage of all data within a single database or database layer (e.g., the database layer 108 show in FIG. 1) restricts the ways in which a user may access, maintain, and manage their personal data stored by an enterprise within the single database or database layer.

The present disclosure is directed to the decomposition of executable graph-based models into any level of reusable sub-graph structure. Executable graph-based models dynamically combine data and data processing functionality at run-time whilst their separability may be maintained when at rest. This is illustrated in FIG. 2.

FIG. 2 illustrates an executable graph-based model 202 according to an aspect of the present disclosure.

The executable graph-based model 202 is generally formed of a data structure (i.e., a graph-based model, or graphical model) comprising a plurality of nodes 204-08 which can be functionally extended with processing logic via the use overlays 210, 212. Each overlay comprises processing logic, such as processing logic 214 and 216 which are associated with overlays 210 and 212 respectively. At run-time, data such as data 218, 220 is associated with nodes within the executable graph-based model 202 and the overlays 210, 212 provide the functionality to respond to stimuli an interact with, manipulate, or otherwise process the data. As such, the structure and functionality of the data processing is separate from the data itself when offline (or at rest) and is combined dynamically at run-time.

As such, the executable graph-based model 202 maintains separability of the data and the data processing logic when offline thereby allowing the data owner to maintain control over their data. Moreover, by integrating the data and the data processing logic within a single model, processing delays or latency are reduced because the data and the processing logic exist within the same logical system. Therefore, the executable graph-based model 202 is applicable to a range of time-critical systems where efficient processing of stimuli is required.

Whilst executable graph-based models such as that shown in FIG. 2 provide a comprehensive solution architecture to real-time in-situ processing of logic with data, they utilize a single graph to define the problem space. As will be described in more detail below, the present disclosure is directed to constructing such graphs using a composition of smaller graph structures (sub-graphs) that can then be re-used and dynamically loaded and executed.

Figure 3:
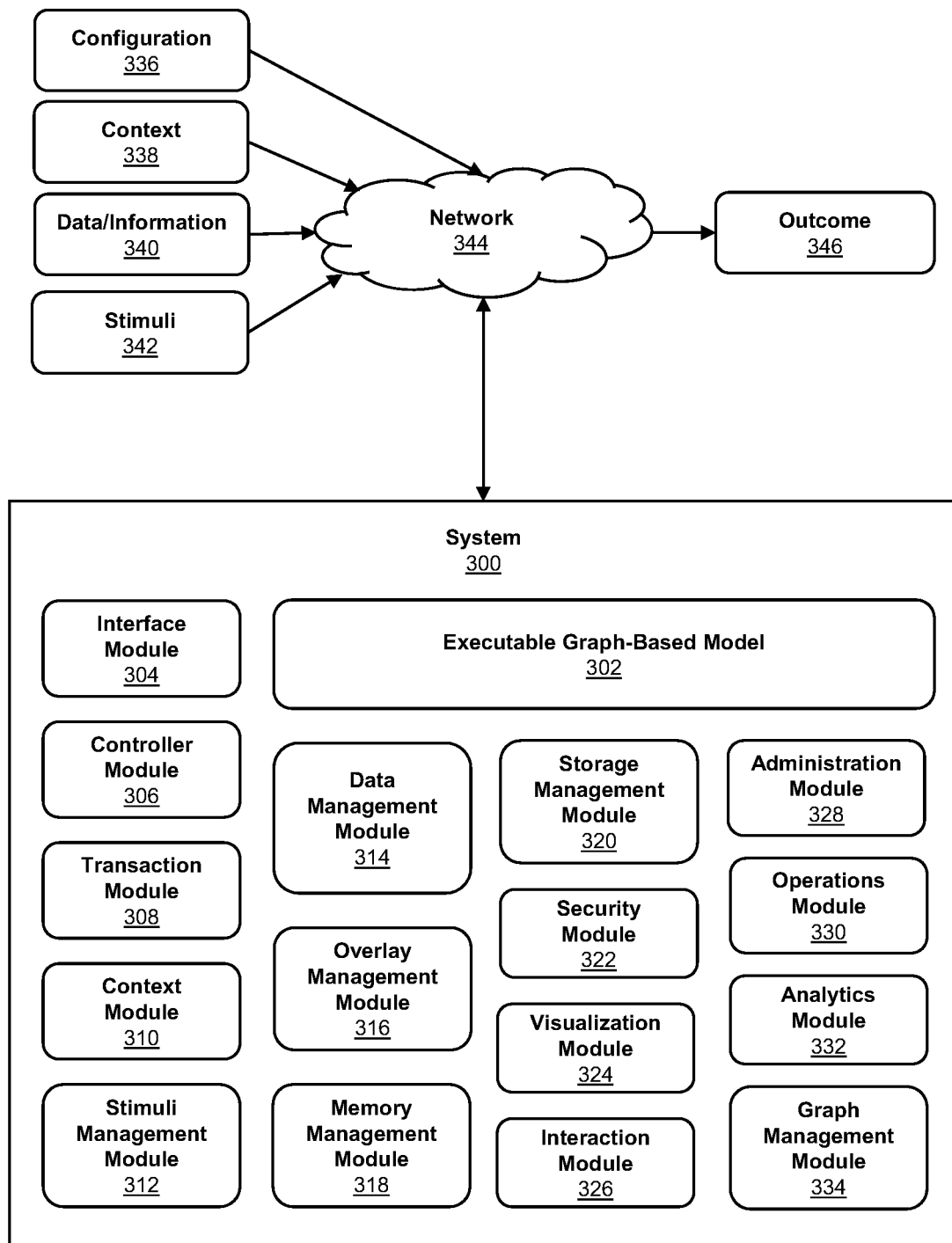
FIG. 3 shows a system for executable graph-based models according to an aspect of the present disclosure.

FIG. 3 shows a system 300 for execution, management, and configuration of executable graph-based models which include sub-graphs according to an aspect of the present disclosure.

The system 300 comprises an executable graph-based model 302 as described in brief above in relation to FIG. 2. The system 300 further comprises an interface module 304, a controller module 306, a transaction module 308, a context module 310, a stimuli management module 312, a data management module 314, an overlay management module 316, a memory management module 318, a storage management module 320, a security module 322, a visualization module 324, an interaction module 326, an administration module 328, an operations module 330, an analytics module 332, and a graph management module 334. FIG. 3 further shows a configuration 336, a context 338, data 340, stimuli 342, a network 344, and an outcome 346.

The skilled person will appreciate that the present description of the system 300 is not intended to be limiting, and the system 300 can include, or interface with, further modules not expressly described herein. Moreover, the functionality of two or more of the modules can be combined within a single module. Conversely, the functionality of a single module can be split into two or more further modules which can be executed on two or more devices. The modules described below in relation to the system 300 can operate in a parallel, distributed, or networked fashion. The system 300 can be implemented in software, hardware, or a combination of both software and hardware. Examples of suitable hardware modules include, a general-purpose processor, a field programmable gate array (FPGA), and/or an application specific integrated circuit (ASIC). Software modules can be expressed in a variety of software languages such as C, C++, Java, Ruby, Visual Basic, Python, and/or other object-oriented, procedural, or other programming language.

The executable graph-based model 302 corresponds to the application specific combination of data and processing functionality which is manipulated, processed, and/or otherwise handled by the other modules within the system 300. As stated above, the structure and functionality of the data processing is separate from the data itself when offline (or at rest) and is combined dynamically at run-time. As such, different executable graph-based models are utilized for different application areas and problem domains. The skilled person will appreciate that whilst only one executable graph-based model 302 is shown in FIG. 3, in some embodiments a system stores and maintains more than one executable graph-based model.

All elements within the executable graph-based model 302 (both the data and the data processing functionality) are nodes. As will be described in more detail in relation to FIG. 4A below, a node forms the fundamental building block of all executable graph-based models. As such, the executable graph-based model 302 comprises one or more nodes which can be dynamically generated, extended, or processed by one or more other modules within the system 300 (e.g., by the data management module 314 and/or the overlay management module 316).

The interface module 304 provides a common interface between internal components of the system 300 and/or external sources. The interface module 304 provides an application programmable interface ("API"), scripting interface, or any other suitable mechanism for interfacing externally or internally with any module of the system 300. In the example shown in FIG. 3, the configuration 336, the context 338, the data 340, and the stimuli 342 are received by the interface module 304 of the system 300 via the network 344. Similarly, outputs produced by the system 300, such as the outcome 346, are passed by the interface module 304 to the network 344 for consumption or processing by external systems. In one embodiment, the interface module 304 supports one or more messaging patterns or protocols such as the Simple Object Access protocol (SOAP), the REST protocol, and the like. The interface module 304 thus allows the system 300 to be deployed in any number of application areas, operational environments, or architecture deployments. Although not illustrated in FIG. 3, the interface module 304 is communicatively coupled (i.e., connected either directly or indirectly) to one or more other modules or elements within the system 300 such as the controller module 306, the context module 310, the executable graph-based model 302 and the like. In one embodiment, the interface module 304 is communicatively coupled (i.e., connected either directly or indirectly) to one or more overlays within the executable graph-based model 302.

The controller module 306 handles and processes interactions and executions within the system 300. As will be described in more detail below, stimuli (and their associated contexts) provide the basis for all interactions within the executable graph-based model 302. Processing of such stimuli may lead to execution of processing logic associated with one or more overlays within the executable graph-based model 302. The processing of a stimulus within the system 300 may be referred to as a system transaction. The processing and execution of stimuli (and associated overlay execution) within the system 300 is handled by the controller module 306. The controller module 306 manages all received input stimuli (e.g., the stimuli 342) and processes them based on a corresponding context (e.g., the context 338). The context associated with a stimulus determines the priority that is assigned to processing the stimulus by the controller module 306. This allows each stimulus to be configured with a level of importance and prioritization within the system 300.

The controller module 306 maintains the integrity of the modules within the system 300 before, during, and after a system transaction. The transaction module 308, which is associated with the controller module 306, is responsible for maintaining integrity of the system 300 through the lifecycle of a transaction. Maintaining system integrity via the controller module 306 and the transaction module 308 allows a transaction to be rolled back in the event of an expected or unexpected software or hardware fault or failure. The controller module 306 is configured to handle the processing of stimuli and transactions through architectures such as parallel processing, grid computing, priority queue techniques, and the like. In one embodiment, the controller module 306 and the transaction module 308 are communicatively coupled (i.e., connected either directly or indirectly) to one or more overlays within the executable graph-based model 302.

As stated briefly above, the system 300 utilizes a context-driven architecture whereby a stimulus within the system 300 is associated with a context which is used to adapt the handling or processing of the stimulus by the system 300. The context module 310 manages the handling of contexts within the system 300 and is responsible for processing any received contexts (e.g., the context 338) and translating the received context to an operation execution context. In some examples, the operation execution context is larger than the received context because the context module 310 supplements the received context with further information necessary for the processing of the received context. The context module 310 passes the operational execution context to one or more other modules within the system 300 to drive the execution of the stimulus associated with the operational execution context. Contexts within the system 300 can be external or internal. While some contexts apply to all application areas and problem spaces, some applications may require specific contexts to be generated and used to process received stimuli. As will be described in more detail below, the executable graph-based model 302 is configurable (e.g., via the configuration 336) so as only to execute within a given execution context for a given stimulus.

The stimuli management module 312 processes externally received stimuli (e.g., the stimuli 342) and any stimuli generated internally from any module within the system 300. The stimuli management module 312 is communicatively coupled (i.e., connected either directly or indirectly) to one or more overlays within the executable graph-based model 302 to facilitate processing of stimuli within the executable graph-based model 302. The system 300 utilizes different types of stimuli such as a command (e.g., a transactional request), a query, or an event received from an external system such as an Internet-of-Things (IoT) device. As previously stated, a stimulus can be either externally or internally generated. For example, a stimulus can be an event internally triggered (generated) from any of the modules within the system 300. Such internal stimuli indicate that something has happened within the system 300 such that subsequent handling by one or more other modules within the system 300 may be required. Internal stimuli can also be triggered (generated) from execution of processing logic associated with overlays within the executable graph-based model 302. The stimuli management module 312 communicates and receives stimuli in real-time or near-real-time. In some examples, stimuli are scheduled in a batch process. The stimuli management module 312 utilizes any suitable synchronous or asynchronous communication architectures or approaches in communicating the stimuli (along with associated information). All stimuli within the system 300 are received and processed (along with a corresponding context) by the stimuli management module 312, which then determines the processing steps to be performed. In one embodiment, the stimuli management module 312 processes the received stimuli in accordance with a predetermined configuration (e.g., the configuration 336) or dynamically determines what processing needs to be performed based on the contexts associated with the stimuli and/or based on the state of the executable graph-based model 302. In some examples, processing of a stimulus results in one or more outcomes being generated (e.g., the outcome 346). Such outcomes are either handled internally by one or more modules in the system 300 or communicated via the interface module 304 as an external outcome. In one embodiment, all stimuli and corresponding outcomes are recorded for auditing and post-processing purposes (e.g., by the operations module 330 and/or the analytics module 332).

The data management module 314 manages all data or information within the system 300 (e.g., the data 340) for a given application. Operations performed by the data management module 314 include data loading, data unloading, data modelling, and data processing. The data management module 314 is communicatively coupled (i.e., connected either directly or indirectly) to one or more other modules within the system 300 to complete some or all of these operations. For example, data storage is handled in conjunction with the storage management module 320 (as described in more detail below).

The overlay management module 316 manages all overlays within the system 300. Operations performed by the overlay management module 316 includes overlay and overlay structure modelling, overlay logic creation and execution, and overlay loading and unloading (within the executable graph-based model 302). The overlay management module 316 is communicatively coupled (i.e., connected either directly or indirectly) to one or more other modules within the system 300 to complete some or all of these operations. For example, overlays can be persisted in some form of physical storage using the storage management module 320 (as described in more detail below). As a further example, overlays can be compiled and preloaded into memory via the memory management module 318 for faster run-time execution. The design and functionality of overlays is discussed in greater detail in relation to FIG. 4A below.

The memory management module 318 is configured to manage and optimize the memory usage of the system 300. The memory management module 318 thus helps to improve the responsiveness and efficiency of the processing performed by one or more of the modules within the system 300 by optimizing the memory handling performed by these modules. The memory management module 318 uses direct memory or some form of distributed memory management architecture (e.g., a local or remote caching solution). Additionally, or alternatively, the memory management module 318 deploys multiple different types of memory management architectures and solutions. (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 336) independently to the requirements for one or more of modules of the system 300. For example, data priority and an eviction strategy, such as least-frequently-used ("LFU") or least-recently-used ("LRU"), can be configured for all or parts of the executable graph-based model 302. In one embodiment, the memory management module 318 is communicatively coupled (i.e., connected either directly or indirectly) to one or more overlays within the executable graph-based model 302.

The storage management module 320 manages the temporary or permanent storage of data within the system 300. The storage management module 320 is any suitable low-level storage device solution (such as a file system) or any suitable high-level storage technology such as another database technology (e.g., relational database management system (RDBMS) or NoSQL database). The storage management module 320 is directly connected to the storage device upon which the relevant data is persistently stored. For example, the storage management module 320 can directly address the computer readable medium (e.g., hard disk drive, external disk drive, or the like) upon which the data is being read or written. Alternatively, the storage management module 320 is connected to the storage device via a network such as the network 344 shown in FIG. 3. As will be described in more detail below in relation to FIGS. 13 and 14, the storage management module 320 uses "manifests" to manage the interactions between the storage device and the modules within the system 300. In one embodiment, the storage management module 320 is communicatively coupled (i.e., connected either directly or indirectly) to one or more overlays within the executable graph-based model 302.

The security module 322 manages the security of the system 300. This includes the security at a system level and at a module level. Security is hardware related, network related, or software related, depending on the operational environment, the architecture of the deployment, or the data and information contained within the system 300. For example, if the system is deployed with a web-accessible API (as described above in relation to the interface module 304), then the security module 322 can enforce a hypertext transfer protocol secure (HTTPS) protocol with the necessary certification. As a further example, if the data or information received or processed by the system 300 contains Personally Identifiable Information (PII) or Protected Health Information (PHI), then the security module 322 can implement one or more layers of data protection to ensure that the PII or PHI are correctly processed and stored. In an additional example, in implementations whereby the system 300 operates on United States of America citizen medical data, the security module 322 can enforce additional protections or policies as defined by the United States Health Insurance Portability and Accountability Act (HIPAA). Similarly, if the system 300 is deployed in the European Union (EU), the security module 322 can enforce additional protections or policies to ensure that the data processed and maintained by the system 300 complies with the General Data Protection Regulation ("GDPR"). In one embodiment, the security module 322 is communicatively coupled (i.e., connected either directly or indirectly) to one or more overlays within the executable graph-based model 302 thereby directly connecting security execution to the data/information in the executable graph-based model 302. The security module 322 thus acts as a centralized coordinator working in conjunction with the data management module 314 and overlay management module 316 for managing and executing security-based overlays.

The visualization module 324 and the interaction module 326 facilitate display and interaction of the executable graph-based model 302 and other parts of the system 300. As described in more detail below in relation to FIGS. 8A-8E, the visualization module 324 provides one or more displays, or visualizations, of the executable graph-based model 302 for review by a user of the system 300, whilst the interaction module 326 processes user interactions (e.g., inputs, commands, etc.) with the displays, or visualizations, and/or any other module within the system 300. The visualization module 324 and the interaction module 326 provide complex interactions capabilities such as standard two- and three-dimensional device interactions using a personal computer or mobile device and their attachable peripherals (e.g., keyboard, mouse, screen, etc.). Additionally, or alternatively, visualization module 324 and the interaction module 326 provide more advanced multi-dimensional user and visualization experiences such as virtual reality ("VR") or augmented reality ("AR") solutions. In one embodiment, the visualization module 324 and the interaction module 326 are communicatively coupled (i.e., connected either directly or indirectly) to one or more overlays within the executable graph-based model 302.

The administration module 328 manages all configurable aspects of the system 300 and the associated modules therein. Configuration is either directly embedded within the modules of the system 300 (for example, via hardware, bios, or other systems settings that are preset in the manufacturing process or software development and installation processes) or provided as dynamic configurations (e.g., via the configuration 336). Such dynamic configurations are controllable and changeable by an end-user with the appropriate administrative privileges. In one embodiment, the degree of administrative privileges associated with an end-user are contained within a received context (e.g., the context 338). Here, the end-user is a person connected to the administration module 328 via the interface module 304 or a system user directly connected to the administration module 328. In one embodiment, the administration module 328 provides read-only access to all configuration settings or allows some (or all) of the configuration settings to be changed by specific user groups defined in the administration module 328 (e.g., all users associated with a user group having sufficient access privileges). In embodiments where configurations are pre-set or predetermined, the administration module 328 provides capabilities to reset or return the system 300 to its initial state or "factory settings". In one embodiment, the administration module 328 is communicatively coupled (i.e., connected either directly or indirectly) to one or more overlays within the executable graph-based model 302.

The operations module 330 tracks operational metrics, module behavior, and the system 300. Operational metrics tracked by the operations module 330 include the running status of each module, the operating performance of transactions performed, and any other associated metrics to help determine the compliance of the entire system, or any module thereof, in relation to non-functional requirements. In one embodiment, the operations module 330 is communicatively coupled (i.e., connected either directly or indirectly) to one or more overlays within the executable graph-based model 302.

The analytics module 332 performs any analytical processing required by the modules within the system 300. The analytics module 332 processes any data embedded, or overlay contained, within the executable graph-based model 302 or created separately by the system 300 (e.g., the operation metrics produced by the operations module 330). As such, the analytics module 332 is communicatively coupled (i.e., connected either directly or indirectly) to one or more nodes and/or one or more overlays within the executable graph-based model 302.

The graph management module 334 performs operations relating to sub-graphs within the executable graph-based model 302. As will be described in more detail below, the use of sub-graphs allows an executable graph-based model to be restructured into lower-level structural sub-graphs. At a general level, a sub-graph can be considered a hierarchically structured collection of nodes which are related in some manner (e.g., the nodes within the sub-graph are semantically related). Sub-graphs thus provide a mechanism for reusability of common data structures and/or functionality and can be more closely aligned to any contextualized stimuli received. The graph management module 334 manages all interactions between the executable graph-based model(s) and associated sub-graphs. The graph management module 334 controls the loading and unloading of these sub-graphs (which represent a portion of the executable graph-based model 302) at run-time based on received stimuli. That is, sub-graphs within an executable graph-based model can be dynamically loaded, executed, and/or unloaded "on demand" thereby allowing the compute and memory requirements of the executable graph-based model to be efficiently managed (i.e., by avoiding the need for all sub-graphs to be held in memory at all times during run-time). The graph management module 334 is communicatively coupled (i.e., connected either directly or indirectly) to one or more nodes and/or one or more overlays within the executable graph-based model 302.

Having now described the system 300 for executing and managing executable graph-based models, the description will now turn to the elements of an executable graph-based model; specifically, the concepts of a node and a sub-graph. Unlike conventional graph-based systems, all objects (e.g., data, overlays, etc.) within the executable graph-based model (e.g., the executable graph-based model 302) are implemented as nodes. As will become clear, this allows executable graph-based models to be flexible, extensible, and highly configurable. Moreover, the structural organization of nodes into one or more sub-graphs provides an efficient and extensible mechanism for managing and executing executable graph-based models.

Figure 4A:
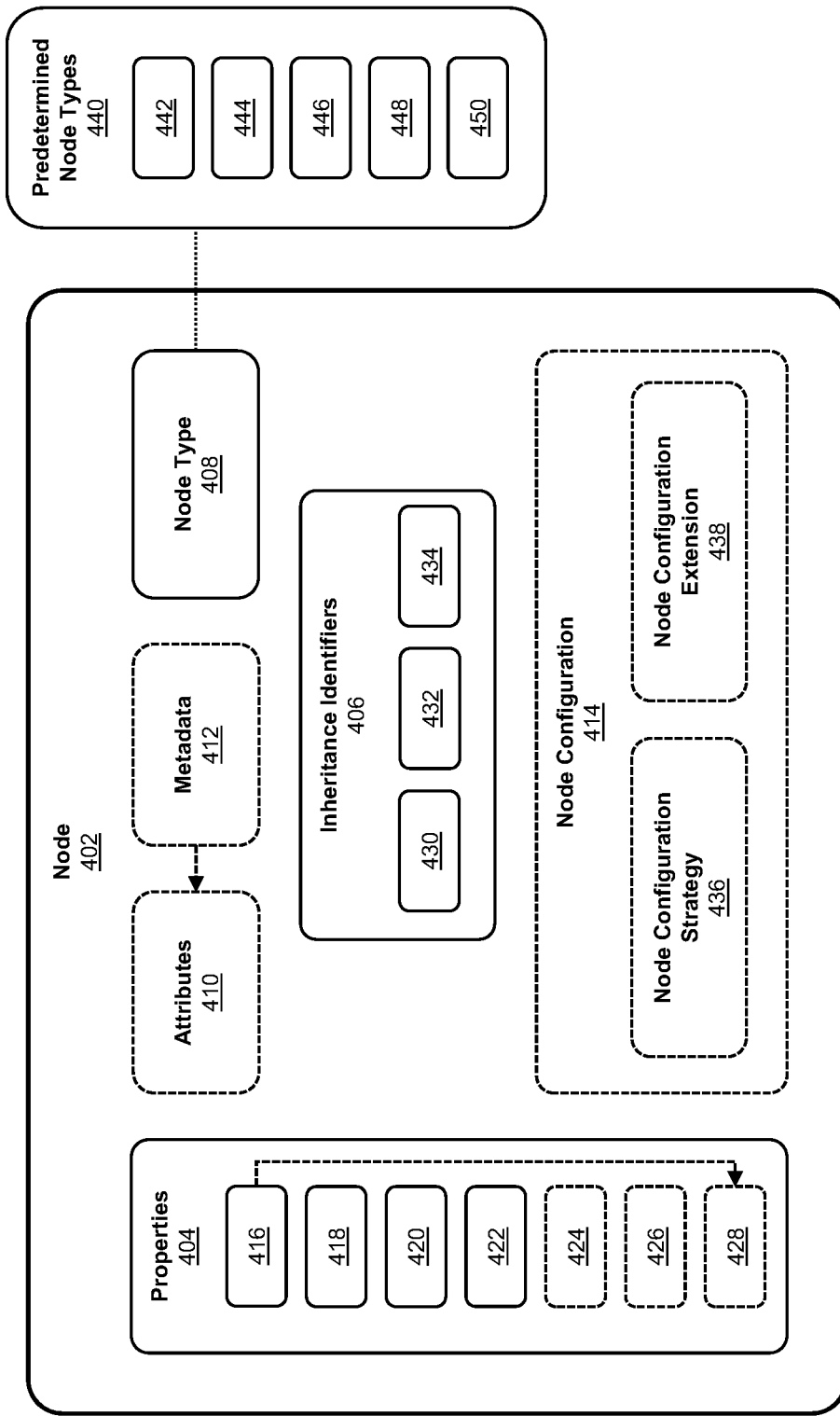
FIG. 4A shows the general structure of a node within an executable graph-based model according to an aspect of the present disclosure.

FIG. 4A shows the general structure of a node 402 within an executable graph-based model, such as the executable graph-based model 302 shown in FIG. 3, according to an aspect of the present disclosure.

FIG. 4A shows a node 402 which corresponds to the core structure of an executable graph-based model (e.g., the executable graph-based model 302 shown in the system 300 of FIG. 3) and which forms the foundational building block for all data and data processing logic within the executable graph-based model. The node 402 comprises properties 404, inheritance identifiers 406, and node type 408. The node 402 optionally comprises one or more attributes 410, metadata 412, a node configuration 414. The properties 404 of the node 402 include a unique identifier 416, a version identifier 418, a namespace 420, and a name 422. The properties 404 optionally include one or more icons 424, one or more labels 426, and one or more alternative identifiers 428. The inheritance identifiers 406 of the node 402 comprise an abstract flag 430, a leaf flag 432, and a root flag 434. The node configuration 414 optionally comprises one or more node configuration strategies 436 and one or more node configuration extensions 438. FIG. 4A further shows a plurality of predetermined node types 440 which include an edge node type 442, a role node type 444, a leaf graph node type 446, a composite graph node type 448, and an overlay node type 450. The plurality of predetermined node type 440 further include a data node type (not shown) and a value node type (not shown).

The unique identifier 416 is unique for each node within an executable graph-based model. The unique identifier 416 is used to register, manage, and reference the node 402 within the system (e.g., the system 300 of FIG. 3). In some embodiments, the one or more alternative identifiers 428 are associated with the unique identifier 416 to help manage communications and connections with external systems (e.g., during configuration, sending stimuli, or receiving outcomes). The version identifier 418 of the node 402 is incremented when the node 402 undergoes transactional change. This allows the historical changes between versions of the node 402 to be tracked by modules or overlays within the system. The namespace 420 of the node 402, along with the name 422 of the node 402, is used to help organize nodes within the executable graph-based model. That is, the node 402 is assigned a unique name 422 within the namespace 420 such that the name 422 of the node 402 need not be unique within the entire executable graph-based model, only within the context of the namespace 420 to which the node 402 is assigned.

The node 402 optionally comprises one or more icons 424 which are used to provide a visual representation of the node 402 when visualized (e.g., by the visualization module 324 of the system 300 shown in FIG. 3). The one or more icons 424 can include icons at different resolutions and display contexts such that the visualization of the node is adapted to different display settings and contexts. The node 402 also optionally comprises one or more labels 426 which are used to override the name 422 when the node is rendered or visualized.

The node 402 supports the software development feature of multiple inheritance by maintaining references (not shown) to zero or more other nodes, which then act as the base of the node 402. This allows the behavior and functionality of a node to be extended or derived from one or more other nodes within an executable graph-based model. The inheritance identifiers 406 of the node 402 provide an indication of the inheritance-based information, which is applicable, or can be applicable, to the node 402. The inheritance identifiers 406 comprise a set of Boolean flags which identify the inheritance structure of the node 402. The abstract flag 430 of the inheritance identifiers 406 allows the node 402 to support the construct of abstraction. When the abstract flag 430 takes a value of "true", the node 402 is flagged as abstract meaning that it cannot be instantiated or created within an executable graph-based model. Thus, a node having the abstract flag 430 set to "true" can only form the foundation of another node that inherits from it. By default, the abstract flag 430 of a node is set to "false". The leaf flag 432 of the inheritance identifiers 406 is used to indicate whether any other node can inherit from the node 402. If the leaf flag 432 is set to "true", then no other node can inherit from the node 402 (but unlike an abstract node, a node with a leaf flag set can still be instantiated and created within an executable graph-based model). The root flag 434 of the inheritance identifiers 406 is used to indicate whether the node 402 inherits from any other node. If the root flag 434 is set to "true", then the node 402 does not inherit from any other node. The node 402 is flagged as leaf (i.e., the leaf flag 432 is set to "true") and/or root (i.e., the root flag 434 is set to "true"), or neither (i.e., both the leaf flag 432 and the root flag 434 are set to "false"). The skilled person will appreciate that a node cannot be flagged as both abstract and leaf (i.e., the abstract flag 430 cannot be set to "true" whilst the leaf flag 432 is set to "true").

As stated above, all elements of the executable graph-based model are defined as nodes. This functionality is in part realized due to the use of a node type. The node type 408 of the node 402 is used to extend the functionality of the node 402. All nodes within an executable graph-based model comprise a node type which defines additional data structures and implements additional executable functionality. A node type thus comprises data structures and functionality that is common across all nodes which share that node type. The composition of a node with a node type therefore improves extensibility by allowing the generation of specialized node functionalities for specific application areas. Such extensibility is not present in prior art graph-based models. As illustrated in FIG. 4A, the node 402 and the node type 408 are one logical unit which are not separated in the context of an executing system at run-time (i.e., in the context of execution of an executable graph-based model).

FIG. 4A shows the plurality of predetermined node types 440 which provides a non-exhaustive list of node types which can be associated with a node, such as the node 402. Node types include a data node type (not shown in FIG. 4A), an edge node type 442, a role node type 444, a leaf graph node type 446, a composite graph node type 448, and an overlay node type 450.

The data node type (also referred to as a vertex or vertex node type) comprises common data structure and functionality related to the "things" modelled in the graph—i.e., the data.

The edge node type 442 comprises common data structures and functionality related to joining two or more nodes. A node having the edge node type 442 can connect two or more nodes and thus the edge node type 442 constructs associations and connections between nodes (for example objects or "things") within the executable graph-based model. The edge node type 442 is not restricted to the number of nodes that can be associated or connected by a node having the edge node type 442. The data structures and functionality of the edge node type 442 thus define a hyper-edge which allows two or more nodes to be connected through a defined set of roles. As will be described in more detail below, a role which defines a connective relationship involving an edge is either a (standard) role, as is known within standard hyper-graph theory such that the role merely defines a connection between the edge and another node, or the role is a node having the role node type 444. These concepts are illustrated in FIG. 4B described below.

Figure 4B:
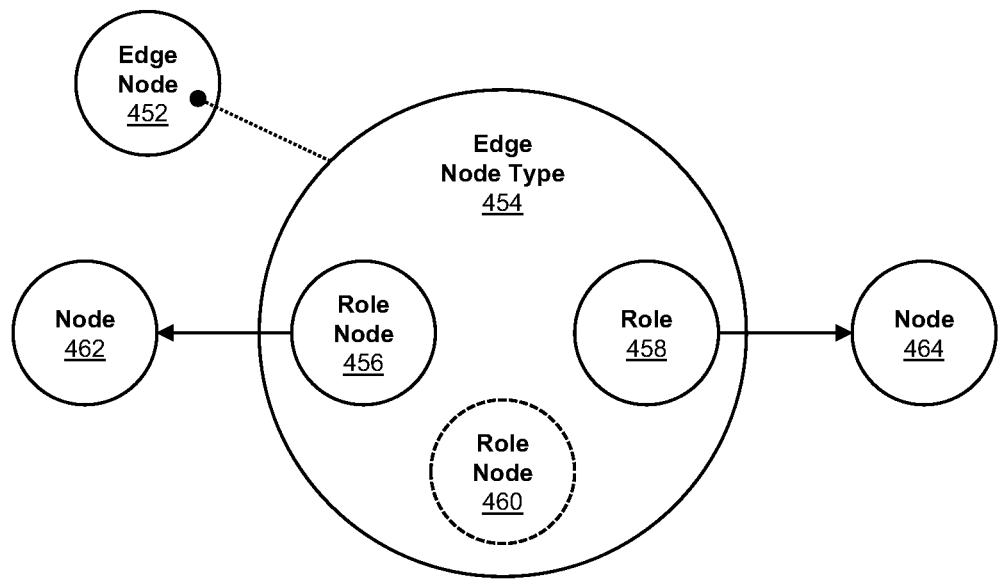
FIG. 4B illustrates a hyper-edge according to an embodiment of the present disclosure.

FIG. 4B illustrates the concept of a hyper-edge connecting two or more nodes through a defined set of roles according to an embodiment of the present disclosure.

FIG. 4B shows a simplified representation of an edge node 452 which comprises an edge node type 454 (within the context of the example shown in FIG. 4A, the edge node 452 corresponds to the node 402 where the node type 408 is the edge node type 442). The edge node type 454 comprises a plurality of roles which each define a connective relationship involving the edge node 452, e.g., a connective relationship between the edge node 452 and another node. The plurality of roles of the edge node type 454 comprises a first role node 456 and a role 458. The plurality of roles optionally comprises a further role in the form of a second role node 460. The first role node 456 is a node having a role node type (i.e., the role node type 444 shown in FIG. 4A) and defines a connective relationship between the edge node 452 and a first node 462. The role 458 defines a connective relationship between the edge node 452 and a second node 464. The second role node 460 is a node having the role node type and defines a relationship without expressly defining the node to which the edge connects. Whilst the example in FIG. 4B shows the edge node type 454 having two, or even three, roles, the number of roles (and thus the number of connections) that an edge node type can have is not so limited.

As stated above, a role defines a connective relationship involving the edge node 452 (via the edge node type 454) and can be either a (standard) role, such as the role 458, or a role node, such as the first role node 456 or the second role node 460. The standard role simply defines a connective relationship between an edge node and another node. Thus, in the example shown in FIG. 4B, the role 458 defines the connection between the edge node 452 and the second node 464 (via the edge node type 454). A role node is a node having a role node type (i.e., the role node type 444 shown in FIG. 4A) and, like the (standard) role, defines a connective relationship involving an edge. However, because a role node is a node, a role node gains the capabilities, functionality, and extensibility of a node (as described in relation to FIG. 4A). A role node thus describes a potentially more complex connective relationship than a (standard) role. In the example shown in FIG. 4B, the first role node 456 defines a connective relationship between the edge node 452 and the first node 462 (via the edge node type 454). Beneficially, by utilizing the first role node 456 to define the connective relationship between the edge node 452 and the first node 462 the capabilities afforded to a node are provided to the first role node 456. For example, and as will be described in more detail below, one or more overlay nodes can be associated with a role node to imbue the role node with processing logic thus allowing the role node to process data, respond to stimuli, etc. Moreover, a role node need not define a connective relationship to a node, as illustrated by the second role node 460. Because the second role node 460 is itself a node, the second role node 460 encompasses the data structures and functionality of a node thereby avoiding the need to define the connecting node directly.

Referring once again to FIG. 4A, the plurality of predetermined node types 440 further comprise the leaf graph node type 446 and the composite graph node type 448. As will be described in more detail in relation to FIG. 4D, the leaf graph node type 446 and the composite graph node type 448 are node types which provide the mechanism and functionality for associating nodes with sub-graphs thereby allowing an executable graph-based model to be structured according to smaller units of data/functionality (i.e., sub-graphs).

The overlay node type 450 is used to extend the functionality of a node, such as the node 402, to incorporate processing logic thereby leading to the generation of an executable node, as will be described in more detail below in relation to FIG. 4C.

The one or more attributes 410 correspond to the data associated with the node 402 (e.g., the data represented by the node 402 within the executable graph-based model as handled by a data management module such as the data management module 314 of the system 300 shown in FIG. 3). Because not all nodes within an executable graph-based model is associated with data, a node need not have any attributes. Each of the one or more attributes 410 are stored in any suitable format such as a data triplet of name, value type, and value.

The node 402 optionally comprises metadata 412 (e.g., data stored as a name, value type, and value triplet) which is associated with either the node 402 or one or more of the one or more attributes 410 of the node 402.

The node configuration 414 provides a high degree of configurability for the different elements of a node. The node configuration 414 optionally comprises one or more node configuration strategies 436 and/or one or more node configuration extensions 438 which are complex data types. An example of a concrete node configuration strategy is an identifier strategy, associated with the configuration of the unique identifier 416 of the node 402, which creates Snowflake identifiers. A further example of a concrete node configuration strategy is a versioning strategy, associated with the configuration of the version identifier 418 of the node 402, which supports major and minor versioning (depending on the type of transactional change incurred by the node 402).

According to an aspect of the present disclosure, the structure and functionality of the node 402 (as described above) can be dynamically extended using the concept of an executable node. As described in relation to FIG. 4C below, an executable node provides processing functionality (i.e., processing logic) for a base node via one or more associated overlay nodes.

FIG. 4C shows an executable node 466 according to an aspect of the present disclosure.

The executable node 466 comprises a base node 468 and an overlay manager 470. The overlay manager 470 registers and maintains one or more overlay nodes associated with the base node 468, such as the first overlay node 472 and the second overlay node 474. The first overlay node 472 has a first overlay node type 476 and the second overlay node 474 has a second overlay node type 478.

The executable node 466 is itself a node; that is, the executable node 466 extends the node 402 (or is a subtype of the node 402) such that all the functionality and properties of the node 402 extend to the executable node 466. The executable node 466 also dynamically extends the functionality of the base node 468 by associating the overlays maintained by the overlay manager 470 with the base node 468. The executable node may thus be considered a composition of a base node and an overlay node and may alternatively be referred to as a node with overlay. For example, the base node 468 may have a data node type associated with a user, and the overlay manager 470 may comprise an encryption overlay which has processing logic that encrypts the attribute values of the base node 468 prior to the values being saved or output from the system. Therefore, the executable node 466 acts as a decorator of the base node 468 adding the functionality of the overlay manager 470 to the base node 468.

The skilled person will appreciate that the base node 468 refers to any suitable node within an executable graph-based model. As such, the base node 468 can be a node having a type such as a data node type, an edge node type, or the like. Alternatively, the base node 468 can itself be an executable node such that the functionality of the base (executable) node 468 is dynamically extended. In this way, complex and powerful processing functionality can be dynamically generated by associating and extending overlay nodes.

The overlay manager 470 registers and maintains one or more overlay nodes associated with the base node 468, such as the first overlay node 472 and the second overlay node 474. The assignment of an overlay node to a base node (via the overlay manager 470) endows the base node with processing logic and executable functionality defined within the overlay node. Extending the functionality of a base node through one or more overlay nodes is at the heart of the dynamic generation of executable graph-based models according to an aspect of the present disclosure. As illustrated in FIG. 2 above, the data (e.g., a data node as represented by the base node 468 in FIG. 4C) and the functionality which acts upon that data (e.g., an overlay node) can be separated and independently maintained offline, but at run-time, an association between the data node and the overlay node is determined and an executable node is generated (e.g., the executable node 466 shown in FIG. 4C).

An overlay node, such as the first overlay node 472 or the second overlay node 474, is a node having an overlay node type (alternatively referred to as an overlay type) assigned to its node type. As shown in FIG. 4C, the first overlay node 472 has the first overlay node type 476 and the second overlay node 474 has the second overlay node type 478. Different overlay node types are used to realize different functionality. Example overlay node types include an encryption overlay node type, an obfuscation overlay node type, an audit overlay node type, a prediction overlay node type, and the like. For example, if the first overlay node type 476 is an obfuscation node type and the second overlay node type 478 is an encryption node type then the functionality of the base node 468 is extended to provide obfuscation and encryption of attribute values of the base node 468. The skilled person will appreciate that the list of overlay types is in no way exhaustive and the number of different overlay types that can be realized is not limited. Because an overlay node is itself a node, all functionality of a node described in relation to the node 402 of FIG. 4A is thus applicable to an overlay node. For example, an overlay node comprises a unique identifier, a name, etc., can have attributes (i.e., an overlay node can have its own data defined), supports multiple inheritance, and can be configured via node configurations. Furthermore, because an overlay node is a node, the overlay node can have one or more overlay nodes associated therewith (i.e., the overlay node is an overlay with overlay node). Moreover, the processing functionality of an overlay node extends to the node type of the node to which the overlay node is applied.

An overlay node, such as the first overlay node 472 or the second overlay node 474, is not bound to a single executable node or a single executable graph-based model (unlike nodes which have non-overlay node types). This allows overlay nodes to be centrally managed and reused across multiple instances of executable graph-based models.

Unlike non-overlay nodes, an overlay node comprises processing logic (not shown in FIG. 4C) which determines the functionality of the overlay node. The processing logic of an overlay node comprises a block of executable code, or instructions, which carries out one or more operations. The block of executable code is pre-compiled code, code which requires interpretation at run-time, or a combination of both. Different overlay nodes provide different processing logic to realize different functionality. For example, an encryption overlay node comprises processing logic to encrypt the data (i.e., attributes) of a data node associated with the encryption overlay node, whilst an auditing overlay node comprises processing logic to record changes to the nodes state of a node associated with the auditing overlay node.

The overlay manager 470 of the executable node 466 is responsible for executing all overlays registered with the overlay manager 470. The overlay manager 470 also coordinates execution of all associated overlay nodes. In the example shown in FIG. 4C, the executable node 466 associates the base node 468 with two overlay nodes—the first overlay node 472 and the second overlay node 474. Thus, the overlay manager 470 employs a strategy to manage the potentially cascading execution flow. Example strategies to manage the cascading execution of overlays include the visitor pattern and the pipe and filter pattern. Further examples include strategies which apply either depth-first or depth-first processing patterns, a prioritization strategy, or a combination therefor. All execution strategies are defined and registered with the overlay manager 470 and are associated with an overlay via a node configuration extension for the overlay.

As stated above in relation to FIG. 4A, a node comprises a node type which is used to extend the functionality of the node. According to an aspect of the present disclosure, specific node types related to graphs are utilized to decompose executable graph-based models into any level of reusable sub-graph structure.

Figure 4D:
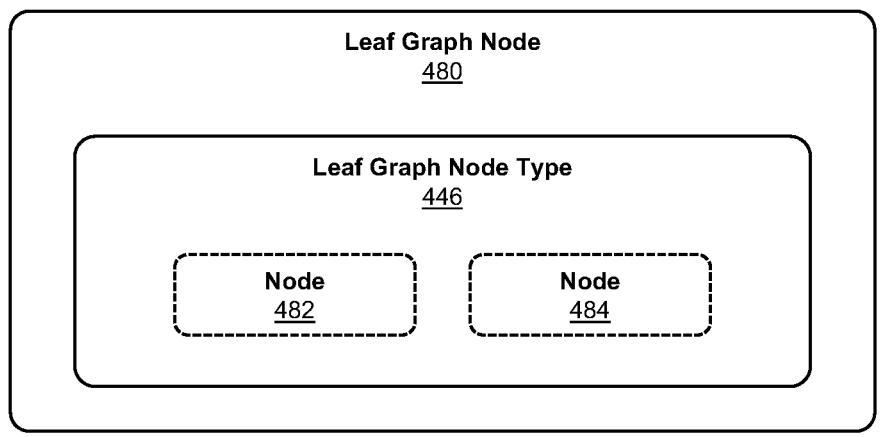
FIG. 4D shows a node having a leaf graph node type according to an aspect of the present disclosure.

FIG. 4D shows a node having a leaf graph node type according to an aspect of the present disclosure.

FIG. 4D shows a leaf graph node 480 which is a node having the leaf graph node type 446. The leaf graph node type 446 encapsulates zero or more nodes such that, in one embodiment, the leaf graph node type 446 comprises a first node 482 and a second node 484.

The leaf graph node 480 corresponds to a node, such as the node 402 shown in FIG. 4A, with a node type (i.e., node type 408) corresponding to the leaf graph node type 446 (as shown in the plurality of predetermined node type 440 in FIG. 4A). As such, the leaf graph node 480 comprises all of the functionality and structure of the node 402 shown in FIG. 4A, but this functionality and structure is not displayed in FIG. 4D for brevity. This means that all leaf graph nodes comprise properties, identifiers, and can comprise metadata, attributes, and specific node configurations. As with any node within an executable graph-based model, leaf graph nodes can also include inheritance relationships. However, graphs also apply restrictions to the inheritance relationships that can exist within an executable graph-based model. For example, a first node within a first graph can inherit from a second node within a second graph if the first graph is a sub-graph of the second graph. However, the first node cannot inherit from the second node if the first graph is a parent graph of the second graph.

The leaf graph node 480 is a leaf node, or terminal node, within the graph or sub-graph in which it exists and thus contains no further graph nodes as children. Therefore, the nodes which the leaf graph node type 446 encapsulates, such as the first node 482 or the second node 484, are nodes which do not have a graph node type (i.e., the nodes do not have a node type of either the leaf graph node type 446 or the composite graph node type 448). However, the first node 482 or the second node 484 may be any other type of node within the executable graph-based model such as a data node, an edge node, an executable node, etc.

Because the leaf graph node 480 is a node, an executable node (or executable graph node) can be generated from the leaf graph node 480 by setting the leaf graph node 480 as the base node of an executable node (e.g., the base node 468 of the executable node 466 shown in FIG. 4C). As will be described in more detail below, when such an executable graph node is loaded, any overlays that are defined by the configuration 414 as applying to the encapsulated nodes are applied not only to the executable leaf graph node but are also cascaded down to the nodes encapsulated by the executable leaf graph node. In the example shown in FIG. 4D, if the leaf graph node 480 is employed as a base node of an executable node and encapsulates the first node 482 and the second node 484, then when the executable node is loaded, the first node 482 and the second node 484 are generated as executable nodes (if not already so defined) and the overlays associated with the overlay manager of the executable node associated with the leaf graph node 480 are registered with the overlay managers of the executable first node and the executable second node.

Figure 4E:
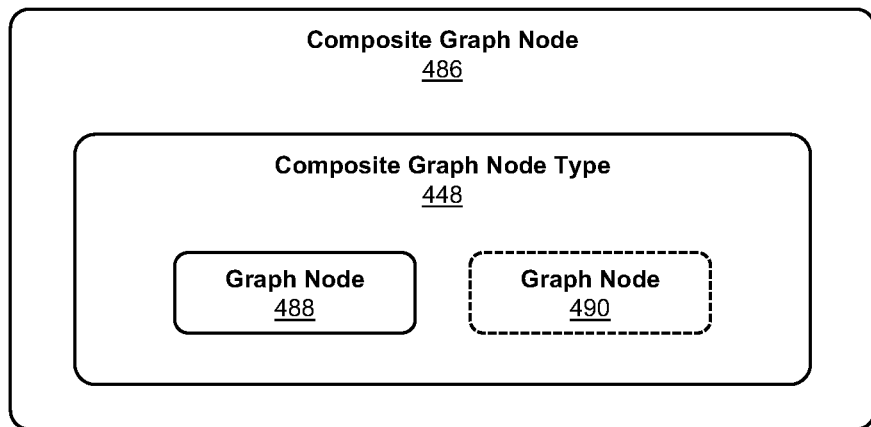
FIG. 4E shows a node having a composite graph node type according to an aspect of the present disclosure.

FIG. 4E shows a node having a composite graph node type according to an aspect of the present disclosure.

FIG. 4E shows a composite graph node 486 which is a node having the composite graph node type 448. The composite graph node type 448 encapsulates a first graph node 488. In one embodiment, the composite graph node type 448 encapsulates a second graph node 490. The first graph node 488 and the second graph node 490 are both nodes having either a node type of either the leaf graph node type 446 or the composite graph node type 448.

The composite graph node 486 corresponds to a node, such as the node 402 shown in FIG. 4A, with a node type (i.e., node type 408) corresponding to the composite graph node type 448 (as shown in the plurality of predetermined node type 440 in FIG. 4A). As such, the composite graph node 486 comprises all of the functionality and structure of the node 402 shown in FIG. 4A, but this functionality and structure is not displayed in FIG. 4E for brevity. This means that all composite graph nodes comprise properties, identifiers, and can comprise metadata, attributes, and specific node configurations. As with any node within an executable graph-based model, composite graph nodes can also include inheritance relationships. However, the restrictions to inheritance relations described above in relation to leaf graph nodes also apply to composite graph nodes.

The composite graph node 486 is a composite node, or non-terminal node, within the graph or sub-graph in which it exists and thus contains one or more further graph nodes as children. Therefore, the nodes which the composite graph node type 448 encapsulates, such as the first graph node 488, are nodes which have either the leaf graph node type 446 or the composite graph node type 448. Although not shown in FIG. 4E, in embodiments, the composite graph node 486 also encapsulates one or more non-graph nodes as children (i.e., nodes having a node type which is not either the leaf graph node type 446 or the composite graph node type 448).

Because the composite graph node 486 is a node, an executable node (or executable graph node) can be generated from the composite graph node 486 by setting the composite graph node 486 as the base node of an executable node (e.g., the base node 468 of the executable node 466 shown in FIG. 4C). As will be described in more detail below, when such an executable graph node is loaded, overlays within the overlay manager of the executable composite graph node are applied—based on the configuration 414 as mentioned above—not only to the executable composite graph node but are also cascaded down to the graph nodes which are children of the executable composite graph node. In the example shown in FIG. 4E, if the composite graph node 486 is employed as a base node of an executable node, then when the executable node is loaded, the first graph node 488 (and optionally the second graph node 490) is generated as an executable graph node (if not already so defined) and the overlays associated with the overlay manager of the executable node associated with the composite graph node 486 are registered with the overlay manager of the executable first graph node (and optionally the executable second graph node).

Having described the structure and function of the node 402 (FIG. 4A), the executable node 466 (FIG. 4C), and the two specific graph node types (FIGS. 4D and 4E), the description will now turn to the composition of such nodes into graphs and sub-graphs.

Figure 5A:
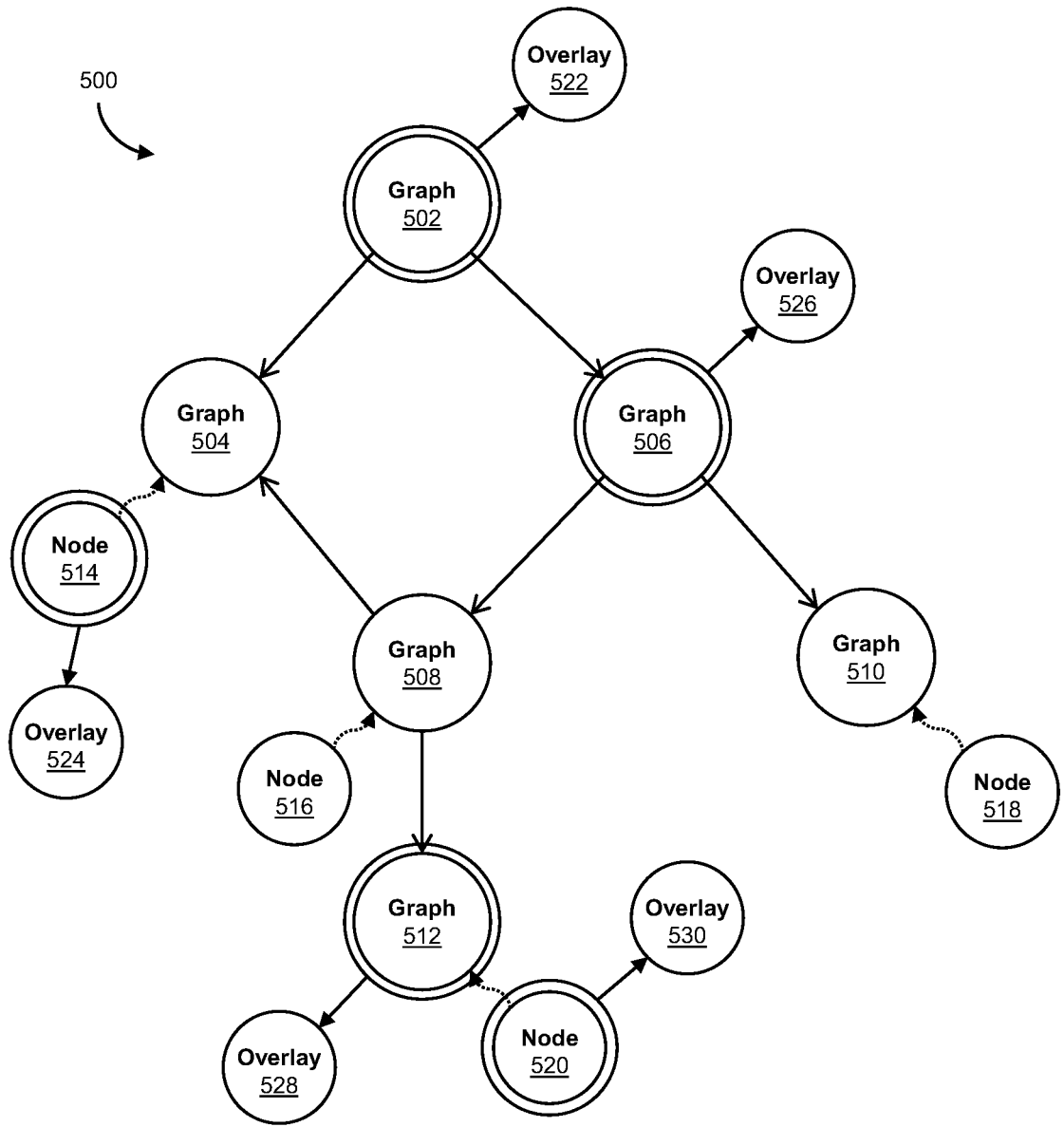
FIG. 5A shows a graph-based model comprising multiple sub-graphs according to an aspect of the present disclosure.

FIG. 5A shows a graph-based model 500 comprising multiple sub-graphs according to an aspect of the present disclosure.

The graph-based model 500 comprises a root graph node 502, a first leaf graph node 504, a first composite graph node 506, a second composite graph node 508, a second leaf graph node 510, and a third leaf graph node 512. A graph-based model 500 composition cannot create a circular dependency between any of the sub-graphs. The graph-based model 500 further comprises a first node 514, a second node 516, a third node 518, and a fourth node 520. The graph-based model 500 comprises an overlay structure comprising the first overlay node 522, a second overlay node 524, a third overlay node 526, a fourth overlay node 528, and a fifth overlay node 530.

The graph-based model 500 is a configured graph or configured graph-based model. That is, the graph-based model 500 defines the data structure and overlay structure from which an executable graph-based model is generated at run-time. The graph-based model 500 comprises a graph composed of six sub-graphs, each defined according to a node within the executable graph-based model. That is, the root graph node 502, the first leaf graph node 504, the first composite graph node 506, the second composite graph node 508, the second leaf graph node 510, and the third leaf graph node 512 all define sub-graphs.

Within the context of the topology of the graph defined by the graph-based model 500, the root graph node 502 is a composite graph node which is a root node (i.e., it has no parent node and is at the highest level within the graph). As such, the sub-graph defined by the root graph node 502 comprises the entire graph (or sub-graph) structure of the graph-based model 500 shown in FIG. 5A. The skilled person will appreciate that the graph defined by the root graph node 502 may be one of a possible plurality of sub-graphs within a larger graph-based model. In many applications, a graph-based model, or an executable graph-based model, will comprise many sub-graphs, such as that shown in FIG. 5A. By grouping nodes into self-contained hierarchical structures (i.e., sub-graphs), these structures can be re-used, loaded on demand, and executed independently thereby improving the efficiency and extensibility of graph-based models and executable graph-based models. Moreover, each of the sub-graphs which form the graph shown in FIG. 5A (e.g., the sub-graph defined by the first leaf graph node 504, the sub-graph defined by the second composite graph node 508, etc.) are self-contained structures which can be loaded, unloaded, executed, etc. independently of the other sub-graphs within the overall structure.

As seen in FIG. 5A, the root graph node 502 is associated with a first overlay node 522. Because the root graph node 502 is a node within the graph-based model 500 having a composite graph node type (as described above in relation to FIG. 4E), an overlay can be associated with the node to form an executable graph node. As such, the root graph node 502 comprises a composition of a graph node (a node with a composite graph node type) and an overlay node. The root graph node 502 is a composite graph node because it comprises, via the use of a composite graph node type, the first leaf graph node 504 and the first composite graph node 506. As such, both the first leaf graph node 504 and the first composite graph node 506 are direct children of the root graph node 502.

The first leaf graph node 504 defines a sub-graph comprising a single node—the first node 514. The first node 514 is an executable node comprising a composition of a node and the second overlay node 524. Within the context of the structure of the graph defined by the root graph node 502, the first leaf graph node 504 is a leaf graph node, or terminal node, because it does not contain any child graph nodes. The first leaf graph node 504 comprises, or encapsulates, the first node 514. As described above, the leaf graph node type provides the mechanism by which a graph node (such as the first leaf graph node 504) can encapsulate zero or more nodes. These nodes may be owned by the sub-graph, such as is the case for the first node 514 which is owned by the first leaf graph node 504, or the nodes may be shared across graph types as a common resource. This is exemplified by the first leaf graph node 504 which is shared by both the root graph node 502 and the second composite graph node 508.

The first composite graph node 506 is a child of the root graph node 502 and directly comprises the second composite graph node 508 and the second leaf graph node 510. However, the sub-graph defined by the first composite graph node 506 (i.e., the sub-graph with the first composite graph node as the root node) comprises not only the directly associated nodes—the second composite graph node 508 and the second leaf graph node 510—but also indirectly associated nodes which correspond to the child, grandchild, etc. graph nodes defined by the directly associated nodes. As such, the sub-graph having the first composite graph node 506 as its root node comprises the second composite graph node 508, the second leaf graph node 510, the first leaf graph node 504 (which is a child of the second composite graph node 508), and the third leaf graph node 512 (which is also a child of the second composite graph node 508). The first composite graph node 506 is an executable graph node because it comprises a composition of a graph node and the third overlay node 526.

The second composite graph node 508 is a child of the first composite graph node 506 and defines a sub-graph comprising the first leaf graph node 504 and the third leaf graph node 512. The second composite graph node 508 is a composite graph node because it comprises graph nodes as children (i.e., the first leaf graph node 504, which is shared by the root graph node 502 and the second composite graph node 508, and the third leaf graph node 512). The second composite graph node 508 further comprises, or encapsulates, the second node 516.

The second leaf graph node 510 is a leaf graph node within the graph because it does not contain any graph nodes as children. Rather, the second leaf graph node 510 comprises, or encapsulates, the third node 518. The third leaf graph node 512 is also a leaf graph node within the graph because it does not contain any graph nodes as children. Rather, the third leaf graph node 512 comprises, or encapsulates, the fourth node 520 which is an executable node associated with the fifth overlay node 530. The third leaf graph node 512 is an executable graph node because it comprises a composition of a (leaf) graph node and the fourth overlay node 528.

The graph-based model 500 comprises an overlay structure which includes the first overlay node 522, the second overlay node 524, the third overlay node 526, the fourth overlay node 528, and the fifth overlay node 530. Whereas the node structure described above defines the hierarchical data structure of the graphs and sub-graphs within the graph-based model 500, the overlay structure defines the functionality, or processing logic, associated with the hierarchical data structure which is executable at run-time and able to interact with, or process, data related to the nodes within the hierarchical data structure.

The hierarchical structure of the graph defined by the root graph node 502 extends to the overlay structure of the graph such that overlays within the overlay structure can be extended or overridden depending on their position within the hierarchical structure of the graph and associated configurations. As will be explained in more detail below, a child graph node can extend the overlays of its direct parent graph node; whilst the overlays of a parent graph node only extend to its direct children graph nodes. For example, because the first overlay node 522 is associated with the root graph node 502, when the graph-based model 500 is loaded, the first overlay node 522 will be applied to the first leaf graph node 504 (which will be generated during the loading process as an executable leaf graph node within the executable graph-based model) and the first composite graph node 506 due to their having the root graph node 502 as a parent. The application of the first overlay node 522 to the first leaf graph node 504 is based on the default configuration of node behavior. In some embodiments, the node configuration (e.g., the configuration 414 of the node 402 shown in FIG. 4A) determines that an overlay such as the first overlay node 522 is not applied to the first leaf graph node 504. This relationship between the hierarchical structure of nodes and the assignment of overlays provides an efficient mechanism for defining, maintaining, and adapting common functionality for a sub-graph. This can be particularly beneficial in situations whereby all nodes within a sub-graph should adhere to some common functionality (e.g., security functions, reporting or logging procedures, connectivity protocols, etc.) because the common functionality need only be defined once within the graph (i.e., at the root node) for it to apply, at run-time, to all nodes within the executable graph-based model.

In summary, the graph-based model 500 shown in FIG. 5A corresponds to the "offline" configuration of an executable graph-based model. Representing the underlying data structure and overlay structure within a graph allows the overall model to be decomposed into reusable sub-graphs. For example, the graph-based model 500 may be an independent graph within a larger graph-based model comprising multiple other sub-graphs, nodes, etc. Moreover, sub-graphs within the graph-based model 500 can be loaded, executed, and unloaded independently of other sub-graphs within the graph-based model 500. For example, if a stimulus associated with the first node 514 is received, then a sub-graph of the graph-based model 500 upon which the first node 514 depends (e.g., the root graph node 502 with the first overlay node 522, the first leaf graph node 504, and the first node 514 with the second overlay node 524) can be loaded without requiring any non-functionally dependent graph nodes and nodes to be loaded. This leads to improvements in the use of computing resources because the portion of the sub-graph required to perform a task (e.g., process a stimulus) can be efficiently loaded and unloaded "on demand". This is of particular benefit in time critical applications and applications involving reduced storage and reduced memory devices, where the time spent loading and unloading models, and managing the memory and storage requirements of such models, should be minimized. Therefore, system resources can be managed more efficiently by exploiting the hierarchical structure enforced by graphs to identify the portion(s) of the graph structure which are required for loading/execution based on contextualized stimuli. The identified portion(s) are then loaded and executed on demand whilst the remaining portion(s) of the graph structure remain unloaded To illustrate the above described concepts and benefits, FIGS. 5B-5F illustrate the dynamic generation of an executable graph-based model from the graph-based model 500. The executable graph-based model is constructed from a sub-graph of the graph-based model 500 based on a stimulus (and associated context) received in relation to the fourth node 520. As such, to process the stimulus, the sub-graph of the graph-based model 500 upon which the fourth node 520 functionally depends should be loaded into memory by generating an executable graph-based model which can then process the received stimulus.

Because, in this example, the entire graph-based model 500 does not need to be loaded to process the received stimulus, the sub-graph containing the target node (the fourth node 520) is identified and loaded. To identify the relevant sub-graph, the hierarchical structure defined by the graph-based model 500 is traversed from the target node (the fourth node 520) to the root of the hierarchical structure (i.e., the root graph node 502). The graph nodes within the traversal path from the root graph node 502 to the fourth node 520 correspond to the sub-graph to be loaded and from which the executable graph-based model will be generated. This traversal is only performed once when the executable graph-based model is loaded.

FIG. 5B illustrates a traversal path related to the fourth node 520 of the graph-based model 500 shown in FIG. 5A according to an embodiment of the present disclosure.

As stated above, the fourth node 520 corresponds to the target node—i.e., a node which is required to be loaded to perform some operation or functionality. In the present example, a stimulus associated with the fourth node 520 has been received such that the fourth node 520 needs to be loaded in order to process the stimulus. Whilst the fourth node 520 is an executable node associated with the fifth overlay node 530, the graph-based model 500 defines a number of overlays which may be applicable to the fourth node 520. As described above, the overlay structure of an executable graph-based model generated from a graph-based model, such as the graph-based model 500, is dynamically generated based on the hierarchical relationship between the nodes (graph nodes, nodes, executable nodes, etc.) and the overlay nodes in the overlay structure. The traversal path is therefore used not only to identify the sub-graph containing the fourth node 520, but also to construct the overlay structure of the executable graph-based model.

The traversal from the target node (the fourth node 520) to the root node (the root graph node 502) is shown in FIG. 5B. The traversal path is determined by identifying the direct parent of each node and then subsequently identifying the direct parent of the parent nodes, etc. until the root graph node 502 is reached. As will be described in more detail below in relation to FIGS. 6B and 6C, parent graph nodes can be identified because child graph nodes are stored with a reference to their direct parent thereby allowing a bottom-up traversal at load time. Determining the traversal path thus comprises a number of stages, or steps, where each stage comprises a traversal from a child to a parent.

The traversal starts from the fourth node 520 (i.e., the node to which the received stimulus relates) and then proceeds to the third leaf graph node 512 which encapsulates the fourth node 520. This is shown in FIG. 5B by the jump from the circled number "1" to the circled number "2". The traversal then proceeds to the parent of the third leaf graph node 512, which is the second composite graph node 508. This is shown in FIG. 5B by the jump from the circled number "2" to the circled number "3". The traversal then proceeds to the parent of the second composite graph node 508, which is the first composite graph node 506. This is shown in FIG. 5B by the jump from the circled number "3"

to the circled number "4". The traversal does not proceed to the first leaf graph node 504 or the second leaf graph node 510 because these nodes are children of the second composite graph node 508 and the first composite graph node 506 respectively and thus do not fall within the direct traversal path from the fourth node 520 to the root graph node 502. The traversal continues from the first composite graph node 506 to the root graph node 502 wherein the traversal terminates because the traversal has reached the root of the graph containing the target node (i.e., containing the fourth node 520). This is shown in FIG. 5B by the jump from the circled number "4" to the circled number "5".

The traversal path shown in FIG. 5B corresponds to the sub-graph of the overall graph defined by the graph-based model 500 containing the fourth node 520. Put another way, the traversal path identifies the set of nodes and overlay nodes upon which the target node (the fourth node 520) functionally depends. As such, the set of nodes within the traversal path corresponds to the nodes which should be loaded in order to process stimuli related to the target node. As stated above, loading the nodes within the identified sub-graph (i.e., generating an executable graph-based model from the sub-graph) requires the overlay structure of the executable graph-based model being generated to be constructed based on the overlay structure and hierarchy of the sub-graph. Beneficially, the traversal path is used in a reverse traversal order—from the root graph node 502 to the fourth node 520—to construct the overlay structure and generate the executable-graph based model. This is illustrated in FIGS. 5C-5G.

Figure 5C:
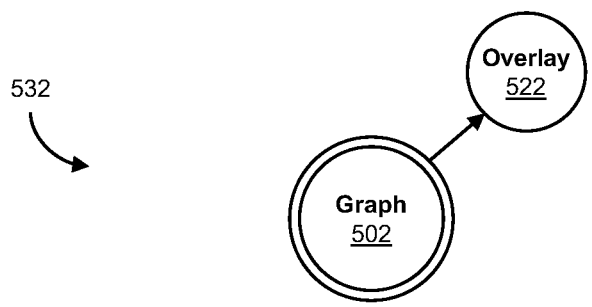
FIG. 5C illustrates a first step in the generation of an executable graph-based model from the sub-graph identified in FIG. 5B according to an embodiment of the present disclosure.

FIG. 5C illustrates a first step in the generation of an executable graph-based model 532 from the sub-graph identified in FIG. 5B according to an embodiment of the present disclosure.

The root graph node 502 corresponds to the last node within the traversal path (as seen in FIG. 5B) and is thus the first node to be generated within the executable graph-based model 532 of the sub-graph. The root graph node 502 is an executable composite graph node associated with the first overlay node 522. Consequently, an executable composite graph node is generated within the executable graph-based model 532. The skilled person will appreciate that although the integers are the same between FIGS. 5A-5B and FIGS. 5C-5G, the root graph node 502 shown in FIG. 5C corresponds to the "run-time" root graph node 502 within the generated executable graph-based model 532.

Figure 5D:
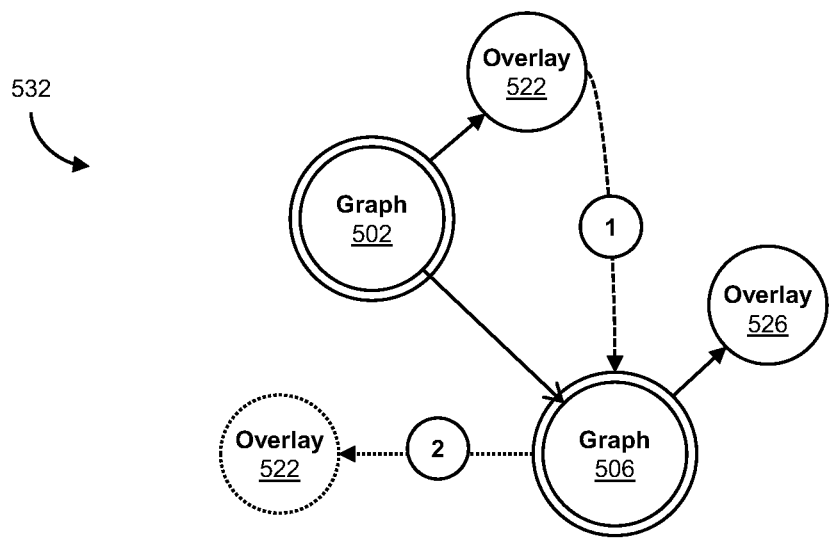
FIG. 5D illustrates a second step in the generation of an executable graph-based model from the sub-graph identified in FIG. 5B according to an embodiment of the present disclosure.

From the traversal path, it can be inferred that the next node to construct in the executable graph-based model 532 is the first composite graph node 506 as shown in FIG. 5D.

FIG. 5D illustrates a second step in the generation of the executable graph-based model 532 from the sub-graph identified in FIG. 5B according to an embodiment of the present disclosure.

The first composite graph node 506 is the second graph node within the reverse traversal path shown in FIG. 5B. As such, it is the second node to be generated within the executable graph-based model 532. The first composite graph node 506 is an executable graph node associated with the third overlay node 526 and so it is generated as an executable composite graph node within the executable graph-based model 532.

However, because the first composite graph node 506 is a direct child of the root graph node 502, the first overlay node 522 extends to, or is overridden by, the first composite graph node 506. This is shown in FIG. 5D by the first overlay node 522 being associated with the first composite graph node 506 due to the hierarchical relationship between the root graph node 502 (the parent) and the first composite graph node 506 (the child). In the example shown in FIG. 5D, the first overlay node 522 is applied as an additional overlay of the first composite graph node 506. This is illustrated in FIG. 5D by the paths referenced by the circled numbers "1" and "2". A reference to the first overlay node 522 is registered within the overlay manager of the first composite graph node 506 such that the first composite graph node 506 has two overlay nodes registered (the first overlay node 522 and the third overlay node 526). This illustrates a difference between the graph-based model 500 and the executable graph-based model 532 generated therefrom, since the first composite graph node 506 is associated with only a single overlay node (the third overlay node 526) in the graph-based model 500.

By default, overlays which are "cascaded down" from a parent graph node to a child graph node extend the overlays of the child graph node. That is, by default the first overlay node 522 is extended to the first composite graph node 506 by registering the first overlay node 522 as an additional overlay within the overlay manager of the first composite graph node 506. In embodiments, this default behavior is altered via the use of node configuration thereby providing a high degree of flexibility and configuration in the application of overlays to the sub-graph overlay structure.

Whilst the first overlay node 522 is registered as an additional overlay node of the first composite graph node 506, not all overlay nodes of a parent graph node extend the functionality of the child graph node in this way. In some examples, an overlay node of a child graph node overrides an overlay node of a parent graph node. For example, if the overlay node of the child graph node is a more restrictive version (more restrictive extension) of the overlay node of the parent graph node.

Figure 5E:
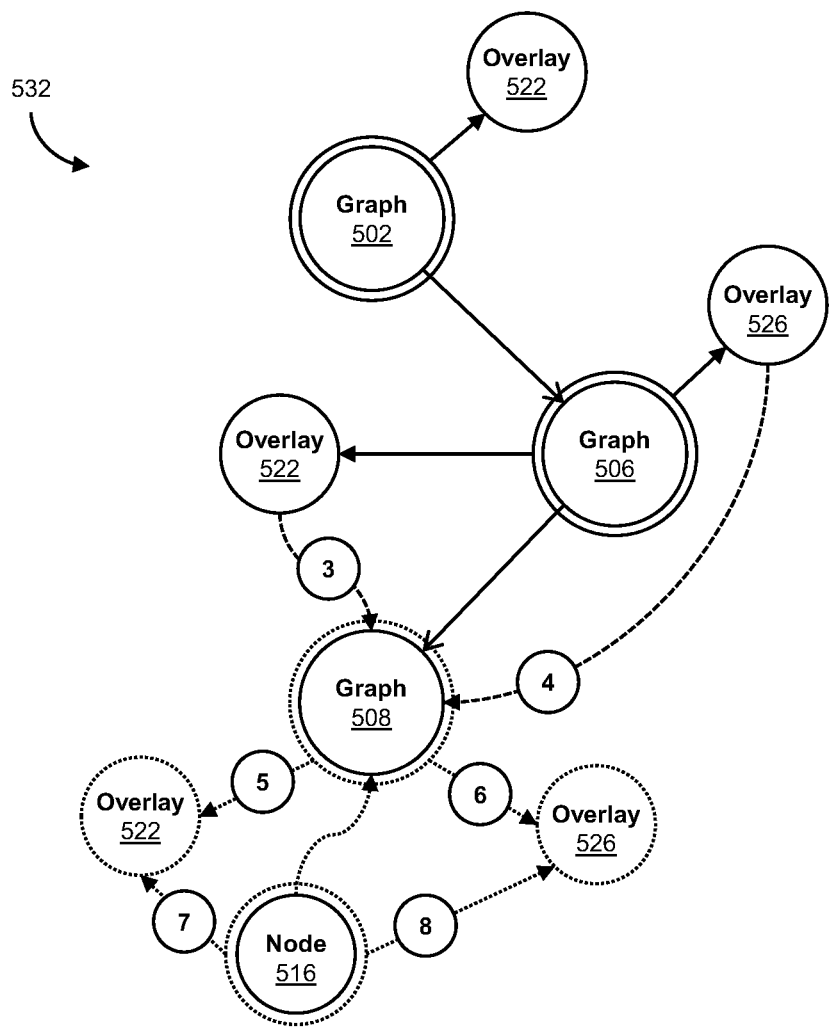
FIG. 5E illustrates a third step in the generation of an executable graph-based model from the sub-graph identified in FIG. 5B according to an embodiment of the present disclosure.

FIG. 5E illustrates a third step in the generation of the executable graph-based model 532 from the sub-graph identified in FIG. 5B according to an embodiment of the present disclosure.

The second composite graph node 508 is the third graph node within the reverse traversal path shown in FIG. 5B. As such, it is the third node to be generated within the executable graph-based model 532. The second composite graph node 508 is a non-executable node within the graph-based model 500. However, as is shown in FIG. 5D and described below, due to the cascading construction of the overlay structure of the executable graph-based model 532, the second composite graph-node is generated as an executable composite graph-node within the executable graph-based model 532.

Although the second composite graph node 508 is not associated with any overlay nodes within the graph-based model 500, the second composite graph node 508 "inherits" the first overlay node 522 and the third overlay node 526 because it is a direct child of the first composite graph node 506 which, within the executable graph-based model 532, is associated with these overlay nodes. As stated above, this represents the default behavior of the application of overlays from parent graph nodes to child graph nodes which can be modified via the use of node configuration. This is illustrated by the paths referenced by the circled numbers "3" and "4" in FIG. 5E. When the sub-graph is loaded to generate the executable graph-based model 532, the second composite graph node 508 is generated as an executable composite graph node with references to the first overlay node 522 and the third overlay node 526 being registered in its overlay manager. This is illustrated by the circled numbers "5" and "6" in FIG. 5E.

The second composite graph node 508 also encapsulates the second node 516. The second composite graph node 508 may require the second node 516 for processing (e.g., the second node 516 is a data node holding key values) and as such should be loaded along with the second composite graph node 508. In embodiments, encapsulated graph nodes, such as the second node 516, are loaded depending on configuration settings or contexts associated with received stimulus. The second composite graph node 508 is a non-executable node within the graph-based model 500. However, as its encapsulating graph node (the second composite graph node 508) is an executable graph node, the overlay nodes associated with the encapsulating graph node are applied to the second node 516. As such, in the executable graph-based model 532, the second node 516 is generated as an executable node with references to the first overlay node 522 and the third overlay node 526 registered within its overlay manager. This is illustrated by the circled numbers "7" and "8" in FIG. 5E.

Figure 5F:
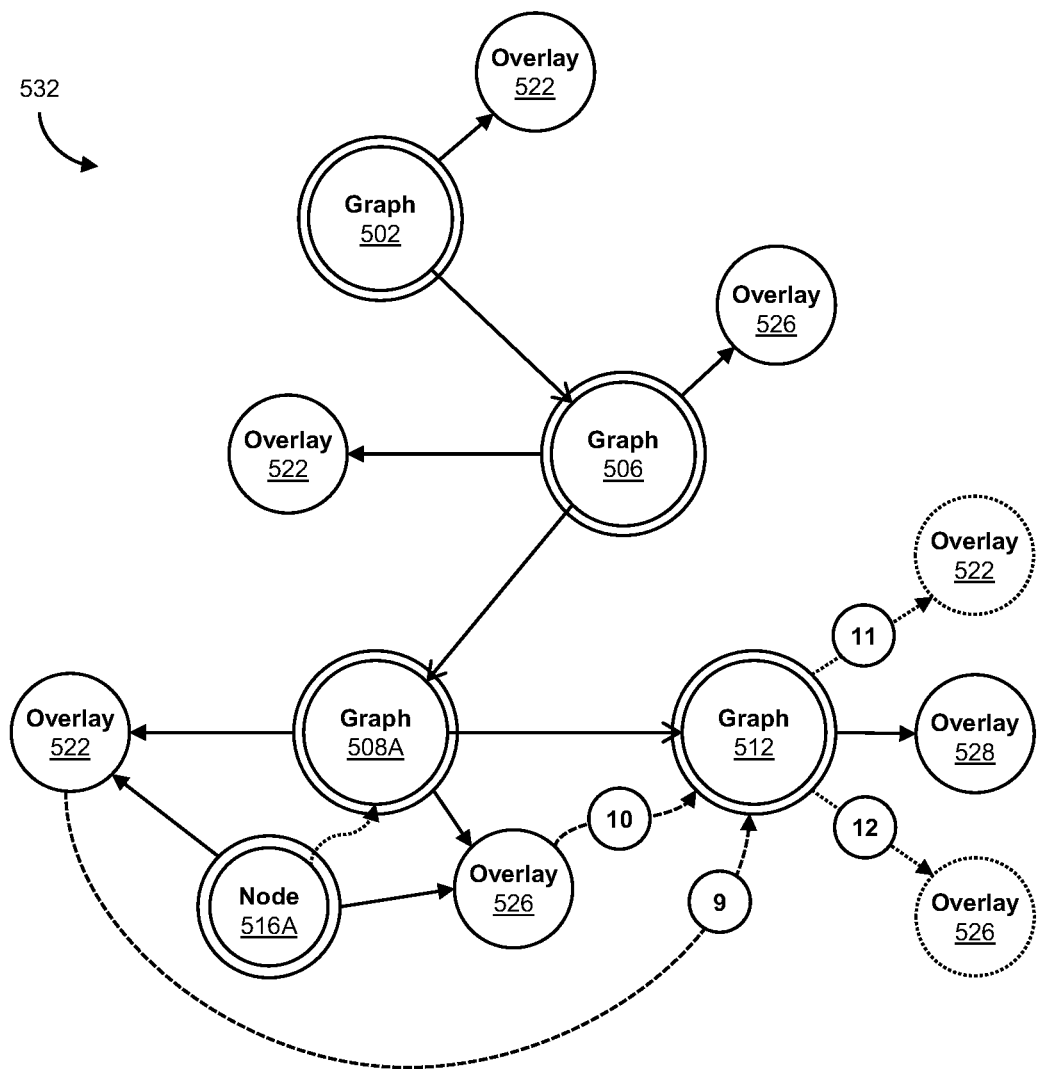
FIG. 5F illustrates a fourth step in the generation of an executable graph-based model from the sub-graph identified in FIG. 5B according to an embodiment of the present disclosure.

FIG. 5F illustrates a fourth step in the generation of the executable graph-based model 532 from the sub-graph identified in FIG. 5B according to an embodiment of the present disclosure.

The third leaf graph node 512 is the fourth graph node within the reverse traversal path shown in FIG. 5B. As such, it is the fourth node to be generated within the executable graph-based model 532. The third leaf graph node 512 is an executable node associated with the fourth overlay node 528 and so it is generated as an executable leaf graph node within the executable graph-based model 532.

Because the third leaf graph node 512 is a direct child of the second composite graph node 508A (i.e., the executable composite graph node generated from the second composite graph node 508), the overlay nodes associated with the second composite graph node 508A are, by default, cascaded down to the third leaf graph node 512, as illustrated by the circled numbers "9" and "10" in FIG. 5F. Consequently, references to the first overlay node 522 and the third overlay node 526 are added to the overlay manager of the third leaf graph node 512. This is illustrated by the circled numbers "11" and "12" in FIG. 5F. Within the executable graph-based model 532, the second leaf graph node 512 is an executable leaf graph node associated with the first overlay node 522, the third overlay node 526, and the fourth overlay node 528.

Figure 5G:
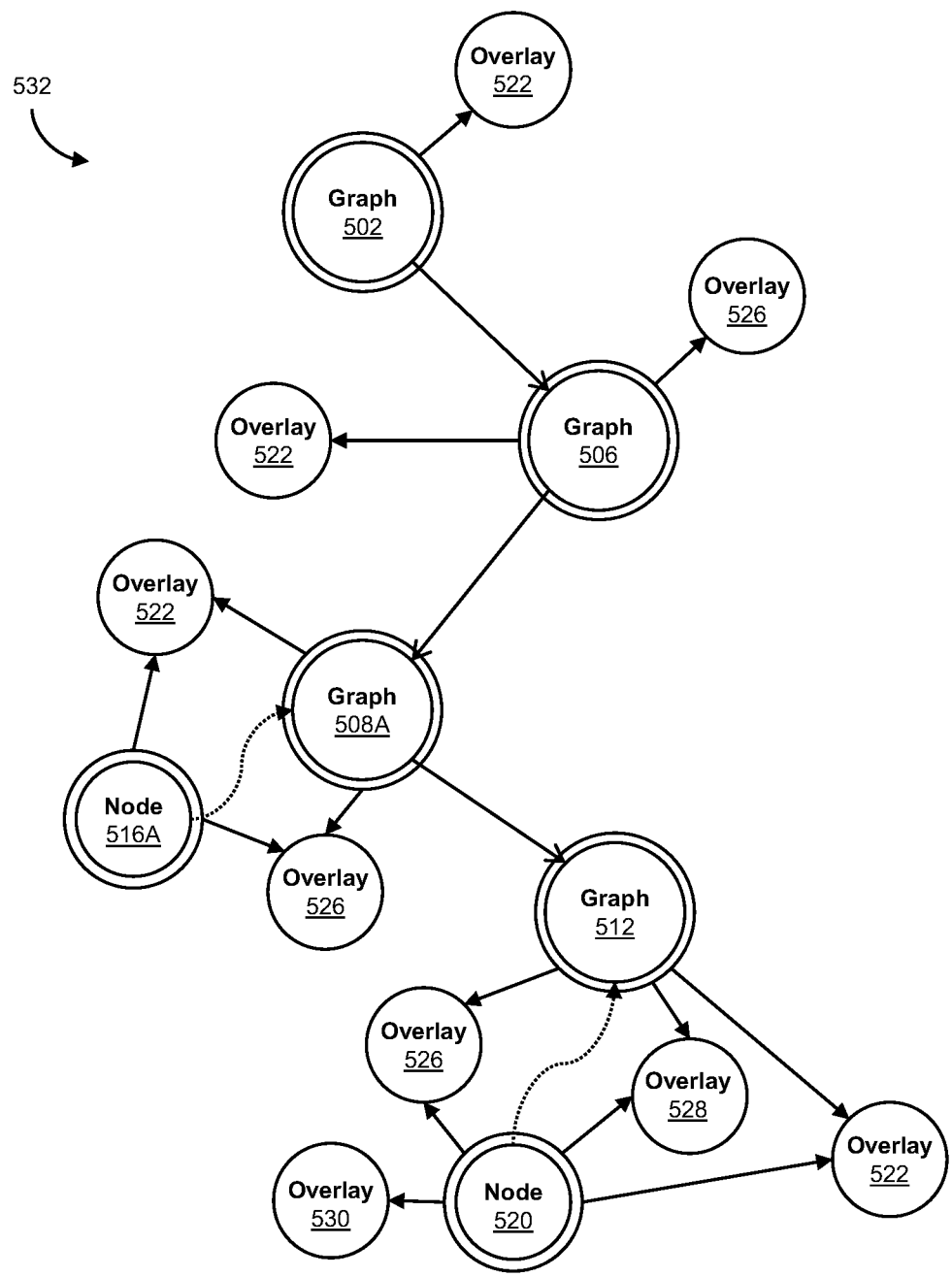
FIG. 5G illustrates a fifth step in the generation of an executable graph-based model from the sub-graph identified in FIG. 5B according to an embodiment of the present disclosure.

FIG. 5G illustrates a fifth step in the generation of the executable graph-based model 532 from the sub-graph identified in FIG. 5B according to an embodiment of the present disclosure.

As the third leaf graph node 512 is the final graph node within the reverse traversal path shown in FIG. 5B, the overlay structure of the graph nodes within the executable graph-based model 532 have been correctly constructed such that the fourth node 520 (which corresponds to the target node) can now be generated. The fourth node 520 is an executable node associated with the fifth overlay node 530 and so is generated as an executable node within the executable graph-based model 532.

Because the fourth node 520 is encapsulated by the third leaf graph node 512, the overlays registered with the third leaf graph node 512 are applied to the fourth node 520 (using the default configuration, as described above). Consequently, the fourth node 520 within the executable graph-based model 532 is associated with a reference to the first overlay node 522, the third overlay node 526, the fourth overlay node 528, and the fifth overlay node 530.

The executable graph-based model 532 shown in FIG. 5G thus corresponds to the executable graph-based model of the sub-graph identified in FIG. 5B—i.e., the sub-graph which contains the target node (the fourth node 520)—and which is held in memory to process the stimulus associated with the target node. Beneficially, as the overlays have been correctly registered with the nodes within the executable graph-based model 532, the stimulus is processed using the overlay manager of the fourth node 520 (that is, no further traversal is necessary to determine the overlays to be executed or the ordering of execution). The overlay manager of the fourth node 520 is configured, based on the configuration of the overlays and the internal processing logic of the overlay manager, to determine the order within which the overlay nodes associated with the fourth node 520 are to be executed to process the received stimulus. One or all of the overlay nodes will be executed depending on the stimulus, associated context, and/or configuration. Moreover, as the executable graph-based model 532 is now held in memory, any further stimuli received which are associated with the executable nodes within the executable graph-based model 532 can be efficiently and effectively processed because the overlay structure of the executable graph-based model 532 is already constructed.

When the executable graph-based model 532 is unloaded, the nodes are unloaded in the traversal order from the target node (the fourth node 520) to the root node (the root graph node 502). In one embodiment, all nodes within the traversal path are unloaded. In a further embodiment, one or more nodes within the traversal path are unloaded where each of the one or more nodes satisfy an unloading criterion defined by configuration. The unloading criterion includes a time-based criterion (e.g., the unloading criterion is met after a predetermined period of time has elapsed from the processing logic being executed as defined by configuration) and a criterion defined by the received stimulus (e.g., the stimulus identifies nodes to be unloaded or to remain loaded). Moreover, any nodes which are functionally dependent on nodes which are currently loaded (i.e., nodes which are held within system memory) remain loaded.

In the example described above in relation to FIGS. 5B-5G, there is a single path from the root graph node 502 to the target node (the fourth node 520). In examples involving a shared sub-graph, such as that define by the first leaf graph node 504 shown in FIG. 5A, there are multiple possible paths from the root node to the target node. For example, if the first node 514 is the target node, then the first node 514 can be reached by the path from the root graph node 502 and the first leaf graph node 504, or the path from the root graph node 502, the first composite graph node 506, the second composite graph node 508, and the first leaf graph node 504. In consequence, the first node 514 may be associated with either the first overlay node 522 (and the second overlay node 524) or the first overlay node 522 and the third overlay node 526 (and the second overlay node 524) depending on which path is taken. Therefore, context is used to determine which path is taken. For example, the context associated with the received stimulus indicates that the path from the root graph node 502 to the first leaf graph node 504 is required for processing the received stimulus such that the first node is associated with the first overlay node 522 and the second overlay node 524.

Figure 6A:
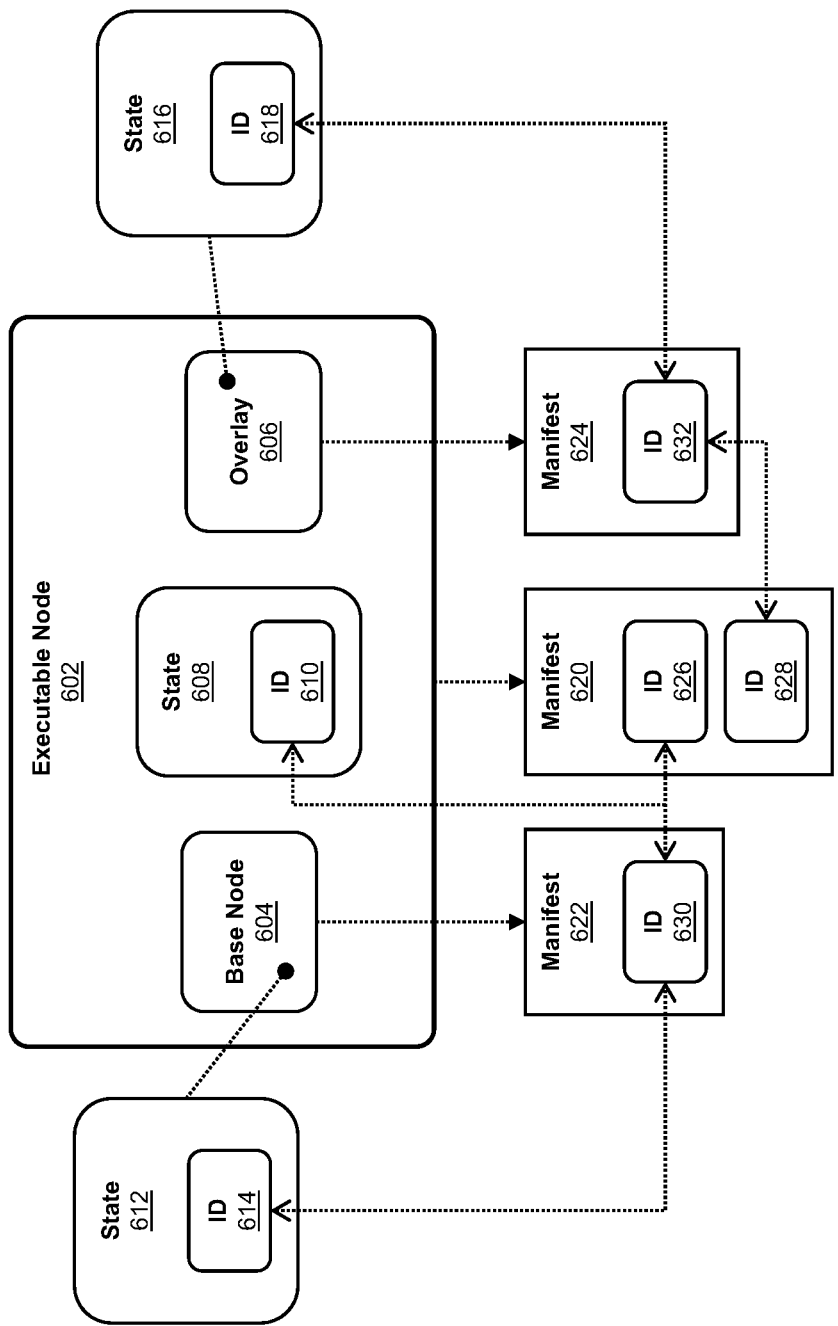
FIG. 6A illustrates the decomposition of an executable node for storage according to an embodiment of the present disclosure.
Figure 6B:
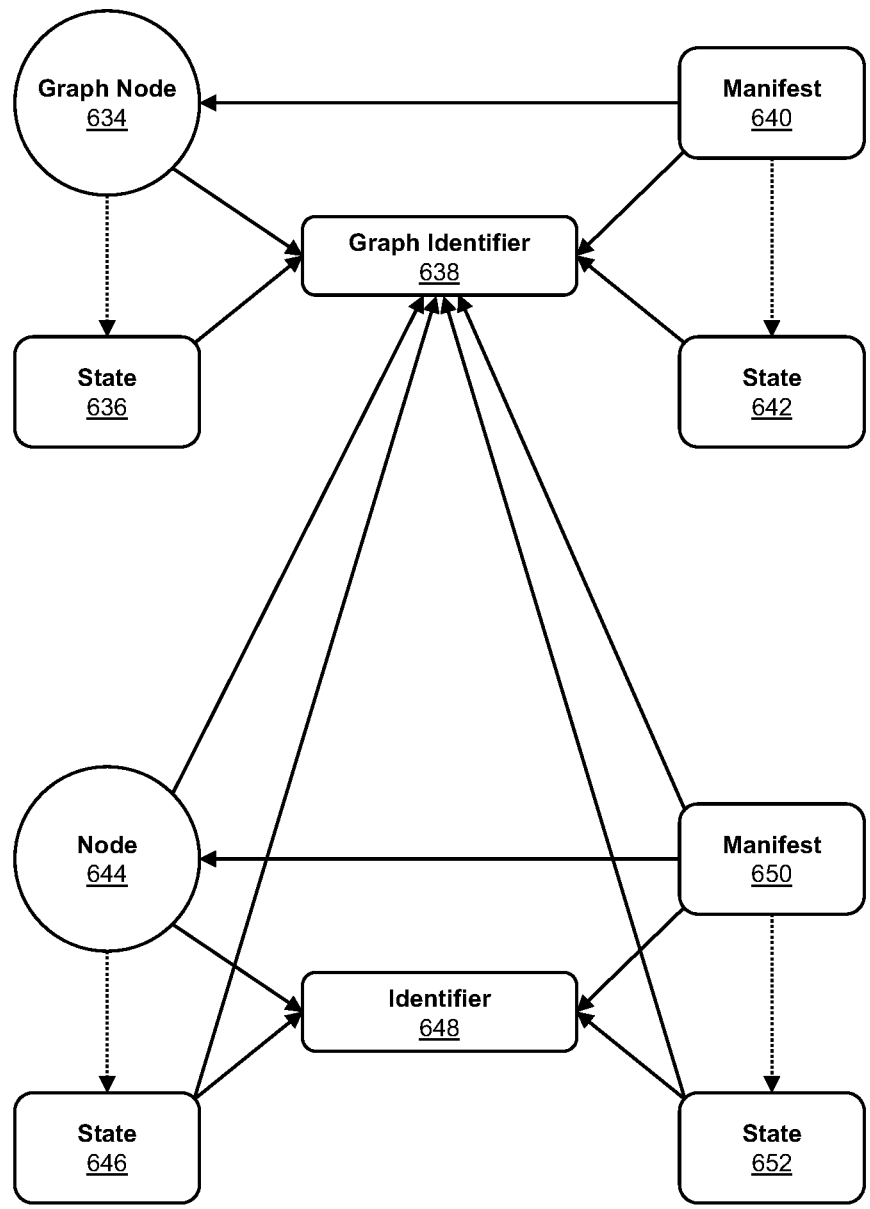
FIG. 6B shows the decomposition of a sub-graph for storage according to an aspect of the present disclosure.
Figure 6C:
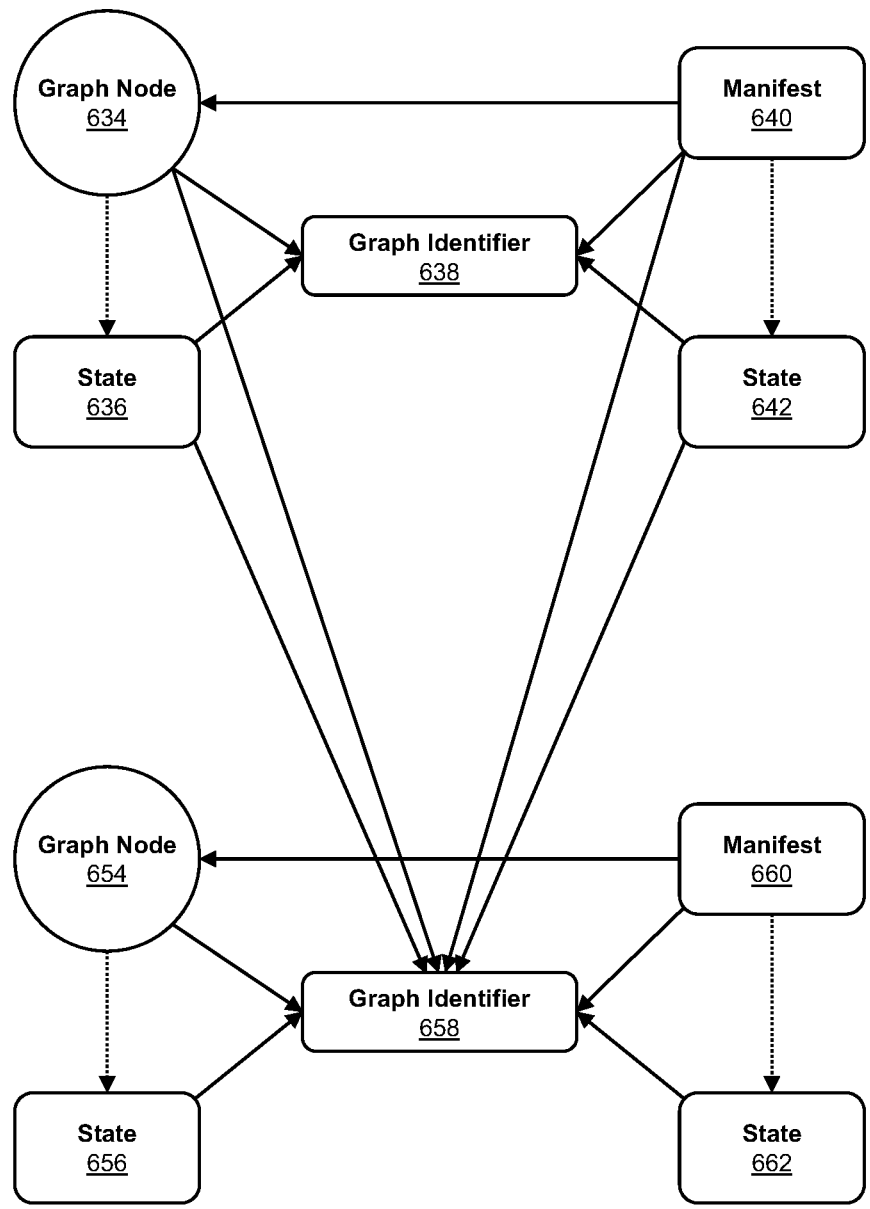
FIG. 6C shows the decomposition of a shared graph relationship for persistent storage according to an embodiment of the present disclosure.

Before describing an example executable graph-based model incorporating sub-graphs, the description will turn to the decomposition of an executable nodes and sub-graphs for persistent storage, as shown in FIGS. 6A to 6C.

FIG. 6A illustrates the decomposition of an executable node 602 for storage according to an embodiment of the present disclosure.

The executable node 602 comprises a composition of a base node 604 and an overlay node 606. The executable node 602 comprises a state 608 with an identifier 610, the base node 604 comprises a state 612 with an identifier 614, and the overlay node 606 comprises a state 616 with an identifier 618. A manifest 620-624 is generated for each of the executable node 602, the base node 604, and the overlay node 606. The manifest 620 associated with the executable node 602 comprises an identifier 626 and an overlay identifier 628. The manifest 622 associated with the base node 604 comprises an identifier 630 and the manifest 624 associated with the overlay node 606 comprises an identifier 632.

The state 608 of the executable node 602 comprises all data required to reconstruct the executable node 602 (e.g., attributes, properties, etc.). The state 608 of the executable node 602 is persistently stored along with the identifier 610. The manifest 620 is generated for the executable node 602 and comprises the identifier 626 (which is the same as the identifier 610), the storage location of the state 608 of the executable node 602, and the overlay identifier 628 (which is the same as the identifier 632). The overlay identifier 628 thus identifies the manifest 624 associated with the overlay node 606. A manifest state (not shown) is then generated for the manifest 620 and persistently stored along with the identifier 626.

The state 612 of the base node 604 comprises all data required to reconstruct the base node 604 (e.g., attributes, properties, etc.) and is persistently stored along with the identifier 614. The manifest 622 is generated for the base node 604 and comprises the identifier 630 and the storage location of the state 612 of the base node 604. The identifier 614 of the state 612 and the identifier 630 of the manifest 622 is the same as the identifier 610 of the state 608 of the executable node 602 (which is also the same as the identifier 626 of the manifest 620 of the executable node 602). A manifest state (not shown) is then generated for the manifest 622 and persistently stored along with the identifier 630. Thus, the states, manifests, and manifest states for the executable node 602 and the base node 604 all comprise the same, shared, identifier. A shared identifier can be used in this instance because the states, manifests, and manifest states are stored separately.

The state 616 of the overlay node 606 comprises all data required to reconstruct the overlay node 606 (e.g., attributes, properties, processing logic, etc.) and is persistently stored along with the identifier 618. The manifest 624 is generated for the overlay node 606 and comprises the identifier 632, which is the same as the identifier 618, as well as the storage location of the state 616. A manifest state (not shown) is then generated for the manifest 624 and is persistently stored along with the identifier 632.

FIG. 6B shows the decomposition of a sub-graph for storage according to an aspect of the present disclosure.

FIG. 6B shows a graph node 634 which comprises a state 636 and is associated with a graph identifier 638. A manifest 640 is associated with the graph node 634 and comprises a manifest state 642. FIG. 6B further shows a node 644 which comprises a state 646 and a unique identifier 648. A manifest 650 is associated with the node 644 and comprises a manifest state 652.

The state 636 of the graph node 634 comprises all data required to reconstruct the graph node 634 (e.g., attributes, properties, etc.). The state 636 is persistently stored along with the graph identifier 638 which is unique for the graph within which the graph node 634 exists. The manifest 640 is generated for the graph node 634 and comprises the graph identifier 638 as well as the storage location of the state 636 of the graph node 634. The manifest state 642 is generated from the manifest 640 and persistently stored. The manifest state 642 also comprises the graph identifier 638 thereby allowing all the components of the graph node 634 to be reconstructed from the manifest state 642.

The node 644 is a node of the graph node 634 (i.e., either an encapsulated node or a child graph node). The state 646 of the node 644 comprises all data required to reconstruct the node 644 (e.g., attributes, properties, etc.). The state 646 is persistently stored along with the unique identifier 648 of the node 644 and the graph identifier 638. If the node 644 is a graph node, then the unique identifier 648 is itself a graph identifier. By storing the graph identifier 638 with the node 644, the association between the node 644 and the graph in which it resides (i.e., as defined by the graph node 634) can be identified without requiring the graph node 634 to maintain a list of all nodes to which it is associated. The manifest 650 is generated for the node 644 and comprises the unique identifier 648 and the graph identifier 638, as well as the storage location of the state 646 of the node 644. The manifest state 652 is generated from the manifest 650 and persistently stored. The manifest state 652 also comprises the unique identifier 648 and the graph identifier 638 thereby allowing all the components of the node 644, as well as its relationship to the graph in which it exists, to be reconstructed from the manifest state 652.

As shown in FIG. 6B, each child node (e.g., the node 644) contains a direct reference back to its parent node. As such, a graph can be loaded by finding all manifest states associated with the graph identifier and loading these nodes. As described above, the maintenance of a reference from a child (graph node) to a parent (graph node) allows executable graph-based models to be efficiently generated by allowing the sub-graph containing a node to be loaded quickly and efficiently (i.e., by following a bottom-up traversal as illustrated in FIG. 5B).

The relationship shown in FIG. 6B holds if the node 644 is owned by the graph node 634. If a graph is shared, then the relationship does not indicate an owner hierarchy and so the references act in the opposite way. This is illustrated in FIG. 6C.

FIG. 6C shows the decomposition of a shared graph relationship for persistent storage according to an embodiment of the present disclosure.

FIG. 6C shows the graph node 634 shown in FIG. 6B but in this instance, the graph node 634 uses, or shares, a second graph defined by the graph node 654. That is, unlike in the example in FIG. 6B, the graph node 654 is not owned by the graph node 634. As such, the graph node 634, the state 636, the manifest 640, and the manifest state 642 maintain references to the graph identifier 658 associated with the second graph as defined by the graph node 654. Loading such a structure begins with the first graph (i.e., the graph associated with the graph identifier 638) and then proceeds to loading all shared dependencies if they are not already loaded (i.e., the second graph associated with the graph identifier 658). Unloading only occurs for the second graph if all other graphs which use the second graph have also been unloaded.

As will be described in more detail in relation to FIGS. 13 and 14 below, an executable graph-based model which includes sub-graphs may be stored (and loaded) using the above described decomposition. Beneficially, each component is stored separately thereby allowing a user to maintain and store their data independently of the storage of the structure and functionality of the executable graph-based model.

Having described the structure and function of sub-graphs and graph nodes in FIGS. 5 and 6, an example executable graph-based model which incorporates sub-graphs will now be described to provide further understanding of the aspects described above.

Figure 7A:
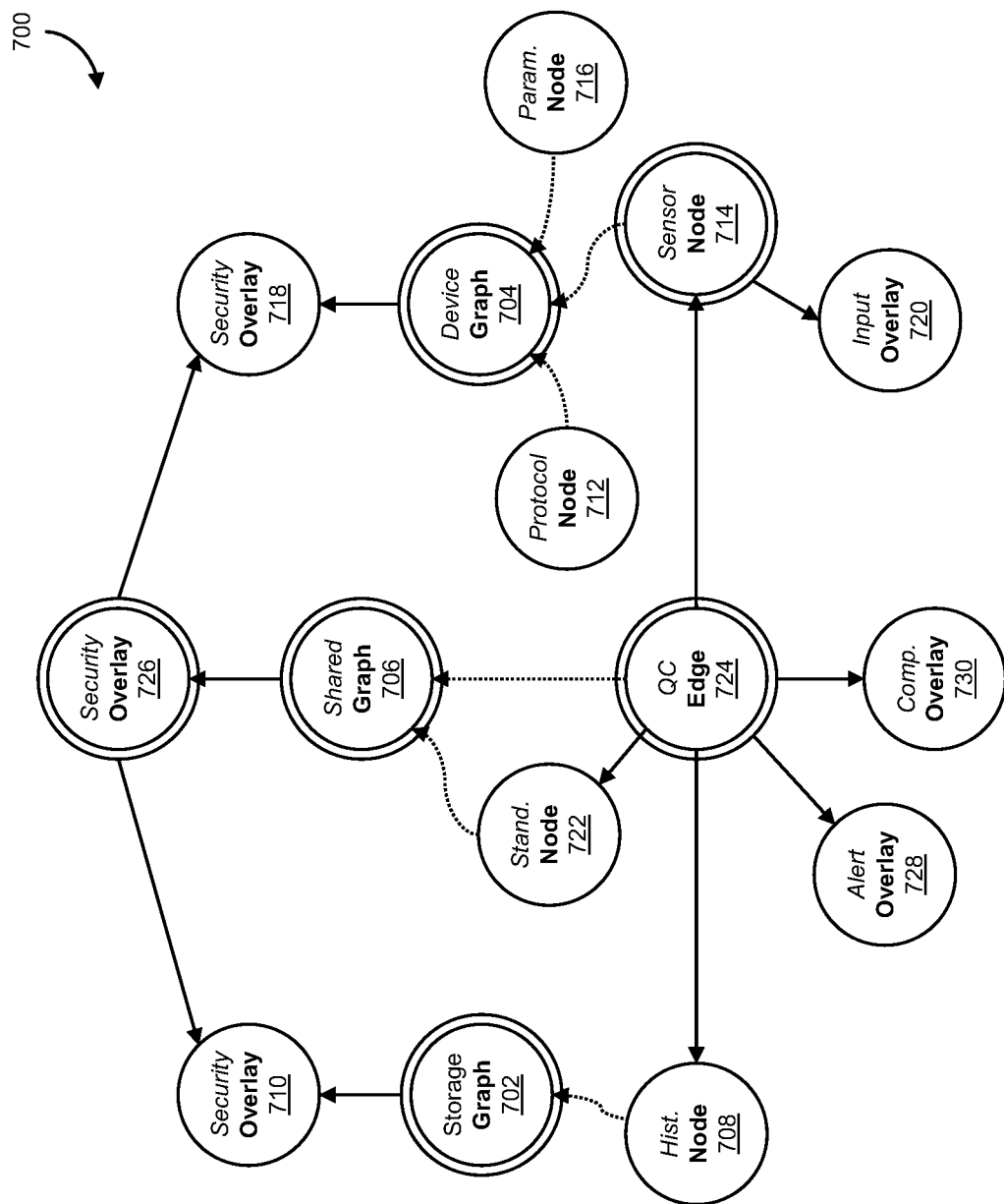
FIG. 7A shows a graph-based model with sub-graphs according to an embodiment of the present disclosure.

FIG. 7A shows a graph-based model 700 with sub-graphs according to an embodiment of the present disclosure.

The graph-based model 700 is directed to an example quality control (QC) system within a manufacturing environment. The graph-based model 700 comprises a storage sub-graph node 702 which defines a storage sub-graph, a device sub-graph node 704 which defines a device sub-graph, and a shared sub-graph node 706 which defines a shared sub-graph. The storage sub-graph node 702 encapsulates a historical data node 708 and comprises a security overlay 710. The device sub-graph node 704 encapsulates a protocol node 712, a sensor node 714, and a parameter node 716 and comprises a security overlay 718. The sensor node 714 of the device sub-graph node 704 comprises an input overlay 720. The shared sub-graph node 706 encapsulates a standards node 722 and a quality control (QC) edge node 724 and comprises a security overlay 726. The QC edge node 724 comprises an alert overlay 728 and a comparison overlay 730.

The graph-based model 700 shown in FIG. 7A comprises a plurality of nodes and an overlay structure used to perform quality control of manufacture of a tympanostomy tube (alternatively referred to as a T-tube, myringotomy tube, or grommet). Tympanostomy tubes help prevent ear infection by increasing aeration in the middle ear and allow drainage of excess fluids. To help ensure successful surgery, the manufacturing process should be controlled to identify tubes which do not meet the required dimensions (e.g., due to manufacturing variations, operator error, etc.). The QC system implemented by the graph-based model 700 helps ensure that the tympanostomy tubes are manufactured within the allowable dimensions.

At a general level, the QC system works by obtaining sensor readings regarding the dimensions of a manufactured tube (e.g., readings from a metrology tool such as a gauge or micrometer or readings obtained from an image of the manufactured tube). The dimensions are compared against the target dimensions as defined within a technical standard. The dimensions are also compared to historical dimensions to identify potential recurring patterns or drift which could be symptomatic of a device failure. If the dimensions of the manufactured tube do not fall within the desired range of dimensions, then an alert is issued. The alert may result in the manufactured tube being scrapped or otherwise dealt with.

The skilled person will appreciate that the manufacturing system and QC system to which the graph-based model 700 relates is deliberately simplified to provide an example through which the application of executable graph-based models and sub-graphs to such systems can be described. As such, the system is not intended to provide a detailed working embodiment of a manufacturing or QC system but is rather illustrative for the purpose of explaining the functionality and benefits of sub-graphs and executable graph-based models when applied to such real-world systems. Moreover, the graph-based model 700 is not intended to be limiting and the skilled person will appreciate that executable graph-based models can be applied to any suitable technical application area or problem domain.

The storage sub-graph node 702 comprises, or encapsulates, the historical data node 708 which contains records of historical manufacturing data. For example, the recorded dimensions of all tubes manufactured over a period of time (e.g., the last day, two days, seven days, 14 days, month, etc.). The storage sub-graph node 702 also comprises a security overlay 710 (i.e., the storage sub-graph node 702 is an executable sub-graph, or a sub-graph with overlay) which defines the security policy controlling access to the data held within the storage sub-graph. The security overlay 710 restricts access to the storage sub-graph, and thus the historical data node 708, to a predetermined set of users. For example, a first set of users may have read-write access to the data, a second set of users may have read-only access to the data, and all other users may be denied access to the data.

The device sub-graph node 704 comprises, or encapsulates, nodes which are associated with, and obtain readings from, a device from which the dimensional readings are obtained. The device sub-graph node 704 comprises the protocol node 712 and the parameter node 716 which define information and data regarding communication protocols and parameters for interfacing with the device. The sensor node 714 is an executable node having an input overlay 720 and is used to obtain readings (i.e., dimensional measurements) from the device. The device sub-graph node 704 is associated with the security overlay 718 which defines the security policy controlling access to the data and processing logic within the device sub-graph. The security overlay 718 restricts access to the device sub-graph, and thus the sensor node 714 from which sensor readings are obtained, to a predetermined set of users. For example, a first set of users may have execute access to the processing logic of the sensor node but not write access to the data generated, a second set of users may have read-only access to the data generated, all other users may be denied access to both the data and the processing logic.

The shared sub-graph node 706 comprises, or encapsulates, the QC edge node 724 which connects the storage sub-graph and the device sub-graph with the standards node 722 so that the overlays associated with the QC edge node 724 can be executed. The shared sub-graph node 706 is generated to be shared by, and "bridge", the storage sub-graph and the device sub-graph. Because the shared sub-graph node 706 is shared, it cannot be encapsulated by either the storage sub-graph node 702 or the device sub-graph node 704. The standards node 722 comprises all the data relating to the dimensional requirements of the manufactured nodes. The QC edge node 724 comprises the comparison overlay 730 which compares the measurements obtained from the sensor node 714 with the data held in the standards node 722 and the historical data node 708. The QC edge node 724 also comprises the alert overlay 728 which issues an alert or notification if the comparison overlay 730 determines that the acceptable dimensions have been exceeded. The shared sub-graph node 706 has a security overlay 726 which adheres to the security overlay 710 and the security overlay 718. That is, the security policy defined by the security overlay 726 is at least as restrictive as the security policies defined by the security overlay 710 and the security overlay 718. This is because the QC edge node 724 has potentially a different set of users who look at the combined results.

Figure 7B:
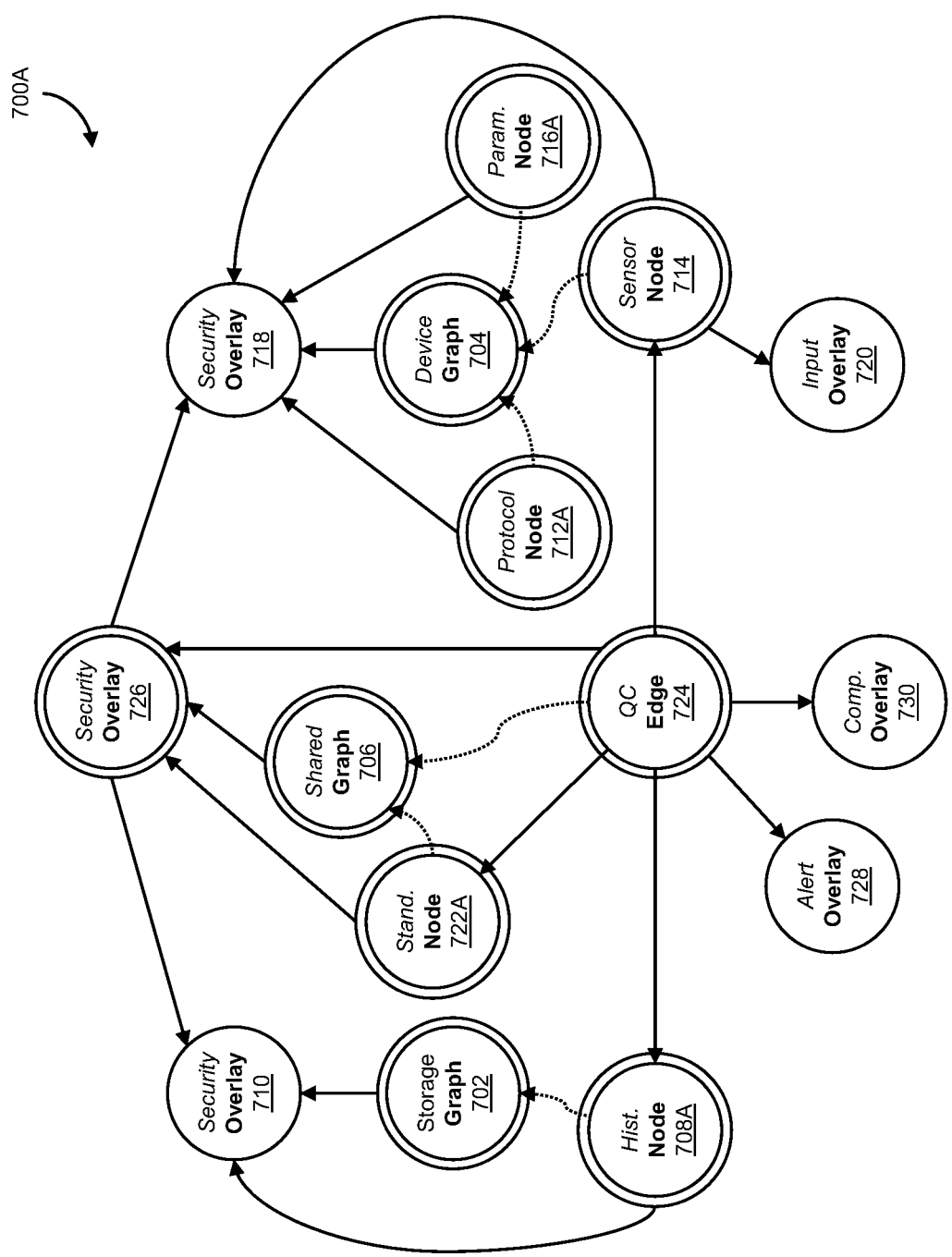
FIG. 7B shows an executable graph-based model generated from the graph-based model shown in FIG. 7A according to an embodiment of the present disclosure.

FIG. 7B shows an executable graph-based model 700A generated from the graph-based model 700 shown in FIG. 7A.

The executable graph-based model 700A corresponds to an executable version, or runtime version, of the graph-based model 700 shown in FIG. 7A. That is, the executable graph-based model 700A comprises the data structure and overlay structure that is held in memory after the graph-based model 700 is loaded and the executable graph-based model 700A subsequently generated.

As described in detail above in relation to FIGS. 5A-5G, the overlay structure of an executable graph-based model may differ from that of the graph-based model from which the executable graph-based model is generated. In the example shown in FIG. 7B, the executable graph-based model 700A differs from the graph-based model 700 in FIG. 7A in that the historical data node 708, the protocol node 712, the parameter node 716, and the standards node 722 are generated as executable nodes within the executable graph-based model 700A. That is, the historical data node 708A, the protocol node 712A, the parameter node 716A, and the standards node 722A in the executable graph-based model are all executable nodes having their corresponding nodes within the graph-based model 700 as the base node. As such, the historical data node 708A is generated such that the security overlay 710 is registered in its overlay manager, the protocol node 712A and the parameter node 716A are generated such that the security overlay 718 is registered in their overlay managers, and the standards node 722A is generated such that the security overlay 726 is registered in its overlay manager. The additional difference between the graph-based model 700 and the executable graph-based model 700A is that the security overlay 718 is associated with the sensor node 714 in the executable graph-based model 700A and the security overlay 726 is associated with the QC edge node 724 in the executable graph-based model 700A.

As stated above in relation to FIGS. 5A-5G, the construction of the overlay structure within the executable graph-based model 700A is achieved using a traversal-based approach which is performed once when the graph is loaded. Consequently, the respective overlay managers within the executable graph-based model 700A hold all the requisite overlay nodes (or references thereto) such that the overlay nodes can be efficiently and quickly executed at run-time without requiring the need to re-perform the traversal, as shown in FIG. 7C.

Figure 7C:
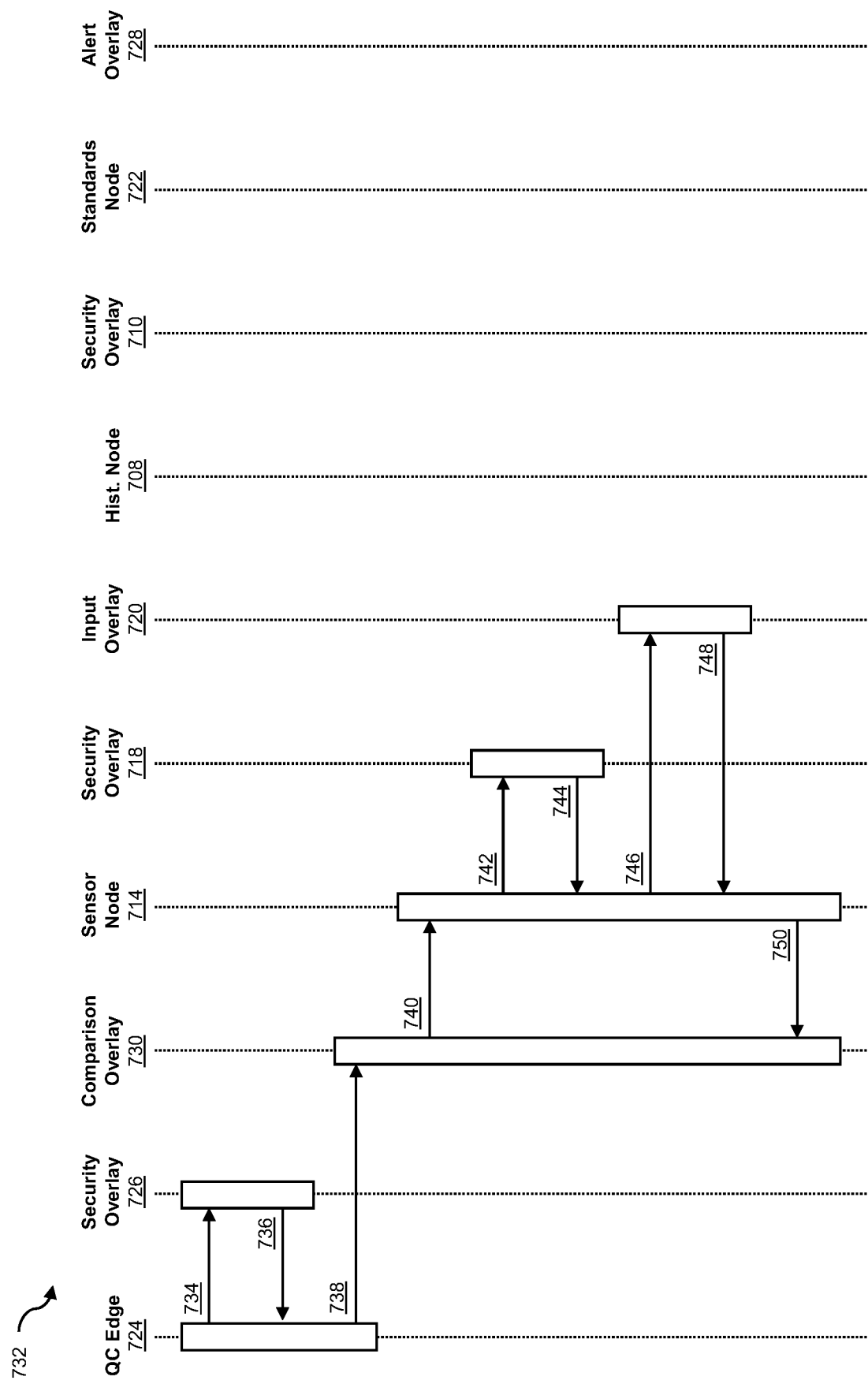
FIGS. 7C and 7D shows a sequence diagram of an example execution of the executable graph-based model shown in FIG. 7A.

FIG. 7C shows a sequence diagram 732 of an example execution of the executable graph-based model 700A shown in FIG. 7B.

The sequence diagram 732 shown in FIG. 7C illustrates an example execution sequence involving the QC edge node 724, the security overlay 726, the comparison overlay 730, the sensor node 714, the security overlay 718, the input overlay 720, the historical data node 708, the security overlay 710, the standards node 722, and the alert overlay 728 shown in FIG. 7B.

The execution sequence starts with a stimulus and associated context being received by the QC edge node 724. Within the context of the wider system within which the executable graph-based model functions (e.g., the system 300 shown in FIG. 3), the stimulus and corresponding context are received by the system and processed by a stimuli management module (e.g., the stimuli management module 312 of the system 300). The stimuli management module is communicatively coupled to the relevant overlay managers of the nodes within the executable graph-based model (e.g., the overlay manager 470 shown in FIG. 4C) such that the stimuli management module is operable to pass the stimulus and context to the relevant node's overlay manager which then passes the stimulus and context to the relevant overlay(s) for processing/execution.

Upon receiving the stimulus, the overlay manager of the QC edge node 724 is configured such that the security overlay 726 is identified as the first overlay associated with the QC edge node 724 to be executed (i.e., the highest priority overlay). A further stimulus 734 is fired to execute the processing logic of the security overlay 726. The security overlay 726 processes the stimulus to determine if access to the functionality of the QC edge node 724 is to be granted based on the associated context (e.g., if the user associated with the stimulus has sufficient privileges). An outcome 736 is then provided by the security overlay 726 indicating that the stimulus received by the QC edge node 724 (and associated context) meet the security requirements of the security overlay 726. In consequence, a stimulus 738 is fired to carry out the request associated with the stimulus. The stimulus 738 is received by the comparison overlay 730 which then executes the relevant processing logic to begin the process of performing the quality control check.

The processing logic of the comparison overlay 730 fires a stimulus 740 to obtain a sensor reading from the sensor node 714. The overlay manager of the sensor node 714 identifies the security overlay 718 as the first overlay to be executed when such a stimulus is received. As stated above, the security overlay 718 is not associated with the sensor node 714 within the graph-based model 700 but is associated with the sensor node 714 during the generation of the executable graph-based model 700A. A stimulus 742 is fired by the sensor node 714 and received by the security overlay 718. The security overlay 718 executes the relevant processing logic to determine if the security requirements are met (e.g., if the user associated with the original stimulus has sufficient privileges to obtain sensor readings from the device). An outcome 744 is then provided to the sensor node 714 to indicate that the security requirements are met.

A stimulus 746 is then fired and received by the input overlay 720. The stimulus 746 is associated with a request to obtain a sensor reading or measurements of the tube. That is, in response to the stimulus 746 being received, the input overlay 720 executes processing logic to obtain one or more measurements of the tube being manufactured. As stated previously, this could include obtaining measurements from a metrology device or obtaining an image of the tube and deriving measurements therefrom. Once the measurements have been obtained, an outcome 748 is provided to the sensor node 714. The outcome 748 comprises the measurements obtained. In an embodiment, the measurements are also stored as values of one or more attributes of the sensor node 714. An outcome 750 comprising the measurements obtained by the input overlay 720 is then provided from the sensor node 714 to the comparison overlay 730.

Figure 7D:
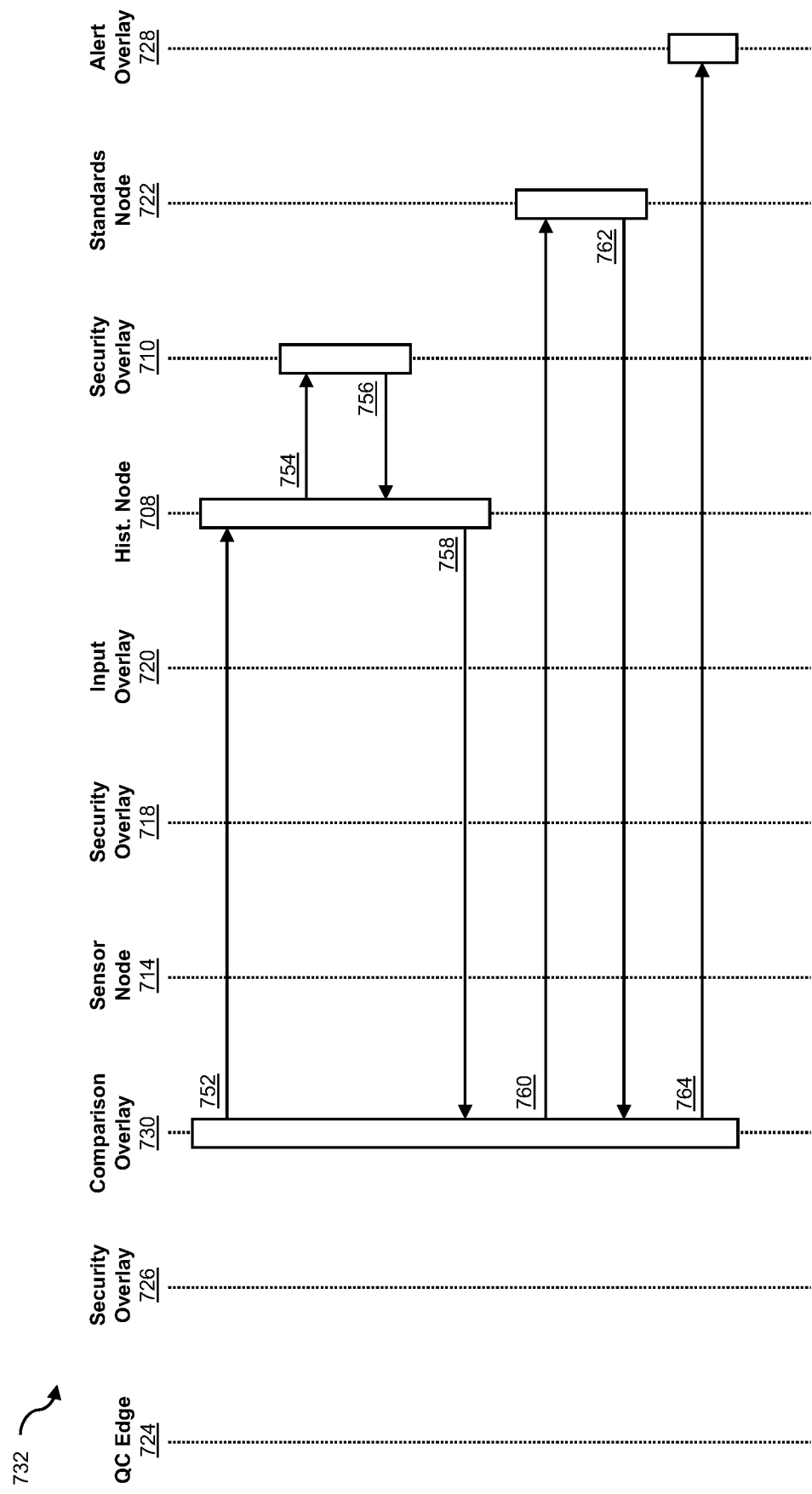

The sequence diagram 732 continues in FIG. 7D, which shows a stimulus 752 fired from the comparison overlay 730 in order to obtain historical data from the historical data node 708. During generation of the executable graph-based model 700A, the security overlay 710 was associated with the historical data node 708 such that the security overlay 710 is registered with the overlay manager of the historical data node 708 in the executable graph-based model 700A. A stimulus 754 is fired and received by the security overlay 710 which determines if the security requirements are met to provide access to the historical data. An outcome 756 is provided by the security overlay 710 to the historical data node 708 to indicate that the security requirements have been met. In consequence, an outcome 758 is provided by the historical data node 708 to the comparison overlay 730. The outcome 758 comprises the historical data requested by the comparison overlay 730.

The processing logic of the comparison overlay 730 then causes a stimulus 760 to be fired to request the standards data from the standards node 722. As the standards node 722 and the QC edge node 724 are within the same sub-graph (i.e., the shared sub-graph node 706), the security overlay 726 does not need to be invoked to handle the request. An outcome 762 comprising the requested historical data is provided from the standards node 722 to the comparison overlay 730.

Once all the relevant data has been collected, the comparison overlay 730 executes processing logic to determine if the measurements of the tube fall within the acceptable ranges defined by the data obtained from the standards node 722. The processing logic also compares the measurements to the historical data obtained from the historical data node 708 to identify patterns such as potential drift which could indicate a failure in the manufacturing process. If the measurements do not fall within the acceptable ranges, or a pattern such as drift has been identified, a stimulus 764 is fired and received by the alert overlay 728. The alert overlay 728 then executes processing logic to issue an alert indicative of the issue identified by the comparison overlay 730.

Thus, the graph-based model 700 and the executable graph-based model 700A shown in FIGS. 7A and 7B provide a reusable, scalable, and efficient approach to modelling and processing data. Because the data and data processing logic is separate while offline, the two components can be managed separately by their respective owners. Because the executable graph-based model 700A integrates the data and the data processing functionality at run-time, the model can respond efficiently to stimuli and therefore reduce the latency of the system. Moreover, the partitioning of the graph-based model 700 and the executable graph-based model 700A into sub-graphs provides an efficient way of managing system resources. Specifically, the graph-based model 700 may form a graph within a larger executable graph-based model which models the manufacturing system such that the executable graph-based model 700A is only generated "on-demand". That is, the executable graph-based model 700A is only loaded into system memory when a stimulus is received to perform a quality control check. As such, the executable graph-based model 700A does not need to remain in system memory thus making more efficient use of system resource and reducing the security vulnerabilities associated with maintain such data and processing logic within a "live" system.

The visualization of the graph-based model 700 and the executable graph-based model 700A shown in FIGS. 7A and 7B correspond to visual representations of various elements within such models. As will be described in more detail below in relation to FIGS. 8A-8E, this visual representation, and the corresponding interactive user interface functionality, provides an efficient man-machine interface for exploring the functional structure of graphs and sub-graphs within an executable graph-based model whilst maintaining the contextual information provided by the topological layout of the overall graph.

FIGS. 8A-8E illustrate the visualization of hierarchical graphs and sub-graphs according to an aspect of the present disclosure.

Figure 8A:
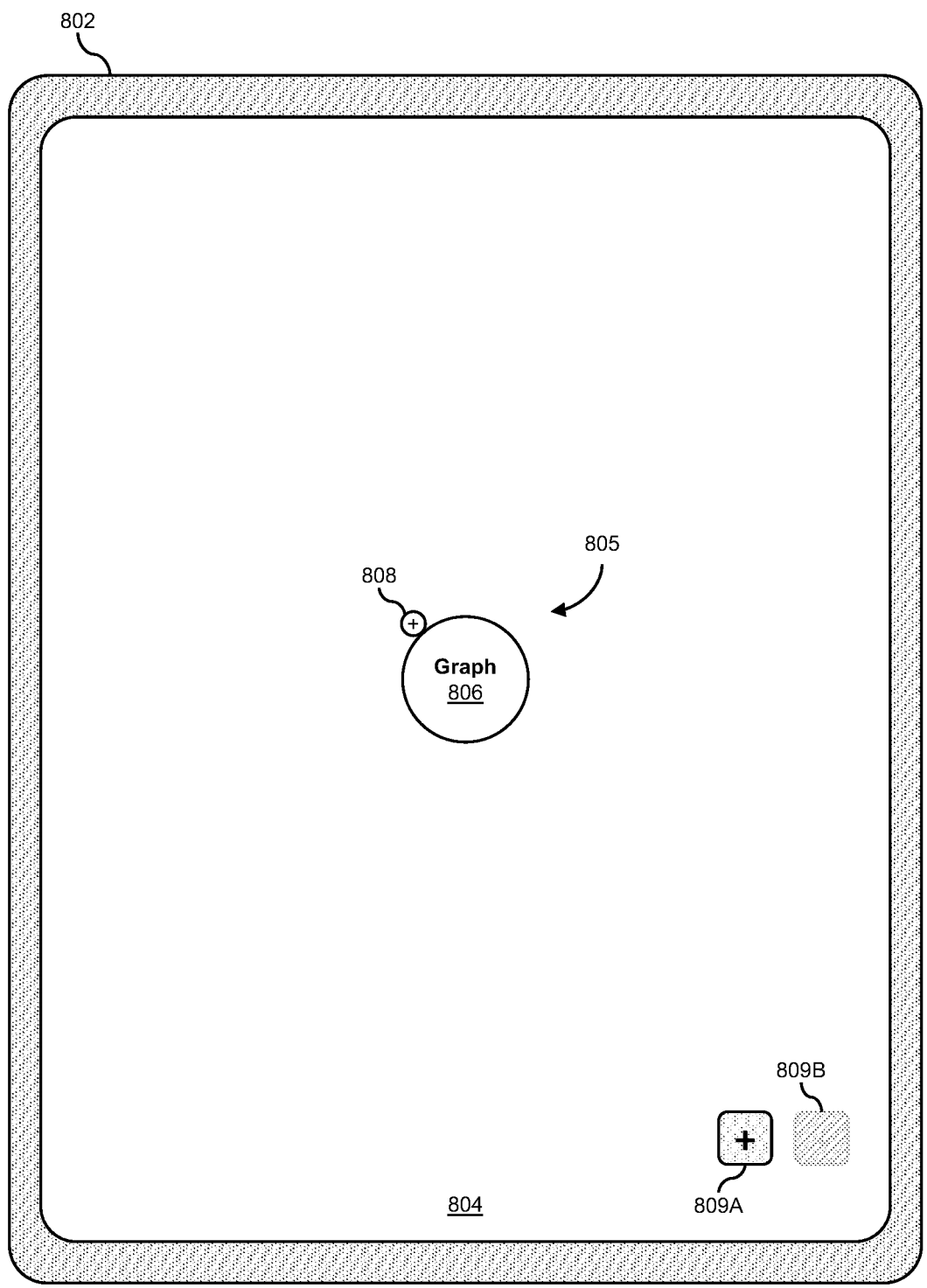
FIG. 8A-8E illustrate the visualization of hierarchical graphs and sub-graphs according to an aspect of the present disclosure.

FIG. 8A shows a device 802 upon which a user interface 804 is displayed. A graphical representation 805 of an executable graph-based model is displayed within the user interface 804. The graphical representation 805 comprises a first display element 806 associated with a sub-graph, or graph, of the executable graph-based model. A first selector 808 is also displayed within the user interface 804 along with a second selector 809A and a third selector 809B. Although the examples shown in FIGS. 8A-8E correspond to executable graph-based models, the overlay structure is not shown. The skilled person will appreciate that the overlay structure of the executable graph-based models can be incorporated as part of the visualizations shown in FIGS. 8A-8E as illustrated by the example overlay structures displayed elsewhere in the present disclosure (e.g., FIG. 7B). Moreover, the visualizations shown in FIGS. 8A-8E are also applicable to graph-based models. In embodiments, a user, through an administration module (e.g., the administration module 328 of the system 300 shown in FIG. 3) utilizes an application with a user interface such as the user interface 804 to generate and configure a graph-based model, add one or more overlays to the graph-based model, and then visualize the resulting executable graph-based model. As such, the skilled person will appreciate that the user interface 804 shown in FIGS. 8A-8E correspond to a simplified representation of these steps for the purpose of illustration and explanation of the present disclosure.

As shown in FIG. 8A, the first display element 806 is represented by a circle. The skilled person will appreciate that any suitable shape can be used for the representation of display elements which include circles, squares, polygons, etc. Moreover, whilst the examples in FIG. 8A-8E show the display elements such as the first display element 806 containing text and integer numbering, the skilled person will appreciate that this is for reference purposes only and in implementations of the present disclosure the display elements may be displayed with different text, icons, or other visual data.

The first display element 806 represents the sub-graph at a first level of detail. The first level of detail corresponds to the highest level of detail of the sub-graph. That is, although the sub-graph contains further nodes and sub-graphs, these are collapsed within the first display element 806. However, the user is provided with a visual indication that further levels of detail are viewable because the first selector 808 and the second selector 809A indicate that the level of detail can be increased (e.g., as indicated by the "+" icon displayed on the first selector 808 and the second selector 809A). In contrast, the third selector 809B, which comprises a "−" icon has been disabled thus indicating that the level of detail cannot be decreased further.

Figure 8B:
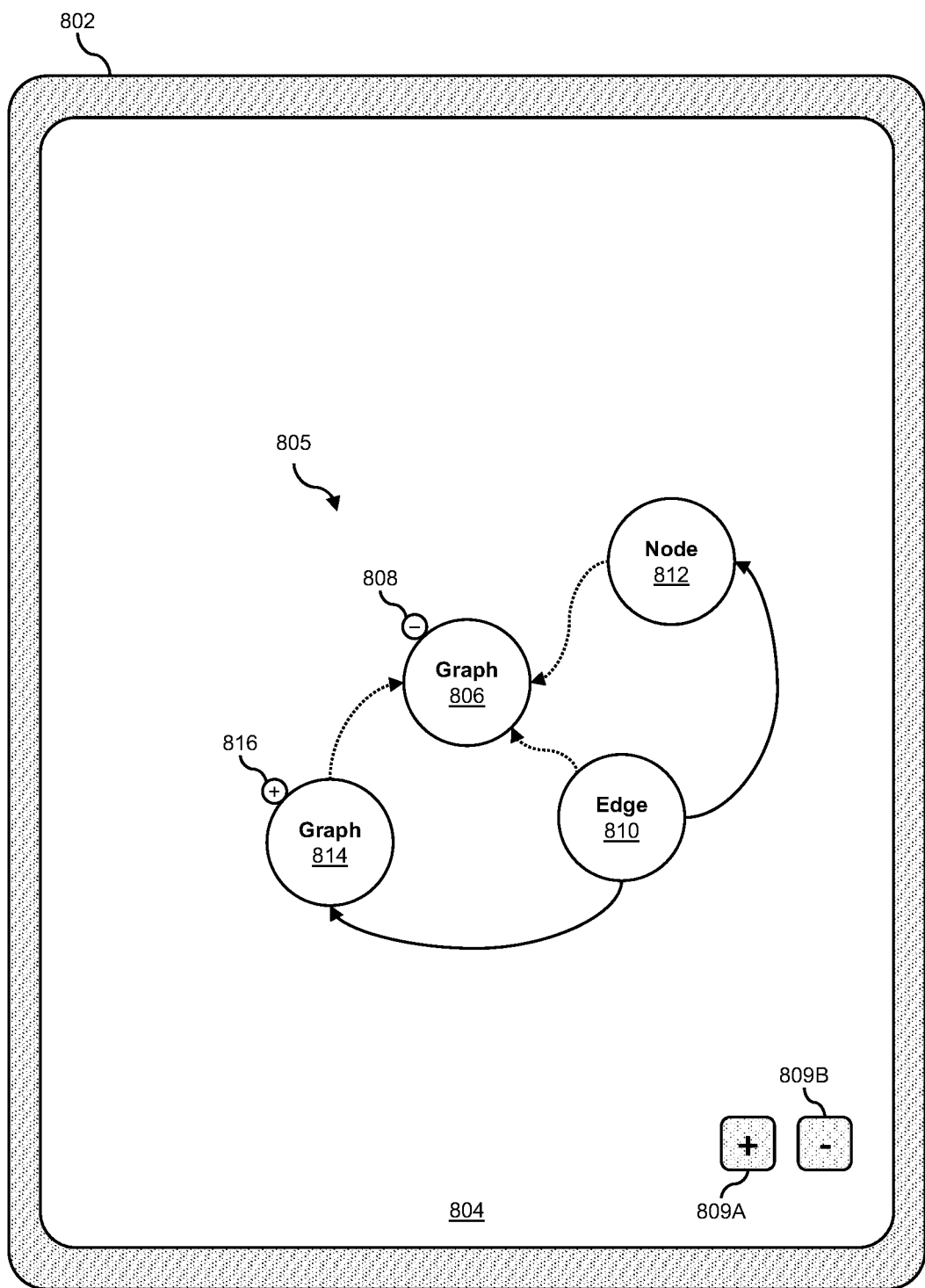

Both the first selector 808 and the second selector 809A are selectable by a user (i.e., by means of a user input at or near to the selectors) and result in the level of detail of the sub-graph being increased as shown in FIG. 8B.

FIG. 8B shows the hierarchical graph structure shown in FIG. 8A at a second level of detail, where the second level of detail is greater than the first level of detail associated with the sub-graph in FIG. 8A.

FIG. 8B shows the graphical representation 805 of the executable graph-based model comprising the first display element 806, a second display element 810 associated with an edge node, a third display element 812 associated with a node and a fourth display element 814 associated with a sub-graph. The edge node, the node, and the sub-graph are all a part of the graph associated with the first display element 806. A fourth selector 816 is also displayed proximate the fourth display element 814.

The second display element 810, the third display element 812, and the fourth display element 814 are displayed in a "flower petal" layout around the first display element 806. That is, the display elements are positioned circumferentially around the first display element 806. This provides a visual indication to the user that the edges, nodes, and sub-graphs to which these display elements relate are all a part of the graph defined by the graph node associated with the first display element 806. This relationship is further shown by the dotted lines extending from each of the second display element 810, the third display element 812, and the fourth display element 814 to the first display element 806. The solid line extending from the second display element 810 to the third display element 812, and the solid line extending from the second display element 810 to the fourth display element 814 indicate a connective relationship—in this instance the node is connected to the edge (via a role which is not displayed) and the sub-graph is connected to the edge (via a role which is not displayed).

Selection of the first selector 808 or the third selector 809B by a user input would result in a decrease of the level of detail and thus the user interface 804 would return to that shown in FIG. 8A.

Selection of the second selector 809A or the fourth selector 816 would result in the level of detail increasing. That is, the sub-graph associated with the fourth display element 814 is currently displayed in a collapsed state. Because the sub-graph associated with the fourth display element 814 is a sub-graph of the graph associated with the first display element 806, increasing the level of detail increase the level of detail of the overall graph and the sub-graph. That is, the sub-graph associated with the fourth display element 814 is shown in FIG. 8B at a first level of detail, and selection of the second selector 809A or the fourth selector 816 would result in this level of detail increasing, as shown in FIG. 8C.

Figure 8C:
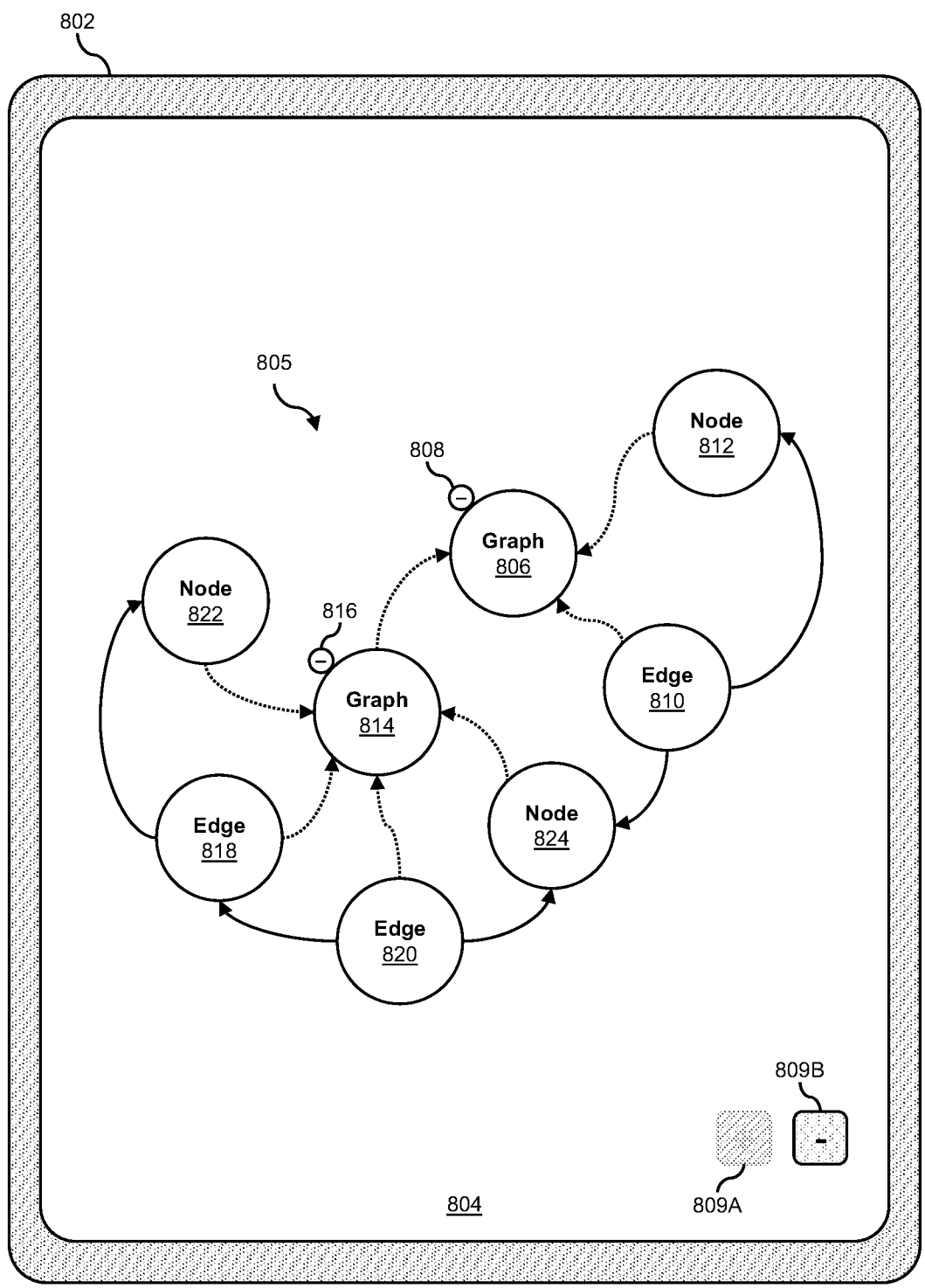

FIG. 8C shows the hierarchical graph structure shown in FIG. 8B at a greater level of detail.

FIG. 8C shows the graphical representation 805 of the executable graph-based model which includes the first display element 806, the second display element 810, and the third display element 812. However, as the level of detail has been increased from that of FIG. 8B, the fourth display element 814 associated with a sub-graph has been replaced by a fifth display element which represents the sub-graph at a level of detail greater than that shown in FIG. 8B. The compound display element (i.e., the fifth display element) comprises the fourth display element 814, a fifth display element 818 associated with an edge of the sub-graph, a sixth display element 820 associated with an edge of the sub-graph, a seventh display element 822 associated with a node of the sub-graph, and an eighth display element 824 associated with a node of the sub-graph. The display elements are displayed in a flower petal layout around the fourth display element 814 thereby indicating their relationship to the root node represented by the fourth display element 814. That is, the display elements are positioned circumferentially around the fourth display element 814. As the level of detail shown in FIG. 8C corresponds to the maximum level of detail, the second selector 809A has been disabled. Selection of either the third selector 809B or the fourth selector 816 by a user input would result in the user interface 804 shown in FIG. 8B being displayed (i.e., the level of detail is decreased by one). Selection of the first selector 808 by a user input would result in the user interface 804 shown in FIG. 8A being displayed (i.e., the entire graph structure is collapsed down to a single display element).

Additionally, the connective relationship between the edge represented by the second display element 810 and the graph represented by the fourth display element 814 in FIG. 8B is shown in greater detail in FIG. 8C. Specifically, it can be seen in FIG. 8C that the edge represented by the second display element 810 connects with the node associated with the eighth display element 824. That is, the connective relationship shown in FIG. 8B was illustrated at a level of granularity, or detail, higher than the actual relationship, since the graph associated with the fourth display element 814 is shown in a collapsed state in FIG. 8B.

Figure 8D:
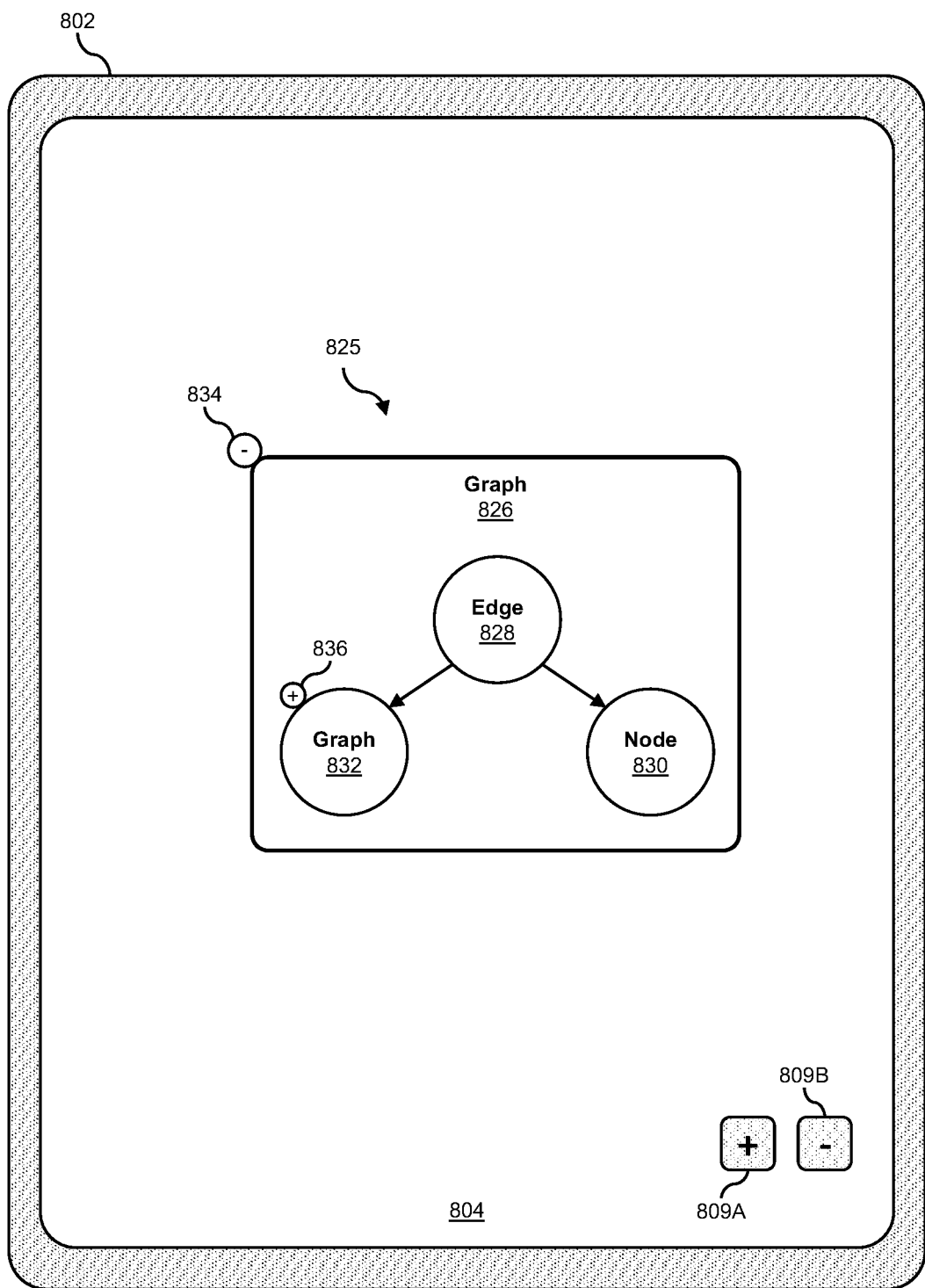
Figure 8E:
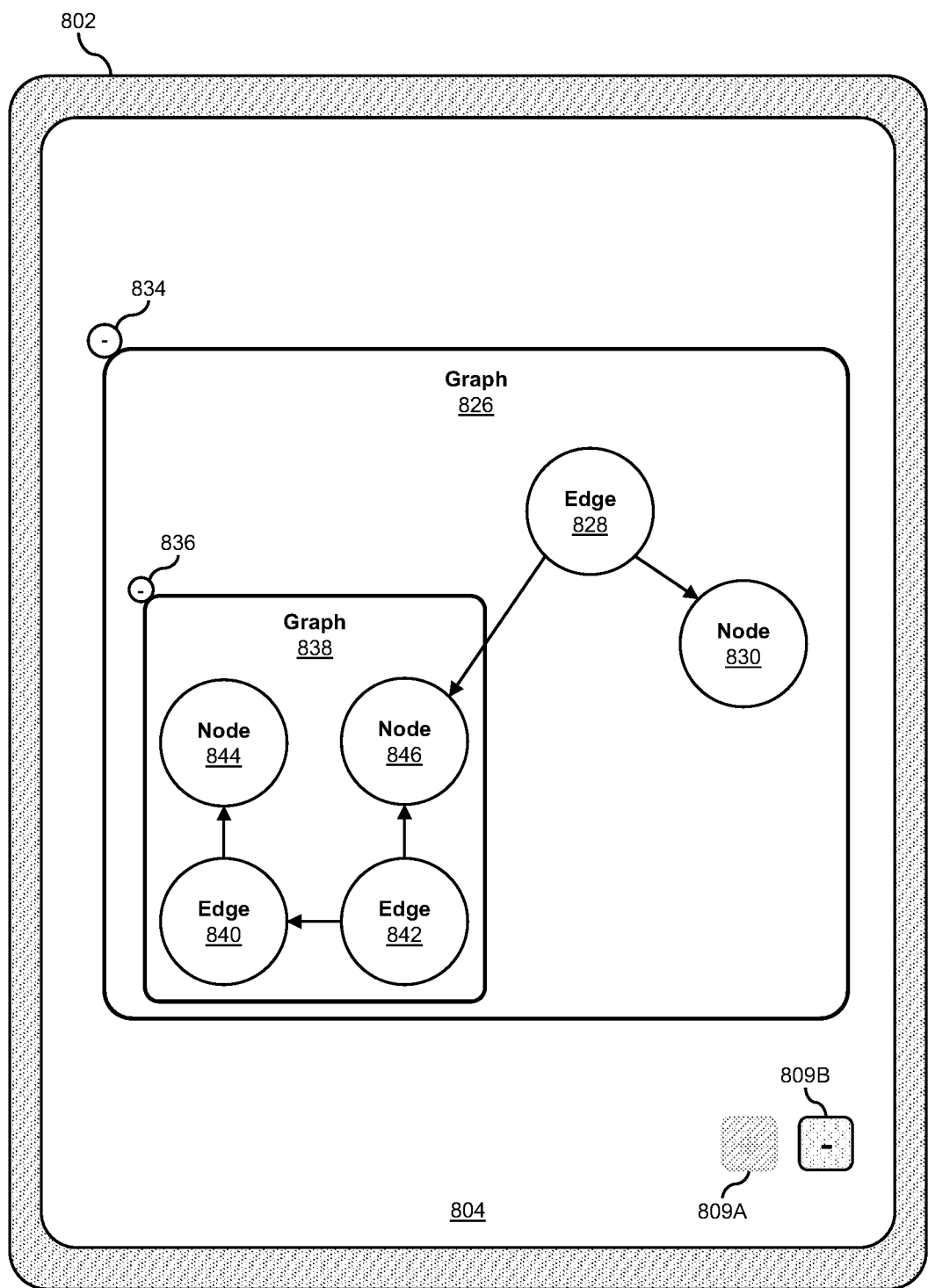

FIGS. 8D and 8E show alternative layouts of the graph structure according to an embodiment of the present disclosure.

FIG. 8D shows a user interface 804 comprising a graphical representation 825 of the executable graph-based. The user interface 804 comprises a first display element 826 associated with a graph, a second display element 828 associated with an edge, a third display element 830 associated with a node, and a fourth display element 832 associated with a sub-graph of the graph. A first selector 834 is shown proximate the first display element 826.

The hierarchical graph structure shown in FIG. 8D is represented at a first level of detail. As such it corresponds to an alternate layout to that shown in FIG. 8B. By displaying the display elements associated with the elements (i.e., nodes, edges, sub-graphs, etc.) of the graph within the boundaries of the first display element 826, the user is provided with a visual indication that the graph elements to which the display elements relate are all part of the graph associated with the first display element 826. In an embodiment, the user interface 804 of FIG. 8D is shown after the user interface 804 of FIG. 8A after a user input related to either the first selector 808 or the second selector 809A is received. A user input related to either the third selector 809B or the fourth selector 836 results in an increase in level of detail as shown in FIG. 8E.

FIG. 8E shows the hierarchical graph structure shown in FIG. 8D at an increased level of detail.

As shown in FIG. 8E, the fourth display element 832 associated with the sub-graph has been replaced by a fifth display element 838 whilst maintaining display of the first display element 826, the second display element 828, and the third display element 830. A sixth display element 840 associated with an edge of the sub-graph, a seventh display element 842 associated with an edge of the sub-graph, an eighth display element 844 associated with a node of the sub-graph, and a ninth display element 846 associated with a node of the sub-graph are all displayed within the fifth display element 838. The fifth display element 838, the sixth display element 840, the seventh display element 842, the eighth display element 844, and the ninth display element 846 correspond to different visual representations of the fourth display element 814, the fifth display element 818, the sixth display element 820, the seventh display element 822, and the eighth display element 824 shown in FIG. 8C.

By displaying these display elements within the boundaries of the display element associated with the sub-graph, the user is provided with a visual indication that the graph elements to which the display elements relate are all part of the sub-graph associated with the fifth display element 838. Moreover, the user is provided with a clear visual indication of the boundaries of the graphs and the hierarchical relationship of the sub-graph associated with the fifth display element 838 and the graph associated with the first display element 826. Additionally, the connective relationship between the edge represented by the second display element 828 and the graph represented by the fourth display element 832 in FIG. 8D is shown in greater detail in FIG. 8E. Specifically, it can be seen in FIG. 8E that the edge represented by the second display element 828 connects with the node associated with the ninth display element 846. That is, the connective relationship shown in FIG. 8D was illustrated at a level of granularity, or detail, higher than the actual relationship, since the graph associated with the fourth display element 832 is shown in a collapsed state in FIG. 8D.

As the level of detail shown in FIG. 8E corresponds to the maximum level of detail, the second selector 809A has been disabled. Selection of either the third selector 809B or the fourth selector 836 by a user input would result in the user interface 804 shown in FIG. 8D being displayed (i.e., the level of detail is decreased by one). Selection of the first selector 834 by a user input would result in the user interface 804 shown in FIG. 8A being displayed (i.e., the entire graph structure is collapsed down to a single display element).

At a general level, the transitions to and from FIG. 8B to 8C and the transitions to and from FIG. 8D to 8E show that a first display element associated with a sub-graph at a first level of detail is replaced with a second display element of the sub-graph at a second level of detail whilst maintaining display of one or more further display elements associated with other elements (i.e., nodes, edges, sub-graphs, etc.) of the executable graph-based model. The change in level of detail can be an increase (e.g., the transition from FIG. 8B to 8C) or a decrease (e.g., the transition from FIG. 8C to 8B). In either scenario, the topology and layout of the visible portions of the executable graph-based model are maintained whilst the user performs an "in-place" exploration of the hierarchical graph structure. Beneficially, this helps maintain the context of the overall executable graph-based model whilst the level of detail relating to sub-graphs within the executable graph-based model are changed. Moreover, by allowing a user to expand and collapse sub-graphs in the manner shown in FIGS. 8A-8E, more efficient use of screen real estate can be made which can be particularly beneficial on reduced resolution displays.

The description will now turn to methods which operate in conjunction with the systems and functionality described above.

Figure 9:
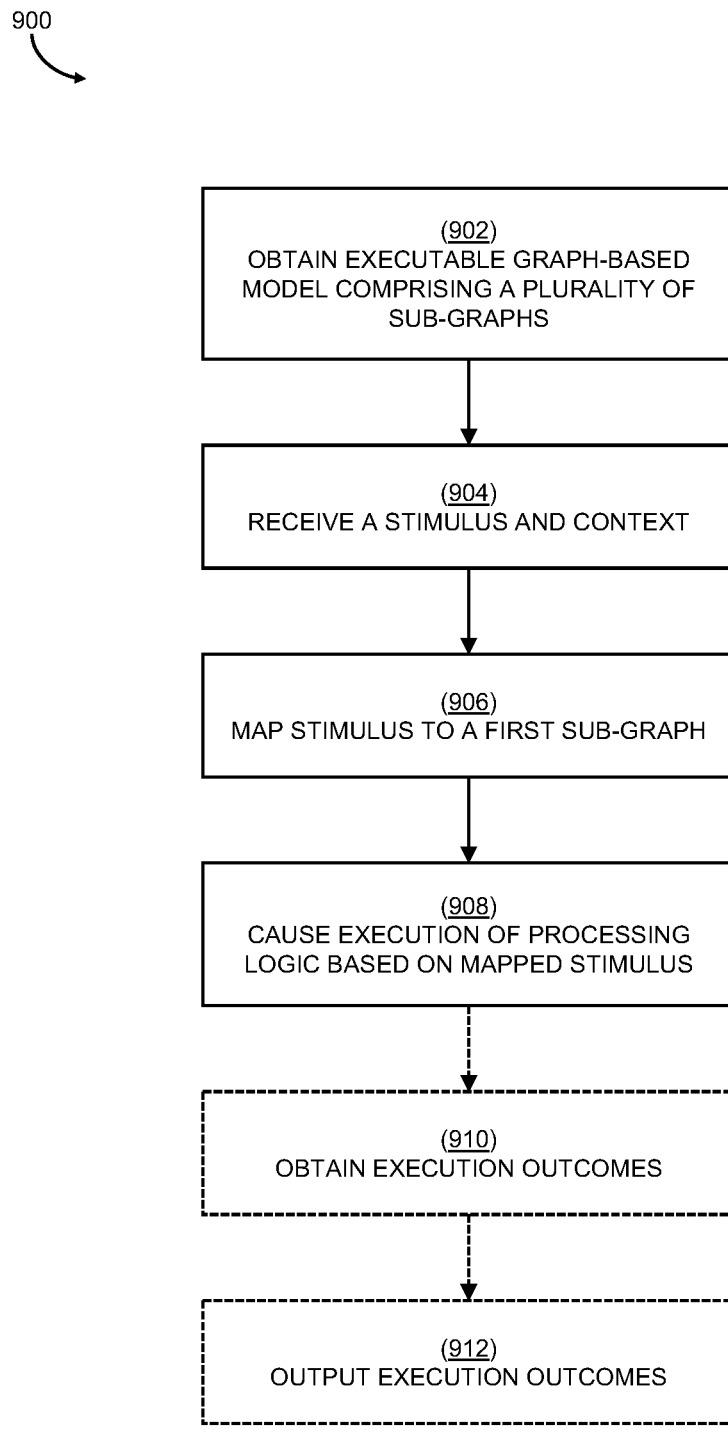
FIG. 9 shows a method for dynamic execution of sub-graphs within executable graph-based models according to an aspect of the present disclosure.

FIG. 9 shows a method 900 for dynamic execution of sub-graphs within executable graph-based models according to an aspect of the present disclosure.

The method 900 comprises the steps of obtaining 902 an executable graph-based model comprising a plurality of sub-graphs, receiving 904 a stimulus and associated context, mapping 906, the stimulus to a first sub-graph, and causing 908 execution of processing logic based on the mapped stimulus. The method 900 also comprises the optional steps of obtaining 910 one or more execution outcomes and outputting 912 the one or more execution outcomes. In one embodiment, the method 900 is performed by a system such as the system 300 described above in relation to FIG. 3.

At the step of obtaining 902, an executable graph-based model is obtained. The executable graph-based model comprises a plurality of sub-graphs and an overlay structure comprising processing logic associated with the plurality of sub-graphs. Each sub-graph defines a hierarchical structure of related nodes. In one embodiment, the executable graph-based model is obtained from memory such that the executable graph-based model is already loaded and generated (e.g., the executable graph-based model 532 shown in FIG. 5G). Alternatively, the executable graph-based model obtained at the step of obtaining 902 is a configured executable graph-based model (an offline executable graph-based model or a graph-based model), such as the graph-based model 500 shown in FIG. 5A. That is, the executable overlay structure has not yet been loaded and generated (as described above in relation to FIGS. 5B-5G).

The nodes within each sub-graph share some common relationship. For example, the nodes may be semantically related, or the nodes may be functionally related. As such, each sub-graph represents an atomic and related unit of data and/or functionality which can be re-used or loaded/executed on demand.

The first sub-graph of the executable graph-based model is defined by a first graph node such that the first graph node is a root node of the first sub-graph. In the example shown in FIG. 5A, the sub-graph is defined by the root graph node 502 which is a root node of the sub-graph.

In one embodiment, the first graph node is composed of one or more further nodes within the first sub-graph. The one or more further nodes comprise one or more of: a data node, a value node, and a role node.

Additionally, or alternatively, the one or more further nodes comprise an edge node comprising a first connective relationship between the first graph node and the edge node. The first connective relationship is defined by a first role. The edge node may further comprise a second connective relationship between the edge node and a second node. The second connective relationship is defined by a second role. In one embodiment, the first sub-graph comprises the second node. In a further embodiment, the second node is not a part of the first sub-graph. The second node may be a graph node which defines a sub graph of the executable graph-based model.

Additionally, or alternatively, the one or more further nodes comprise a second graph node. The second graph node defines a sub-graph of the first sub-graph.

At the step of receiving 904, a stimulus and a context associated with the stimulus are received.

The context is associated with a target executable node of the first sub-graph. The target executable node comprises a composition of a first node of the first sub-graph and a first overlay of the overlay structure. The first overlay comprises processing logic operable to interact with the first node.

At the step of mapping 906, the stimulus is mapped to a first sub-graph of the executable graph-based model in response to the stimulus being received. The stimulus is mapped based on the context.

Consider an example of an executable graph-based model containing four sub-graphs. Each of the sub-graphs comprise a plurality of nodes including executable nodes (i.e., nodes with overlays). A stimulus and context are received and are associated with one of the four sub-graphs by virtue of the stimulus and context being associated with a target executable node within one of the four sub-graphs. Based on this association, the stimulus is mapped to the relevant sub-graph such that the processing logic within the sub-graph can be executed. Beneficially, this is done without requiring all four sub-graphs to be loaded within memory. Once the relevant sub-graph has been identified via the step of mapping 906, that sub-graph is loaded and executed without requiring any of the other three sub-graphs to be loaded (unless there is a functional relationship between the loaded sub-graph and one of the other sub-graphs) at the step of causing 908, execution of processing logic within the overlay structure is caused based on the mapping. The processing logic is associated with one or more nodes of the first sub-graph.

The step of causing 908 execution includes at least causing execution of the processing logic of the target executable node to which the context associated with the stimulus is related. As described in more detail below in relation to FIG. 10, the step of causing 908 execution may also include causing execution of processing logic associated with other executable nodes within the sub-graph.

At the optional step of obtaining 910, one or more outcomes of said execution of processing logic within the overlay structure are obtained. For example, data generated by the executed processing logic may be collated, or any flags or exceptions arising as a result of executing the processing logic may be obtained.

At the optional step of outputting 912, the one or more outcomes are output. The one or more outcomes may be output to an overlay within the executable graph-based model, a unit within the system which manages the executable graph-based model (e.g., the system 300 shown in FIG. 3), or output to one or more systems or devices external to the system.

Figure 10:
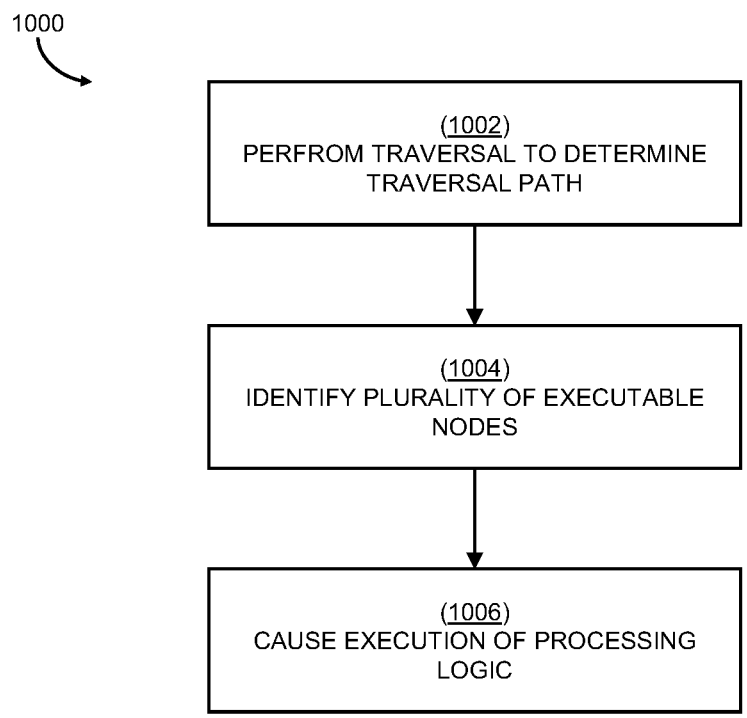
FIG. 10 shows a method for executing processing logic associated with overlay within a sub-graph according to an embodiment of the present disclosure.

FIG. 10 shows a method 1000 for executing processing logic associated with overlay within a sub-graph according to an embodiment of the present disclosure.

The method 1000 comprises the steps of performing 1002 a traversal to determine a traversal path, identifying 1004 a plurality of executable nodes, and causing 1006 execution of processing logic. In one embodiment, the method 1000 is performed after the step of receiving 904 in the method 900 and prior to the step in the method 900 of causing 908 execution such that the step of causing 1006 execution in the method 1000 corresponds to the step of causing 908 execution in the method 900. That is, the method 1000 is performed as part of loading and generating an executable graph-based model in response to a stimulus being received.

At the step of performing 1002, a traversal is performed from the target executable node to the root node of the first sub-graph thereby determining a traversal path. This is illustrated by the traversal path shown in FIG. 5B. A stimulus is mapped to a target executable node—the fourth node 520—and a traversal path is determined from the target executable node to the root node—the root graph node 502. As a result of the traversing performed at this step, the traversal path comprises a first set of nodes from the root node to the target executable node. In the example shown in FIG. 5B, the traversal path comprises the fourth node 520, the third leaf graph node 512, the second composite graph node 508, the first composite graph node 506, and the root graph node 502. As such, the first set of nodes includes the target executable node to which the received stimulus relates.

At the step of identifying 1004, a plurality of executable nodes are identified within the first set of nodes. Each of the plurality of executable nodes comprise a composition of a respective node of the first sub-graph and at least one overlay of the overlay structure.

At the step of causing 1006, execution of processing logic associated with each overlay of the plurality of executable nodes is caused. In the example shown in FIG. 5G, causing execution of processing logic associated with the fourth node 520 (the target node) would result in execution of processing logic for the first overlay node 522, the third overlay node 526, the fourth overlay node 528 and/or the fifth overlay node 530.

Figure 11:
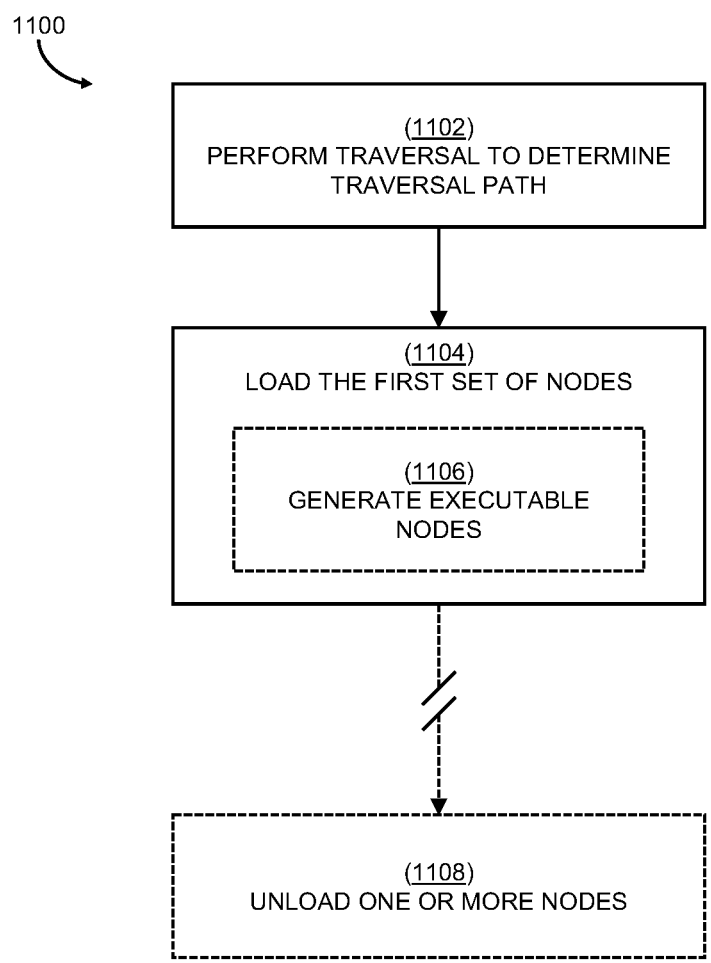
FIG. 11 shows a method for loading and unloading one or more nodes within a sub-graph according to an embodiment of the present disclosure.

FIG. 11 shows a method 1100 for loading and unloading one or more nodes within a sub-graph according to an embodiment of the present disclosure.

The method 1100 comprises the steps of performing 1102 a traversal to determine a traversal path and loading 1104 a first set of nodes. The method 1100 further comprises the optional steps of generating 1106 executable nodes as part of the step of loading 1104 the first set of nodes and unloading 1108 one or more nodes. In one embodiment, the method 1000 is performed after the step of receiving 904 in the method 900 and prior to the step in the method 900 of causing 908 execution.

The step of performing 1102 a traversal corresponds to the step of performing 1002 a traversal as described above in relation to FIG. 10.

At the step of loading 1104, the first set of nodes identified as a result of performing 1102 the traversal are loaded into a memory (e.g., a memory operatively coupled to the processing circuitry which is carrying out the method 1100). The first set of nodes are loaded in order from the root node to the target executable node. In the example traversal path shown in FIG. 5B, the nodes would be loaded in the order of the root graph node 502, the first composite graph node 506, the second composite graph node 508, the third leaf graph node 512, and the fourth node 520.

In an embodiment, the step of loading 1104 comprises the step of generating 1106 an executable node. When the first set of nodes comprises a node associated with at least one overlay within the overlay structure the step of generating 1106 comprises generating an executable node comprising a composition of the node and the at least one overlay. When the graph node is associated with at least one overlay (i.e., the graph node, or root graph node, is an executable node), a first set of executable nodes are generated at the step of generating 1106. Each executable node within the first set of executable nodes comprises a composition of a respective node of the first set of nodes and the at least one overlay. For example, and as described in more detail above in relation to FIGS. 5C-5G, when the fourth node 520 is generated, it is associated with the overlay nodes within the sub-graph such that the fourth node 520 is associated with the first overlay node 522, the third overlay node 526, the fourth overlay node 528, and the fifth overlay node 530.

Although the method 1100 in FIG. 11 is shown as proceeding directly from the step of loading 1104 to the step of unloading 1108, the skilled person will appreciate that a number of steps may occur between these steps. For example, the loaded nodes may be manipulated, executed, or otherwise used. As such, the step of unloading 1108 occurs after the step of causing 908 execution in the method 900.

At the optional step of unloading 1108, one or more nodes within the first set of nodes are unloaded (e.g., from the memory). The one or more nodes are unloaded in order from the target executable node to the root node (i.e., in the traversal order determined at the step of performing 1102). In one embodiment, all the nodes within the first set of nodes (i.e., the first sub-graph) are unloaded at the step of unloading 1108. Alternatively, the one or more nodes are unloaded when an unloading criterion is met. That is, a node within the first set of nodes is unloaded when the node meets the unloading criterion. In an embodiment, the unloading criterion is met after a predetermined period of time has elapsed from the step of causing 908 execution in the method 900. In an alternative embodiment, the unloading criterion is based on the received stimulus (i.e., the stimulus received at the receiving 904 step of the method 900 determines when and how the one or more nodes are unloaded).

Figure 12:
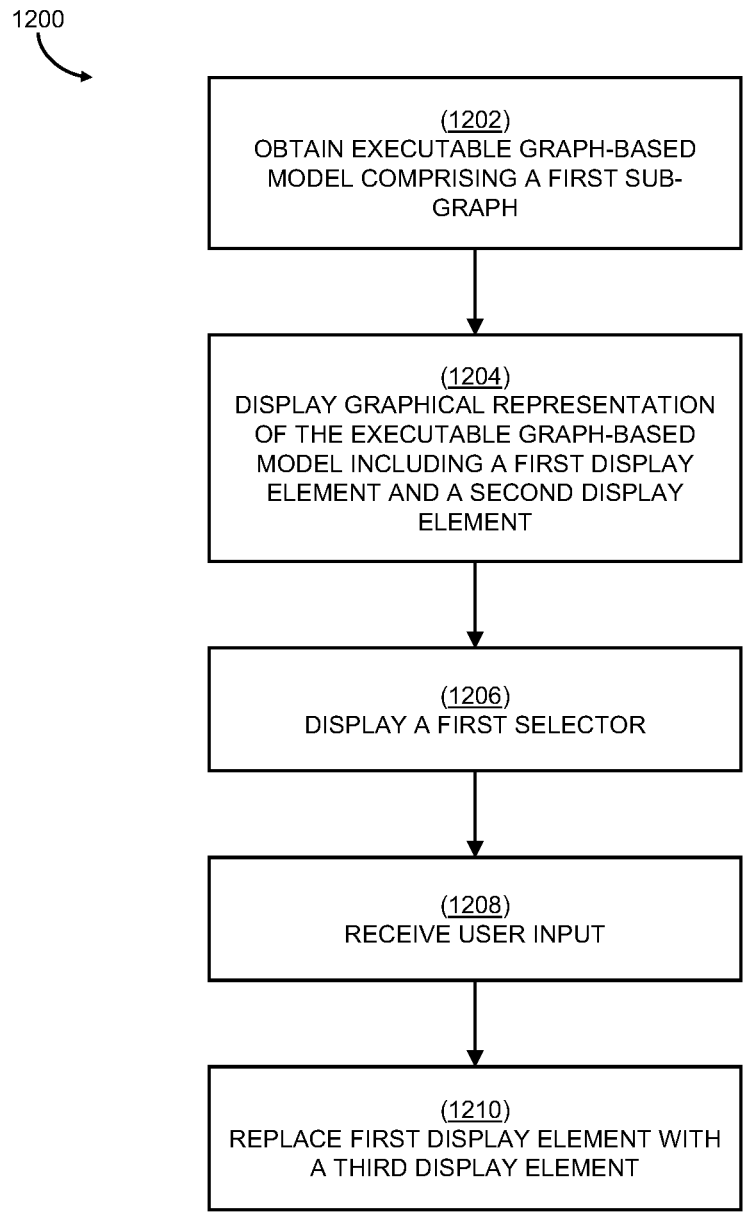
FIG. 12 shows a method for interactive visualization of sub-graphs within an executable graph-based model according to an aspect of the present disclosure.

FIG. 12 shows a method 1200 for interactive visualization of sub-graphs within an executable graph-based model according to an aspect of the present disclosure.

The method 1200 comprises the steps of obtaining 1202 an executable graph-based model comprising a first sub-graph, displaying 1204 a graphical representation of the executable graph-based model including a first display element and a second display element, displaying 1206 a first selector, receiving 1208 a user input, and replacing 1210 the first display element with a third display element. In one embodiment, the method 1200 is performed by a device comprising a display and a user input mechanism such as that described in relation to FIG. 15 below. In an alternative embodiment, the method 1200 is performed by a system such as the system 300 described above in relation to FIG. 3.

At the step of obtaining 1202, an executable graph-based model is obtained. The executable graph-based model comprises a first sub-graph and at least one node. The first sub-graph comprises a hierarchical structure of one or more related nodes.

At the step of displaying 1204, a graphical representation of the executable graph-based model is displayed (e.g., the graphical representation 805 of the executable graph-based model shown in FIG. 8B). The graphical representation comprises a first display element associated with the first sub-graph (e.g., the fourth display element 814 shown in FIG. 8B) and at least one second display element associated with the at least one node (e.g., the third display element 812 shown in FIG. 8B). The first display element represents the first sub-graph at a first level of detail.

At the step of displaying 1206, a first selector associated with the first display element is displayed (e.g., the fourth selector 816 associated with the fourth display element 814 in FIG. 8B). The first selector is displayed proximate the first display element. Alternatively, the first selector and the first display element are contiguous, as shown in FIG. 8B where the fourth selector 816 and the fourth display element 814 are contiguous (i.e., their outer edges are touching).

At the step of receiving 1208, a first user input associated with the first selector is received.

At the step of replacing 1210, the first display element of the graphical representation of the executable graph-based model is replaced with a third display element in response to the first user input being received (e.g., the fourth display element 814 shown in FIG. 8B is replaced in FIG. 8C by the compound display element comprising the fourth display element 814, the fifth display element 818, the sixth display element 820, the seventh display element 822, and the eighth display element 824). The third display element represents the first sub-graph at a second level of detail. As shown in the transition from the user interface 804 in FIG. 8B to the user interface 804 in FIG. 8C the second level of detail is greater than the first level of detail. Alternatively, the second level of detail is less than the first level of detail. For example, the transition from the user interface 804 in FIG. 8C to the user interface 804 in FIG. 8B where the compound display element is replaced by the fourth display element 814. The first display element is replaced with the third display element whilst maintaining display of the at least one second display element (e.g., the third display element 812 is maintained in both FIG. 8B at the first level of detail and in FIG. 8C at the second level of detail).

Figure 13:
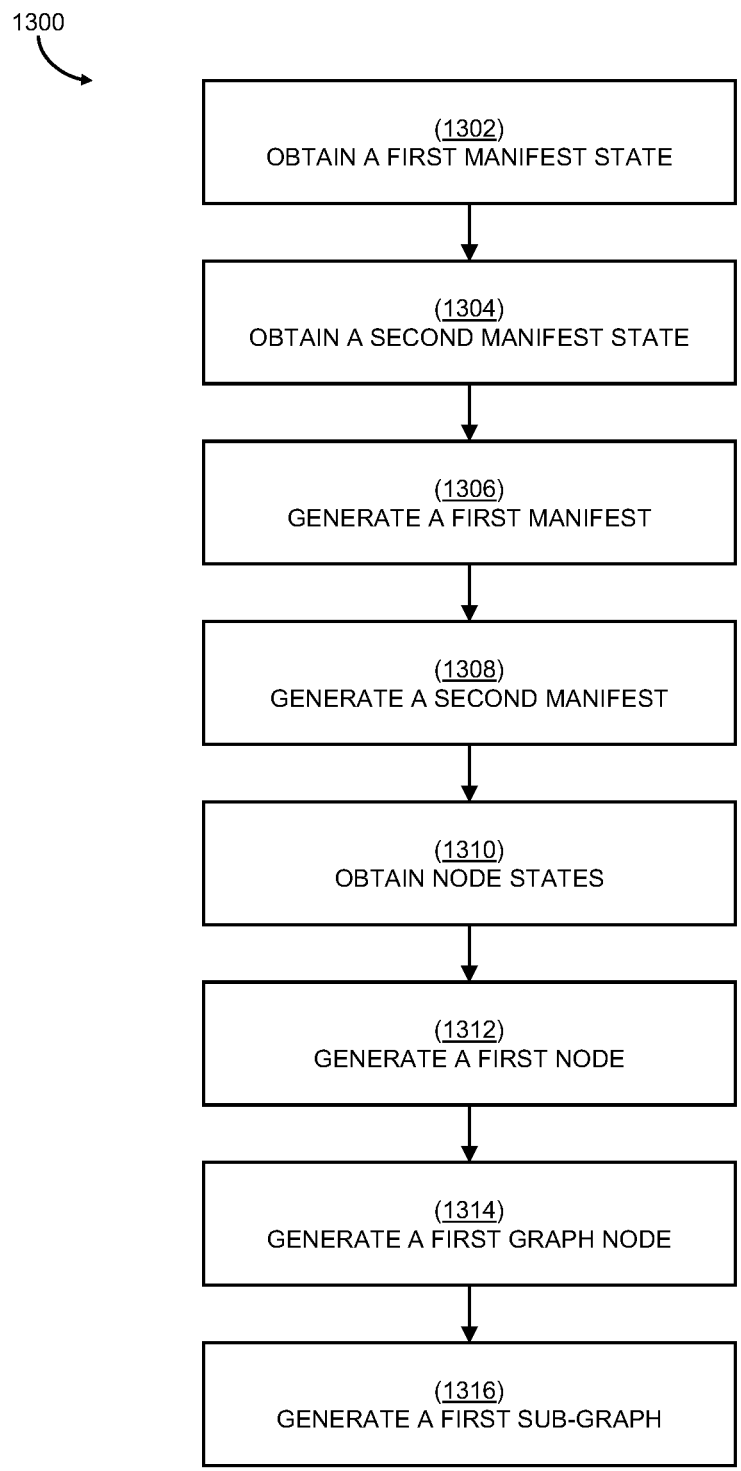
FIG. 13 shows a method for loading of sub-graphs in executable graph-based models according to an aspect of the present disclosure.

FIG. 13 shows a method 1300 for loading of sub-graphs in executable graph-based models according to an aspect of the present disclosure.

The method 1300 comprises the steps of obtaining 1302 a first manifest state, obtaining 1304 a second manifest state, generating 1306 a first manifest, generating 1308 a second manifest, obtaining 1310 node states, generating 1312 a first node, generating 1314 a first graph node, and generating 1316 a first sub-graph. In one embodiment, the method 900 is performed by a system such as the system 300 described above in relation to FIG. 3.

At the step of obtaining 1302, a first manifest state is obtained based on a first identifier (e.g., the manifest state 652 associated with the unique identifier 648 shown in FIG. 6B). The first manifest state comprises the first identifier and a second identifier (e.g., the graph identifier 638 shown in FIG. 6B).

The first identifier is the unique identifier of the node to which the first manifest state relates. As such, the method 1300 may further comprise the step of obtaining the first identifier (not shown). For example, as a result of a user request or as a result of a stimulus or event such as a stimulus associated with dynamically loading a sub-graph. The second identifier is used to identify the immediate, or direct, parent of the node to which the first manifest relates (as shown in FIG. 6B).

At the step of obtaining 1304, a second manifest state is obtained based on the second identifier (e.g., the manifest state 642 shown in FIG. 6B is obtained based on the graph identifier 638 obtained from the manifest state 652). The second manifest state comprises the second identifier.

At the step of generating 1306, a first manifest is generated from the first manifest state (e.g., the manifest 650 is generated, or extracted, from the manifest state 652). The first manifest comprises a first node state storage location, the first identifier, and the second identifier. Because the node state is stored separately from the manifest state, the location of the node state is maintained within the manifest. Here, the storage location corresponds to a file path, or location (e.g., URL), at which the node state has been persistently stored (saved).

At the step of generating 1308, a second manifest is generated from the second manifest state (e.g., the manifest 640 is generated, or extracted, from the manifest state 642). The second manifest comprises a second node state storage location and the second identifier.

At the step of obtaining 1310, a first node state and a second node state are obtained from the first node state storage location and the second node state storage location respectively. A node state, or simply state, comprises all data required to reconstruct the node (e.g., attributes, properties, etc.). In the example shown in FIG. 6B, the state 656 is obtained from the storage location identified within the manifest 650 whilst the state 636 is obtained from the storage location identified within the manifest 640.

At the step of generating 1312, a first node is generated based on the first manifest and the first node state (e.g., the node 644 is generated based on the manifest 650 and the state 646). The first node comprises the first identifier and the second identifier.

At the step of generating 1314, a first graph node is generated based on the second manifest and the second node state (e.g., the graph node 634 is generated based on the manifest 640 and the state 636). The first graph node comprises the second identifier.

At the step of generating 1316, a first sub-graph of an executable graph-based model is generated by associating the first node with the first graph node.

The above steps are repeated for all parent nodes within the sub-graph until the root node of the sub-graph is reached. That is, by starting from the target node to be loaded (i.e., the first node) and recursively loading any directly referenced parent nodes, a traversal based loading is performed from the target node to the root node For example, if the first graph node contains references to a parent node (in the way in which the first node references the first graph node via reference to the parent node's graph identifier), then the parent node is loaded from its manifest state as described above. Moreover, whilst the above is related to loading a single node and associating that node with its containing graph node, the skilled person will appreciate that the steps related to loading and generating the first node above can be repeated for one or more further nodes which are identified as part of the sub-graph by the relevant graph identifier which is stored with the node manifests. As stated in more detail in relation to FIGS. 5C-5G, the overlay structure of the executable graph-based model is then generated by "cascading down" overlay nodes from parent graph nodes to child graph nodes.

In one embodiment, a shared sub-graph is loaded. The shared sub-graph is identified by a third identifier which is stored with the second manifest state. In such an embodiment, the shared sub-graph is loaded by loading the shared sub-graph-based on the third identifier (i.e., using the loading method described above) and then associating the shared sub-graph with the first sub-graph. As described above, the overlays associated with executable nodes within shared sub-graphs are based on the calling path in the hierarchy which can depend on the context of the associated request or stimulus.

The skilled person will appreciate that referenced overlay(s) of an executable node are not considered in the persistence, only those that are owned by the node directly. This is because the configuration of a parent node can change, and so hard coded associations that are liable to break are avoided.

Figure 14:
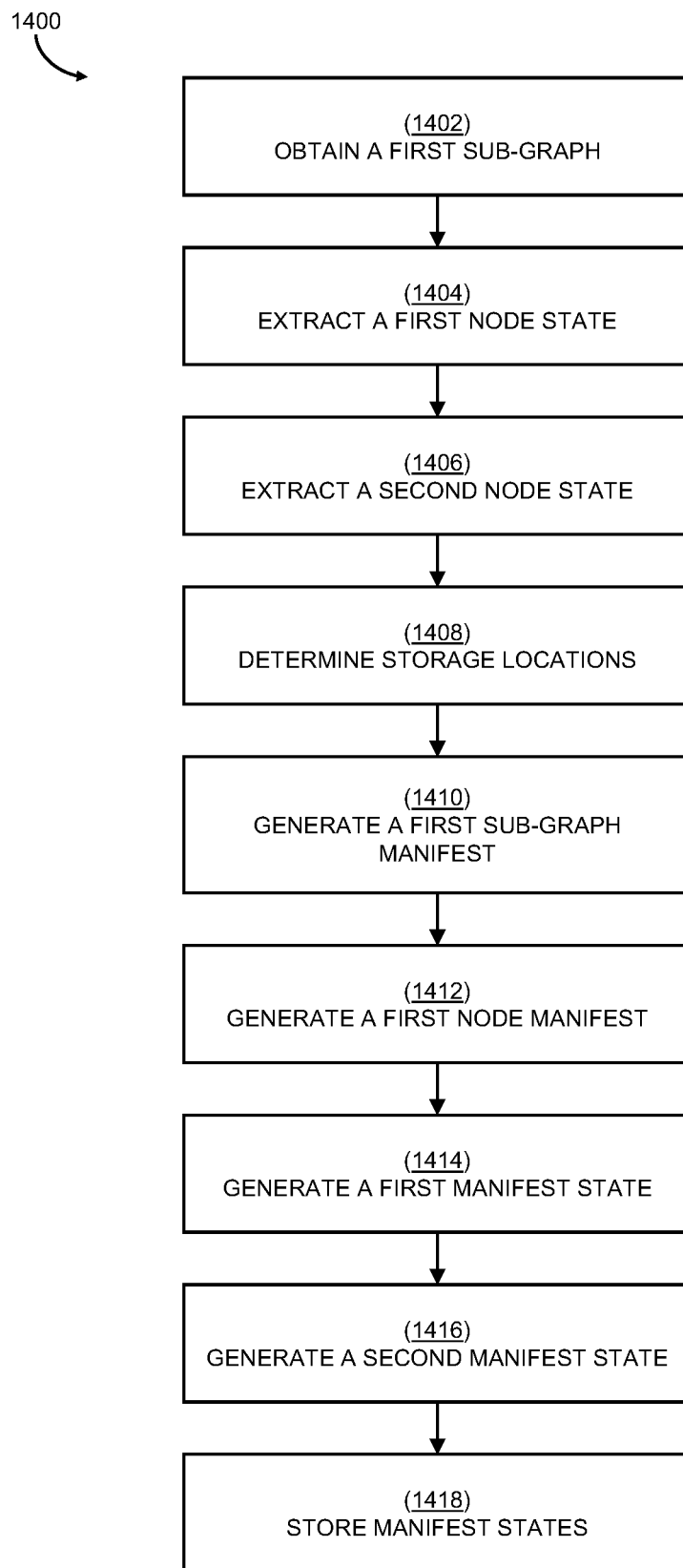
FIG. 14 shows a method for storage management of sub-graphs in executable graph-based models according to an aspect of the present disclosure.

FIG. 14 shows a method 1400 for storage management of sub-graphs in executable graph-based models according to an aspect of the present disclosure.

The method 1400 comprises the steps of obtaining 1402 a first sub-graph, extracting 1404 a first node state, extracting 1406 a second node state, determining 1408 storage locations, generating 1410 a first sub-graph manifest, generating 1412 a first node manifest, generating 1414 a first manifest state, generating 1416 a second manifest state, and storing 1418 the manifest states. In one embodiment, the method 900 is performed by a system such as the system 300 described above in relation to FIG. 3.

At the step of obtaining 1402, a first sub-graph of an executable graph-based model is obtained. The first sub-graph comprises a first graph node and a second node (e.g., the graph node 634 and the node 644 shown in FIG. 6B). The first graph node defines the first sub-graph and is associated with a first identifier (e.g., the graph identifier 638 shown in FIG. 6B).

At the step of extracting 1404, a first node state is extracted from first graph node (e.g., the state 636 shown in FIG. 6B). The first node state comprises the first identifier. A node state, or simply state, comprises all data required to reconstruct the graph node (e.g., attributes, properties, etc.).

At the step of extracting 1406, a second node state is extracted from the second node (e.g., the state 646 shown in FIG. 6B). The second node state comprises the first identifier and a second identifier associated with the second node (e.g., the graph identifier 638 and the unique identifier 648 shown in FIG. 6B).

At the step of determining 1408, a storage location for the node state of each of the first graph node and the second node is determined. Because the node states are stored separately from the node manifests, the storage locations for the node states need to be determined. Here, determining a storage location corresponds to identifying or determining the file path, or location (e.g., URL), at which the node state will be, or has been, saved.

At the step of generating 1410, a first sub-graph manifest associated with the first graph node is generated (e.g., the manifest 640 shown in FIG. 6B). The first sub-graph manifest comprises the first identifier and the storage location for the first node state. Storing the storage location of the first node state with the manifest allows the node state to be efficiently obtained when loading the sub-graph (as described above in relation to FIG. 13).

At the step of generating 1412, a first node manifest associated with the second node is generated (e.g., the manifest 650 shown in FIG. 6B). The first node manifest comprises the first identifier, the second identifier, and the storage location for the second node state.

At the step of generating 1414, a first manifest state for the first sub-graph manifest is generated (e.g., the manifest state 642 shown in FIG. 6B). The first manifest state comprises the first identifier.

At the step of generating 1416, a second manifest state for the first node manifest is generated (e.g., the manifest state 652 shown in FIG. 6B). The second manifest state comprises the first identifier and the second identifier (e.g., the graph identifier 638 and the unique identifier 648). By storing the manifest state of the first node with both the first identifier (graph identifier) and the second identifier (unique node identifier), the sub-graph within which the first node is contained can be loaded in a bottom-up approach as described above in relation to FIG. 14.

At the step of storing 1418, the first manifest state and the second manifest state are stored. Optionally, the first node state and the second node state are also stored at the step of storing 1418. Beneficially, the manifest states (i.e., the data structure) and the node states (i.e., the data stored within the data structure) are stored separately thereby allowing a user to maintain and store their data independently of the storage of the structure and functionality of the executable graph-based model. In one embodiment, the storage location of the manifest states is at a first device and the storage location of the node states are at a second, different, device. For example, the first device could be an enterprise facility managed by a company offering a service involving the executable graph-based model within which the executable node is contained, and the second device could be a device of a user of the executable graph-based model. As such, the user is able to maintain their personal data separately from, and independently to, the enterprise facility managed by the company.

Figure 15:
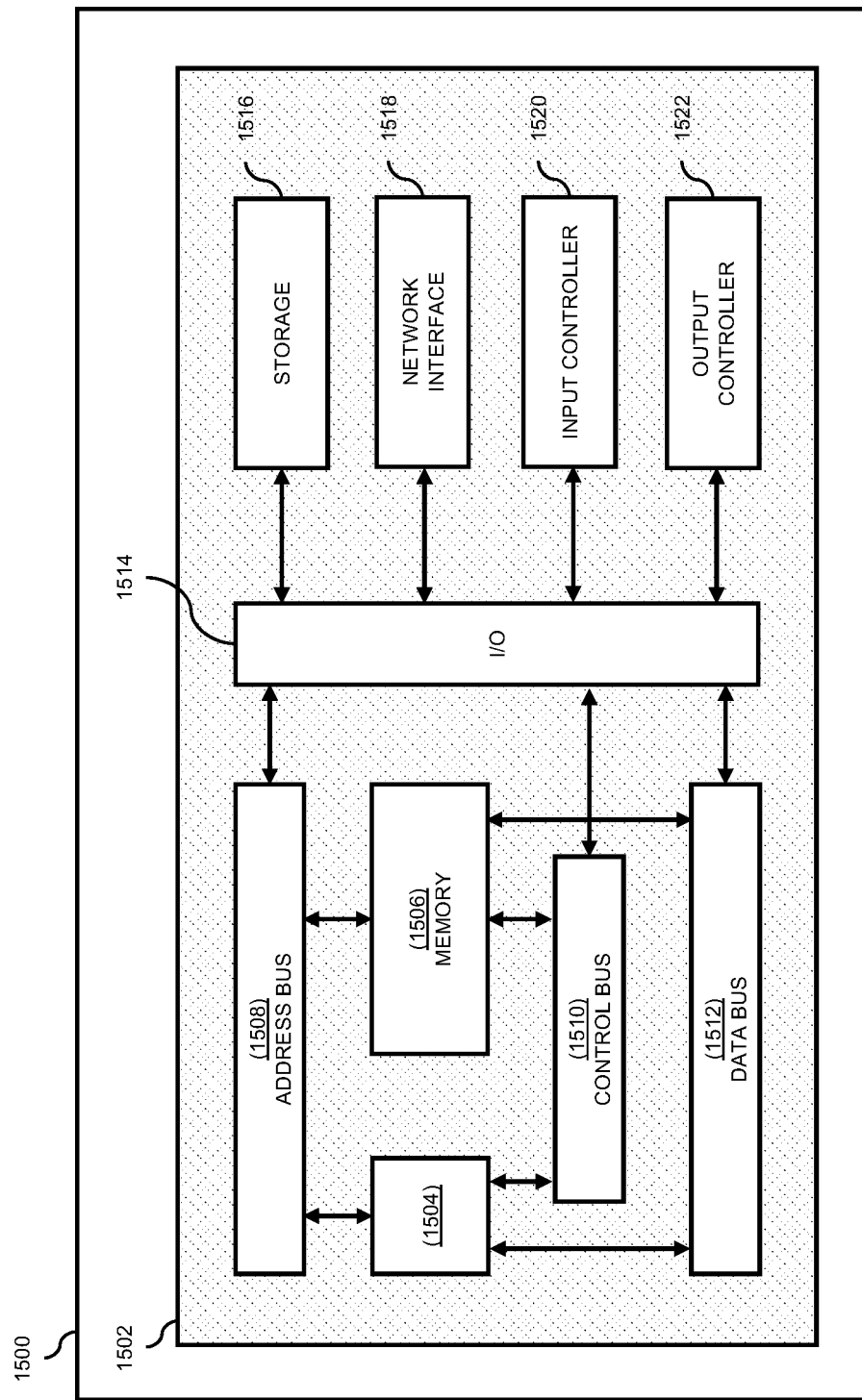
FIG. 15 shows an example computing system for carrying out the methods of the present disclosure.

FIG. 15 shows an example computing system for carrying out the methods of the present disclosure. Specifically, FIG. 15 shows a block diagram of an embodiment of a computing system according to example embodiments of the present disclosure.

Computing system 1500 can be configured to perform any of the operations disclosed herein such as, for example, any of the operations discussed with reference to the functional modules described in relation to FIG. 1A. The computing system 1500 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1500 is a distributed system configured to function using multiple computing machines interconnected via a data network or bus system.

The computing system 1500 includes one or more computing device(s) 1502. The one or more computing device(s) 1502 of computing system 1500 comprise one or more processors 1504 and memory 1506. One or more processors 1504 can be any general purpose processor(s) configured to execute a set of instructions. For example, one or more processors 1504 can be a processor core, a multiprocessor, a reconfigurable processor, a microcontroller, a digital signal processor ("DSP"), an application-specific integrated circuit ("ASIC"), a graphics processing unit ("GPU"), a neural processing unit ("NPU"), an accelerated processing unit ("APU"), a brain processing unit ("BPU"), a data processing unit ("DPU"), a holographic processing unit ("HPU"), an intelligent processing unit ("IPU"), a microprocessor/microcontroller unit ("MPU/MCU"), a radio processing unit ("RPU"), a tensor processing unit ("TPU"), a vector processing unit ("VPU"), a wearable processing unit ("WPU"), a field programmable gate array ("FPGA"), a programmable logic device ("PLD"), a controller, a state machine, gated logic, discrete hardware component, any other processing unit, or any combination or multiplicity thereof. In one embodiment, one or more processors 1504 include one processor. Alternatively, one or more processors 1504 include a plurality of processors that are operatively connected. For example, the one or more processors 1504 can be multiple processing units, a single processing core, multiple processing cores, special purpose processing cores, co-processors, or any combination thereof. One or more processors 1504 are communicatively coupled to memory 1506 via address bus 1508, control bus 1510, and data bus 1512.

Memory 1506 can include non-volatile memories such as read-only memory ("ROM"), programmable read-only memory ("PROM"), erasable programmable read-only memory ("EPROM"), flash memory, or any other device capable of storing program instructions or data with or without applied power. The memory 1506 can also include volatile memories, such as random-access memory ("RAM"), static random-access memory ("SRAM"), dynamic random-access memory ("DRAM"), and synchronous dynamic random-access memory ("SDRAM"). The memory 1506 can comprise single or multiple memory modules. While the memory 1506 is depicted as part of the one or more computing device(s) 1502, the skilled person will recognize that the memory 1506 can be separate from the one or more computing device(s) 1502.

Memory 1506 can store information that can be accessed by one or more processors 1504. For instance, memory 1506 (e.g., one or more non-transitory computer-readable storage mediums, memory devices) can include computer-readable instructions (not shown) that can be executed by one or more processors 1504. The computer-readable instructions can be software written in any suitable programming language or can be implemented in hardware. Additionally, or alternatively, the computer-readable instructions can be executed in logically and/or virtually separate threads on one or more processors 1504. For example, memory 1506 can store instructions (not shown) that when executed by one or more processors 1504 cause one or more processors 1504 to perform operations such as any of the operations and functions for which computing system 1500 is configured, as described herein. In addition, or alternatively, memory 1506 can store data (not shown) that can be obtained, received, accessed, written, manipulated, created, and/or stored. The data can include, for instance, the data and/or information described herein in relation to FIGS. 1 to 14. In some implementations, the one or more computing device(s) 1502 can obtain from and/or store data in one or more memory device(s) that are remote from the computing system 1500.

The one or more computing device(s) 1502 further comprise I/O interface 1514 communicatively coupled to address bus 1508, control bus 1510, and data bus 1512. The I/O interface 1514 is configured to couple to one or more external devices (e.g., to receive and send data from/to one or more external devices). Such external devices, along with the various internal devices, may also be known as peripheral devices. The I/O interface 1514 may include both electrical and physical connections for operably coupling the various peripheral devices to the one or more computing device(s) 1502. The I/O interface 1514 may be configured to communicate data, addresses, and control signals between the peripheral devices and the one or more computing device(s) 1502. The I/O interface 1514 may be configured to implement any standard interface, such as a small computer system interface ("SCSI"), serial-attached SCSI ("SAS"), fiber channel, peripheral component interconnect ("PCI"), PCI express ("PCIe"), serial bus, parallel bus, advanced technology attachment ("ATA"), serialATA ("SATA"), universal serial bus ("USB"), Thunderbolt, FireWire, various video buses, and the like. The I/O interface 1514 is configured to implement only one interface or bus technology. Alternatively, the I/O interface 1514 is configured to implement multiple interfaces or bus technologies. The I/O interface 1514 may include one or more buffers for buffering transmissions between one or more external devices, internal devices, the one or more computing device(s), or the one or more processors 1504. The I/O interface 1514 may couple the one or more computing device(s) 1502 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1514 may couple the one or more computing device(s) 1502 to various output devices, including video displays, speakers, printers, projectors, tactile feedback devices, automation control, robotic components, actuators, motors, fans, solenoids, valves, pumps, transmitters, signal emitters, lights, and so forth.

Computing system 1500 further comprises storage unit 1516, network interface 1518, input controller 1520, and output controller 1522. Storage unit 1516, network interface 1518, input controller 1520, and output controller 1522 are communicatively coupled to the central control unit (i.e., the memory 1506, the address bus 1508, the control bus 1510, and the data bus 1512) via I/O interface 1514. The network interface 1518 communicatively couples the computing system 1500 to one or more networks such as wide area networks ("WAN"), local area networks ("LAN"), intranets, the Internet, wireless access networks, wired networks, mobile networks, telephone networks, optical networks, or combinations thereof. The network interface 1518 may facilitate communication with packet switched networks or circuit switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

Storage unit 1516 is a computer readable medium, preferably a non-transitory computer readable medium, comprising one or more programs, the one or more programs comprising instructions which when executed by the one or more processors 1504 cause computing system 1500 to perform the method steps of the present disclosure. Alternatively, storage unit 1516 is a transitory computer readable medium. Storage unit 1516 can include a hard disk, a floppy disk, a compact disc read-only memory ("CD-ROM"), a digital versatile disc ("DVD"), a Blu-ray disc, a magnetic tape, a flash memory, another non-volatile memory device, a solid-state drive ("SSD"), any magnetic storage device, any optical storage device, any electrical storage device, any semiconductor storage device, any physical-based storage device, any other data storage device, or any combination or multiplicity thereof. In one embodiment, the storage unit 1516 stores one or more operating systems, application programs, program modules, data, or any other information. The storage unit 1516 is part of the one or more computing device(s) 1502. Alternatively, the storage unit 1516 is part of one or more other computing machines that are in communication with the one or more computing device(s) 1502, such as servers, database servers, cloud storage, network attached storage, and so forth.

Moreover, for example, the present technology/system may achieve the following configurations:

1. A method for dynamic execution of sub-graphs within executable graph-based models, the method comprising:
   obtaining, by processing circuitry, an executable graph-based model comprising a plurality of sub-graphs and an overlay structure comprising processing logic associated with the plurality of sub-graphs, wherein each sub-graph defines a hierarchical structure of related nodes;
   receiving, by the processing circuitry, a stimulus and a context associated with the stimulus;
   in response to the stimulus being received, mapping, by the processing circuitry and based on the context, the stimulus to a first sub-graph of the executable graph-based model; and
   causing, by the processing circuitry, execution of processing logic within the overlay structure based on the mapping, wherein said processing logic is associated with one or more nodes of the first sub-graph.

2. The method of 1 wherein the context is associated with a target executable node of the first sub-graph, the target executable node comprising a composition of a first node of the first sub-graph and a first overlay of the overlay structure, the first overlay comprising processing logic operable to interact with the first node such that the step of causing execution of processing logic within the overlay structure comprises causing execution of said processing logic of the first overlay.

3. The method of 2 wherein the first sub-graph of the executable graph-based model is defined by a first graph node such that the first graph node is a root node of the first sub-graph.

4. The method of 3 further comprising, in response to the stimulus being received and prior to the step of causing execution:
   traversing, by the processing circuitry, from the target executable node to the root node of the first sub-graph thereby determining a traversal path comprising a first set of nodes from the root node to the target executable node, wherein the first set of nodes includes the target executable node.

5. The method of 4 wherein the step of causing execution comprises:
   identifying, by the processing circuitry, a plurality of executable nodes within the first set of nodes, each of the plurality of executable nodes comprising a composition of a respective node of the first sub-graph and at least one overlay of the overlay structure; and
   causing, by the processing circuitry, execution of processing logic associated with each overlay of the plurality of executable nodes.

6. The method of 4 further comprising, after the step of traversing and prior to the step of causing execution:
   loading, by the processing circuitry and to memory operatively coupled to the processing circuitry, the first set of nodes of the traversal path, wherein the first set of nodes are loaded in order from the root node to the target executable node.

7. The method of 6 wherein the first set of nodes comprises a node associated with at least one overlay within the overlay structure such that the step of loading the first set of nodes comprises:
   generating, by the processing circuitry, an executable node comprising a composition of the node and the at least one overlay.

8. The method of 6 wherein the first graph node is associated with at least one overlay within the overlay structure such that the first graph node is an executable node.

9. The method of 8 wherein the step of loading the first set of nodes comprises:
   generating, by the processing circuitry, a first set of executable nodes based on the first set of nodes and the at least one overlay, wherein each executable node within the first set of executable nodes comprises a composition of a respective node of the first set of nodes and the at least one overlay.

10. The method of 6 further comprising, after the step of causing execution:
    unloading, by the processing circuitry and from memory operatively coupled to the processing circuitry, one or more nodes within the first set of nodes, wherein the one or more nodes are unloaded in order from the target executable node to the root node.

11. The method of 10 wherein the one or more nodes are unloaded when an unloading criterion is met.

12. The method of 11 wherein the unloading criterion is met after a predetermined period of time has elapsed from the step of causing execution.

13. The method of 11 wherein the unloading criterion is based on the stimulus.

14. The method of 2 wherein the first graph node is composed of one or more further nodes within the first sub-graph.

15. The method of 14 wherein the one or more further nodes comprise one or more of: a data node, a value node, and a role node.

16. The method of 14 wherein the one or more further nodes comprise an edge node comprising a first connective relationship between the first graph node and the edge node.

17. The method of 16 wherein the first connective relationship is defined by a first role.

18. The method of 16 wherein the edge node further comprises a second connective relationship between the edge node and a second node.

19. The method of 18 wherein the first sub-graph comprises the second node.

20. The method of 18 wherein the second node is not a part of the first sub-graph.

21. The method of 18 wherein the second node is a graph node which defines a sub-graph of the executable graph-based model.

22. The method of 18 wherein the second connective relationship is defined by a second role.

23. The method of 14 wherein the one or more further nodes comprise a second graph node.

24. The method of 23 wherein the second graph node defines a sub-graph of the first sub-graph.

25. The method of 1 wherein the executable graph-based model comprises an edge node comprising connective relationships between at least two sub-graphs of the executable graph-based model.

26. The method of 1 further comprising, after the step of causing execution:
obtaining, by the processing circuitry, one or more outcomes of said execution of processing logic within the overlay structure; and
outputting, by the processing circuitry, the one or more outcomes.

27. The method of 1 wherein nodes within each sub-graph are semantically related.

28. The method of 1 wherein the executable graph-based model comprises a shared node within the hierarchical structure of each of the plurality of sub-graphs.

29. A system for dynamic execution of sub-graphs within executable graph-based models, the system comprising processing circuitry and a memory unit operatively coupled to the processing circuitry and having instructions stored thereon that, when executed by the processing circuitry, cause the processing circuitry to:
obtain an executable graph-based model comprising a plurality of sub-graphs and an overlay structure comprising processing logic associated with the plurality of sub-graphs, wherein each sub-graph defines a hierarchical structure of related nodes;
receive a stimulus and a context associated with the stimulus;
in response to the stimulus being received, map, based on the context, the stimulus to a first sub-graph of the executable graph-based model; and
cause execution of processing logic within the overlay structure based on the mapping, wherein said processing logic is associated with one or more nodes of the first sub-graph.

30. A non-transitory computer-readable medium for dynamic execution of sub-graphs within executable graph-based models, the non-transitory computer-readable medium storing instructions which, when executed by processing circuitry, cause the processing circuitry to:
obtain an executable graph-based model comprising a plurality of sub-graphs and an overlay structure comprising processing logic associated with the plurality of sub-graphs, wherein each sub-graph defines a hierarchical structure of related nodes;
receive a stimulus and a context associated with the stimulus;
in response to the stimulus being received, map, based on the context, the stimulus to a first sub-graph of the executable graph-based model; and
cause execution of processing logic within the overlay structure based on the mapping, wherein said processing logic is associated with one or more nodes of the first sub-graph.

31. A device comprising:
a display;
an interface unit configured to receive one or more user inputs; and
processing circuitry operatively coupled to the display and the interface unit, wherein the processing circuitry is configured to:
obtain an executable graph-based model comprising a first sub-graph and at least one node, wherein the first sub-graph comprises a hierarchical structure of one or more related nodes;
display, on the display of the device, a graphical representation of the executable graph-based model, the graphical representation comprising a first display element associated with the first sub-graph and at least one second display element associated with the at least one node, wherein the first display element represents the first sub-graph at a first level of detail;
display, on the display of the device, a first selector associated with the first display element;
receive, from the interface unit, a first user input associated with the first selector; and
in response to the first user input being received, replace the first display element of the graphical representation of the executable graph-based model with a third display element whilst maintaining display of the at least one second display element, wherein the third display element represents the first sub-graph at a second level of detail.

32. The device of 31 wherein the second level of detail is greater than the first level of detail.

33. The device of 32 wherein the first display element comprises a first shape.

34. The device of 33 wherein the third display element comprises the first shape and one or more shapes associated with the one or more related nodes of the hierarchical structure of the first sub-graph.

35. The device of 34 wherein the one or more shapes are positioned circumferentially around the first shape.

36. The device of 34 wherein the one or more shapes are positioned within the first shape.

37. The device of 31 wherein the second level of detail is less than the first level of detail.

38. The device of 31 wherein the graphical representation of the executable graph-based model further comprises one or more further graphical representations of one or more further elements of the executable graph-based model.

39. The device of 38 wherein the first display element is replaced by the third display element, in response to the first user input being received, whilst maintaining display of the one or more further graphical representations.

40. The device of 38 wherein the one or more further elements of the executable graph-based model include one or more of: a node, an edge, a role, and an overlay.

41. The device of 31 wherein the first selector is displayed proximate the first display element.

42. The device of 31 wherein the first selector and the first display element are contiguous.

43. A method for interactive visualization of sub-graphs within an executable graph-based model, the method comprising:
obtaining, by processing circuitry, an executable graph-based model comprising a first sub-graph and at least one node, wherein the first sub-graph comprises a hierarchical structure of one or more related nodes;
displaying, by the processing circuitry, a graphical representation of the executable graph-based model, the graphical representation comprising a first display element associated with the first sub-graph and at least one second display element associated with the at least one node, wherein the first display element represents the first sub-graph at a first level of detail;
displaying, by the processing circuitry, a first selector associated with the first display element;
receiving, by the processing circuitry, a first user input associated with the first selector; and
in response to the first user input being received, replacing, by the processing circuitry, the first display element of the graphical representation of the executable graph-based model with a third display element whilst maintaining display of the at least one second display element, wherein the third display element represents the first sub-graph at a second level of detail.

44. A non-transitory computer-readable medium for interactive visualization of sub-graphs within an executable graph-based model, the non-transitory computer-readable medium storing instructions which, when executed by processing circuitry, cause the processing circuitry to:
obtain an executable graph-based model comprising a first sub-graph and at least one node, wherein the first sub-graph comprises a hierarchical structure of one or more related nodes;
display a graphical representation of the executable graph-based model, the graphical representation comprising a first display element associated with the first sub-graph and at least one second display element associated with the at least one node, wherein the first display element represents the first sub-graph at a first level of detail;
display a first selector associated with the first display element;
receive a first user input associated with the first selector; and
in response to the first user input being received, replace the first display element of the graphical representation of the executable graph-based model with a third display element whilst maintaining display of the at least one second display element, wherein the third display element represents the first sub-graph at a second level of detail.

45. A method for loading of sub-graphs in executable graph-based models, the method comprising:
obtaining, by processing circuitry and based on a first identifier, a first manifest state, wherein the first manifest state comprises the first identifier and a second identifier;
obtaining, by the processing circuitry and based on the second identifier, a second manifest state, wherein the second manifest state comprises the second identifier;
generating, by the processing circuitry, a first manifest from the first manifest state, wherein the first manifest comprises a first node state storage location, the first identifier, and the second identifier;
generating, by the processing circuitry, a second manifest from the second manifest state, wherein the second manifest comprises a second node state storage location and the second identifier;
obtaining, by the processing circuitry, a first node state and a second node state from the first node state storage location and the second node state storage location respectively;
generating, by the processing circuitry, a first node based on the first manifest and the first node state, wherein the first node comprises the first identifier and the second identifier;
generating, by the processing circuitry, a first graph node based on the second manifest and the second node state, wherein the first graph node comprises the second identifier; and
generating, by the processing circuitry, a first sub-graph of an executable graph-based model by associating the first node with the first graph node.

46. The method of 45 wherein the first node is a second graph node defining a second sub-graph within the executable graph-based model.

47. The method of 46 wherein the second sub-graph is a child of the first sub-graph.

48. The method of 45 wherein the second manifest state further comprises a third identifier associated with a shared sub-graph.

49. The method of 48 further comprising:
loading, by the processing circuitry, the shared sub-graph based on the third identifier; and
associating, by the processing circuitry, the shared sub-graph with the first sub-graph.

50. A device comprising processing circuitry and a memory storing instructions which, when executed by the processing circuitry, cause the processing circuitry to:
obtain, based on a first identifier, a first manifest state, wherein the first manifest state comprises the first identifier and a second identifier;
obtain, based on the second identifier, a second manifest state, wherein the second manifest state comprises the second identifier;
generate a first manifest from the first manifest state, wherein the first manifest comprises a first node state storage location, the first identifier, and the second identifier;
generate a second manifest from the second manifest state, wherein the second manifest comprises a second node state storage location and the second identifier;
obtain a first node state and a second node state from the first node state storage location and the second node state storage location respectively;
generate a first node based on the first manifest and the first node state, wherein the first node comprises the first identifier and the second identifier;
generate a first graph node based on the second manifest and the second node state, wherein the first graph node comprises the second identifier; and
generate a first sub-graph of an executable graph-based model by associating the first node with the first graph node.

51. A non-transitory computer-readable medium storing instructions which, when executed by processing circuitry, cause the processing circuitry to:
obtain, based on a first identifier, a first manifest state, wherein the first manifest state comprises the first identifier and a second identifier;
obtain, based on the second identifier, a second manifest state, wherein the second manifest state comprises the second identifier;
generate a first manifest from the first manifest state, wherein the first manifest comprises a first node state storage location, the first identifier, and the second identifier;
generate a second manifest from the second manifest state, wherein the second manifest comprises a second node state storage location and the second identifier;
obtain a first node state and a second node state from the first node state storage location and the second node state storage location respectively;
generate a first node based on the first manifest and the first node state, wherein the first node comprises the first identifier and the second identifier;
generate a first graph node based on the second manifest and the second node state, wherein the first graph node comprises the second identifier; and
generate a first sub-graph of an executable graph-based model by associating the first node with the first graph node.

52. A method for storage management of sub-graphs in executable graph-based models, the method comprising:
obtaining, by processing circuitry, a first sub-graph of an executable graph-based model, the first sub-graph comprising a first graph node and a second node, wherein the first graph node defines the first sub-graph and is associated with a first identifier;
extracting, by the processing circuitry, a first node state from first graph node, wherein the first node state comprises the first identifier;
extracting, by the processing circuitry, a second node state from the second node, wherein the second node state comprises the first identifier and a second identifier associated with the second node;
determining, by the processing circuitry, a storage location for the node state of each of the first graph node and the second node;
generating, by the processing circuitry, a first sub-graph manifest associated with the first graph node, wherein the first sub-graph manifest comprises the first identifier and the storage location for the first node state;
generating, by the processing circuitry, a first node manifest associated with the second node, wherein the first node manifest comprises the first identifier, the second identifier, and the storage location for the second node state;
generating, by the processing circuitry, a first manifest state for the first sub-graph manifest, wherein the first manifest state comprises the first identifier;
generating, by the processing circuitry, a second manifest state for the first node manifest, wherein the second manifest state comprises the first identifier and the second identifier; and
storing, by the processing circuitry, the first manifest state and the second manifest state.

53. A device comprising processing circuitry and a memory storing instructions which, when executed by the processing circuitry, cause the processing circuitry to:
obtain a first sub-graph of an executable graph-based model, the first sub-graph comprising a first graph node and a second node, wherein the first graph node defines the first sub-graph and is associated with a first identifier;
extract a first node state from first graph node, wherein the first node state comprises the first identifier;
extract a second node state from the second node, wherein the second node state comprises the first identifier and a second identifier associated with the second node;
determine a storage location for the node state of each of the first graph node and the second node;
generate a first sub-graph manifest associated with the first graph node, wherein the first sub-graph manifest comprises the first identifier and the storage location for the first node state;
generate a first node manifest associated with the second node, wherein the first node manifest comprises the first identifier, the second identifier, and the storage location for the second node state;
generate a first manifest state for the first sub-graph manifest, wherein the first manifest state comprises the first identifier;
generate a second manifest state for the first node manifest, wherein the second manifest state comprises the first identifier and the second identifier; and
store the first manifest state and the second manifest state.

54. A non-transitory computer-readable medium storing instructions which, when executed by processing circuitry, cause the processing circuitry to:
obtain a first sub-graph of an executable graph-based model, the first sub-graph comprising a first graph node and a second node, wherein the first graph node defines the first sub-graph and is associated with a first identifier;
extract a first node state from first graph node, wherein the first node state comprises the first identifier;
extract a second node state from the second node, wherein the second node state comprises the first identifier and a second identifier associated with the second node;
determine a storage location for the node state of each of the first graph node and the second node;
generate a first sub-graph manifest associated with the first graph node, wherein the first sub-graph manifest comprises the first identifier and the storage location for the first node state;
generate a first node manifest associated with the second node, wherein the first node manifest comprises the first identifier, the second identifier, and the storage location for the second node state;
generate a first manifest state for the first sub-graph manifest, wherein the first manifest state comprises the first identifier;
generate a second manifest state for the first node manifest, wherein the second manifest state comprises the first identifier and the second identifier; and
store the first manifest state and the second manifest state.

What is claimed is:
1. A method for dynamic execution of sub-graphs within executable graph-based models, the method comprising:
obtaining, by processing circuitry, a graph-based model comprising a plurality of sub-graphs and an overlay structure comprising processing logic associated with the plurality of sub-graphs, wherein:
each sub-graph defines a hierarchical structure of related nodes,
each sub-graph is defined by a graph node within the graph-based model, and
the graph node that defines each sub-graph encapsulates one or more nodes included within the sub-graph;
generating, by the processing circuitry, during a run-time of the processing circuitry, an executable graph-based model based on the obtained graph-based model;
receiving, by the processing circuitry, a stimulus and a context associated with the stimulus;
in response to the stimulus being received, mapping, by the processing circuitry and based on the context, the stimulus to a first sub-graph of the plurality of sub-graphs of the executable graph-based model; and
causing, by the processing circuitry, execution of processing logic within the overlay structure based on the mapping, wherein said processing logic is associated with the one or more nodes of the first sub-graph.

2. The method of claim 1, wherein the context is associated with a target executable node of the first sub-graph, the target executable node comprising a composition of a first node of the first sub-graph and a first overlay of the overlay structure, the first overlay comprising processing logic operable to interact with the first node such that the step of causing execution of processing logic within the overlay structure comprises causing execution of said processing logic of the first overlay.

3. The method of claim 2, wherein the graph node that defines each sub-graph is one of a group consisting of: a leaf graph node and a composite graph node, wherein the first sub-graph of the executable graph-based model is defined by a first graph node, and wherein the first graph node is the composite graph node and is a root node of the first sub-graph.

4. The method of claim 3, further comprising, in response to the stimulus being received and prior to the step of causing execution:
traversing, by the processing circuitry, from the target executable node to the root node of the first sub-graph thereby determining a traversal path comprising a first set of nodes from the root node to the target executable node, wherein the first set of nodes includes the target executable node.

5. The method of claim 4, wherein the step of causing execution comprises:
identifying, by the processing circuitry, a plurality of executable nodes within the first set of nodes, each of the plurality of executable nodes comprising a composition of a respective node of the first sub-graph and at least one overlay of the overlay structure; and
causing, by the processing circuitry, execution of processing logic associated with each overlay of the plurality of executable nodes.

6. The method of claim 4 further comprising, after the step of traversing and prior to the step of causing execution:
loading, by the processing circuitry and to memory operatively coupled to the processing circuitry, the first set of nodes of the traversal path, wherein the first set of nodes are loaded in order from the root node to the target executable node.

7. The method of claim 6, wherein the first set of nodes comprises a node associated with at least one overlay within the overlay structure such that the step of loading the first set of nodes comprises:
generating, by the processing circuitry, an executable node comprising a composition of the node and the at least one overlay.

8. The method of claim 6, wherein the first graph node is associated with at least one overlay within the overlay structure such that the first graph node is an executable node.

9. The method of claim 8, wherein the step of loading the first set of nodes comprises:
generating, by the processing circuitry, a first set of executable nodes based on the first set of nodes and the at least one overlay, wherein each executable node within the first set of executable nodes comprises a composition of a respective node of the first set of nodes and the at least one overlay.

10. The method of claim 6, further comprising, after the step of causing execution:
unloading, by the processing circuitry and from memory operatively coupled to the processing circuitry, one or more nodes within the first set of nodes, wherein the one or more nodes are unloaded in order from the target executable node to the root node.

11. The method of claim 10, wherein the one or more nodes are unloaded when an unloading criterion is met.

12. The method of claim 11, wherein the unloading criterion is met after a predetermined period of time has elapsed from the step of causing execution.

13. The method of claim 11, wherein the unloading criterion is based on the stimulus.

14. The method of claim 3, wherein the first graph node encapsulates one or more further nodes within the first sub-graph.

15. The method of claim 14, wherein the one or more further nodes comprise one or more of: a data node, a value node, and a role node.

16. The method of claim 14, wherein the one or more further nodes comprise an edge node indicative of a first connective relationship between the first graph node and the edge node.

17. The method of claim 16, wherein the first connective relationship is defined by a first role.

18. The method of claim 16, wherein the edge node further comprises a second connective relationship between the edge node and a second node.

19. The method of claim 18, wherein the first sub-graph comprises the second node.

20. The method of claim 18, wherein the second node is not a part of the first sub-graph.

21. The method of claim 18, wherein the second node is a graph node which defines a sub-graph of the executable graph-based model.

22. The method of claim 18, wherein the second connective relationship is defined by a second role.

23. The method of claim 14, wherein the one or more further nodes comprise a second graph node.

24. The method of claim 23, wherein the second graph node defines a sub-graph of the first sub-graph.

25. The method of claim 1, wherein the executable graph-based model comprises an edge node indicative of connective relationships between at least two sub-graphs of the executable graph-based model.

26. The method of claim 1, further comprising, after the step of causing execution:
obtaining, by the processing circuitry, one or more outcomes of said execution of processing logic within the overlay structure; and
outputting, by the processing circuitry, the one or more outcomes.

27. The method of claim 1, wherein nodes within each sub-graph are semantically related.

28. The method of claim 1, wherein the executable graph-based model comprises a shared node within the hierarchical structure of each of the plurality of sub-graphs.

29. A system for dynamic execution of sub-graphs within executable graph-based models, the system comprising processing circuitry and a memory unit operatively coupled to the processing circuitry and having instructions stored thereon that, when executed by the processing circuitry, cause the processing circuitry to:
obtain a graph-based model comprising a plurality of sub-graphs and an overlay structure comprising processing logic associated with the plurality of sub-graphs, wherein:
each sub-graph defines a hierarchical structure of related nodes,
each sub-graph is defined by a graph node in the graph-based model, and
the graph node that defines each sub-graph encapsulates one or more nodes included within the sub-graph;
generate, during a run-time of the processing circuitry, an executable graph-based model based on the obtained graph-based model;
receive a stimulus and a context associated with the stimulus;

in response to the stimulus being received, map, based on the context, the stimulus to a first sub-graph of the plurality of sub-graphs of the executable graph-based model; and cause execution of processing logic within the overlay structure based on the mapping, wherein said processing logic is associated with the one or more nodes of the first sub-graph.

30. A non-transitory computer-readable medium for dynamic execution of sub-graphs within executable graph-based models, the non-transitory computer-readable medium storing instructions which, when executed by processing circuitry, cause the processing circuitry to:

obtain a graph-based model comprising a plurality of sub-graphs and an overlay structure comprising processing logic associated with the plurality of sub-graphs, wherein:

each sub-graph defines a hierarchical structure of related nodes, each sub-graph is defined by a graph node, and the graph node that defines each sub-graph encapsulates one or more nodes included within the sub-graph;

generating during a run-time of the processing circuitry, an executable graph-based model based on the obtained graph-based model;

receive a stimulus and a context associated with the stimulus;

in response to the stimulus being received, map, based on the context, the stimulus to a first sub-graph of the executable graph-based model; and cause execution of processing logic within the overlay structure based on the mapping, wherein said processing logic is associated with the one or more nodes of the first sub-graph.

* * * * *